(12) United States Patent
Jadhav et al.

(10) Patent No.: US 10,334,984 B2
(45) Date of Patent: Jul. 2, 2019

(54) APPARATUS AND METHODS FOR MAKING BREAD

(71) Applicant: iYukti LLC, Broadlands, VA (US)

(72) Inventors: Sandesh B. Jadhav, Broadlands, VA (US); Michael E. Hoyer, Herndon, VA (US); Steven M. Johnson, Washington, DC (US); William M. Vatis, Falls Church, VA (US)

(73) Assignee: iYukti LLC, Broadlands, VA (US)

( * ) Notice: Subject to any disclaimer, the term of this patent is extended or adjusted under 35 U.S.C. 154(b) by 0 days.

(21) Appl. No.: 15/906,576

(22) Filed: Feb. 27, 2018

(65) Prior Publication Data
US 2018/0242784 A1 Aug. 30, 2018

Related U.S. Application Data

(60) Provisional application No. 62/463,856, filed on Feb. 27, 2017.

(51) Int. Cl.
*A47J 37/06* (2006.01)
*A23L 5/10* (2016.01)
(Continued)

(52) U.S. Cl.
CPC ........... *A47J 37/0611* (2013.01); *A21B 7/005* (2013.01); *A23L 5/15* (2016.08); *A47J 36/00* (2013.01);
(Continued)

(58) Field of Classification Search
CPC ...... A47J 37/0611; A47J 37/015; A47J 36/00; A47J 2037/0617; A21B 7/005; A23L 5/15; A23V 2002/00
See application file for complete search history.

(56) References Cited

U.S. PATENT DOCUMENTS

| 4,538,509 A | 9/1985 | Ojima et al. |
| 4,790,665 A | 12/1988 | Hayashi |

(Continued)

FOREIGN PATENT DOCUMENTS

| CN | 102461577 A | 5/2012 |
| EP | 0501157 A1 | 9/1992 |

(Continued)

OTHER PUBLICATIONS

International Search Report and Written Opinion for PCT Application No. PCT/US18/19927; dated Jun. 6, 2018.

*Primary Examiner* — Steven N Leff
(74) *Attorney, Agent, or Firm* — ReavesColey PLLC

(57) ABSTRACT

Devices and methods for automating the process of making flatbread, such as roti. In some embodiments, an apparatus includes a housing, an ingredient metering assembly, a mixing bowl assembly, a mixing actuator assembly, a cooking assembly, and an electronic assembly. The housing defines an interior volume and has several access openings with corresponding lids and/or covers. The ingredient metering assembly includes a flour container assembly, a flour delivery system, a water reservoir, and an oil reservoir. The mixing bowl assembly includes two bowls and a measurement system. The mixing actuator assembly includes a mixing mount, a mixing motor, a mixing paddle assembly, and a lower motor. The cooking assembly includes two platens and an actuator assembly. The electronic assembly includes a power source, a control module, and a LCD input/output screen. All components are integrated within the housing such that the apparatus is a consumer grade countertop appliance.

18 Claims, 62 Drawing Sheets

(51) Int. Cl.
  *A47J 36/00*    (2006.01)
  *A21B 7/00*    (2006.01)
  *A47J 37/01*    (2006.01)

(52) U.S. Cl.
  CPC ......... *A47J 37/015* (2013.01); *A23V 2002/00* (2013.01); *A47J 2037/0617* (2013.01)

(56) References Cited

U.S. PATENT DOCUMENTS

| | | | |
|---|---|---|---|
| 4,806,090 | A | 2/1989 | Finlay |
| 4,838,153 | A | 6/1989 | Escamilla et al. |
| 5,121,677 | A | 6/1992 | Le Claire et al. |
| 5,402,710 | A | 4/1995 | Chen |
| 5,410,948 | A * | 5/1995 | Eickmeyer ............ A47J 37/041 99/335 |
| 5,481,963 | A | 1/1996 | Sesona et al. |
| 5,630,358 | A | 5/1997 | Patel |
| 5,642,659 | A * | 7/1997 | Sesona ................ A47J 37/0611 99/376 |
| 6,332,768 | B1 | 12/2001 | Raio et al. |
| 6,595,114 | B1 | 7/2003 | Endres et al. |
| 6,782,804 | B1 * | 8/2004 | Lin ...................... A47J 37/0611 99/349 |
| 7,014,354 | B2 | 3/2006 | Donthnier et al. |
| 7,140,864 | B1 | 11/2006 | McCarney |
| 7,619,188 | B2 | 11/2009 | Oghafua et al. |
| 8,530,797 | B2 * | 9/2013 | Tassan-Mangina ......................... A47J 37/0611 219/450.1 |
| 8,568,810 | B2 | 10/2013 | Wen et al. |
| 8,671,830 | B2 * | 3/2014 | Lamont ................... A47J 37/06 99/349 |
| 8,820,221 | B2 | 9/2014 | Israni |
| 9,125,421 | B2 | 9/2015 | Israni et al. |
| 9,125,422 | B2 | 9/2015 | Israni et al. |
| 9,277,752 | B2 | 3/2016 | Israni et al. |
| 9,355,096 | B1 | 5/2016 | Brahmbhatt et al. |
| 9,456,612 | B2 | 10/2016 | Israni et al. |
| 9,456,615 | B2 | 10/2016 | Israni et al. |
| 9,603,370 | B2 | 3/2017 | Israni |
| 9,670,047 | B2 | 6/2017 | Carpenter et al. |
| 9,702,858 | B1 | 7/2017 | Minivelle |
| 9,815,191 | B2 | 11/2017 | Oleynik |
| 2001/0042448 | A1 * | 11/2001 | Menektchiev ...... A47J 37/0704 99/372 |
| 2004/0100380 | A1 | 5/2004 | Lindsay et al. |
| 2006/0260472 | A1 * | 11/2006 | Tarlow ................. A47J 37/108 99/395 |
| 2007/0240698 | A1 * | 10/2007 | Holbrook ............ A47J 37/0786 126/25 R |
| 2007/0254080 | A1 | 11/2007 | Schackmuth et al. |
| 2008/0236562 | A1 | 10/2008 | Sager et al. |
| 2008/0282903 | A1 | 11/2008 | Gonzalez |
| 2014/0377417 | A1 | 12/2014 | Martinez |
| 2016/0235239 | A1 | 8/2016 | Patadia |

FOREIGN PATENT DOCUMENTS

| | | |
|---|---|---|
| WO | WO 2010/120248 A1 | 10/2010 |
| WO | WO 2011/099032 A2 | 8/2011 |
| WO | WO 2015/097561 A2 | 7/2015 |
| WO | WO 2015/097562 A2 | 7/2015 |

* cited by examiner

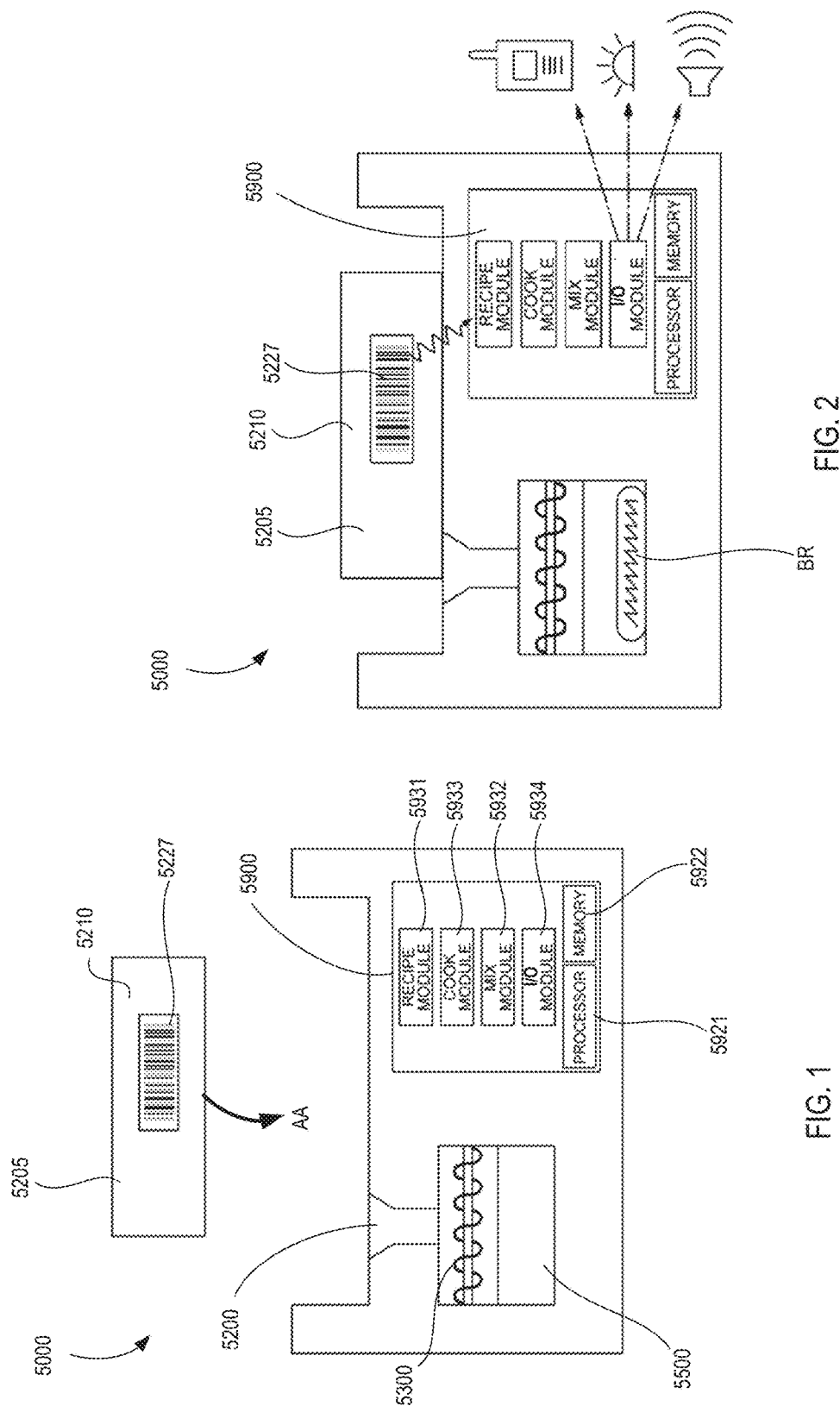

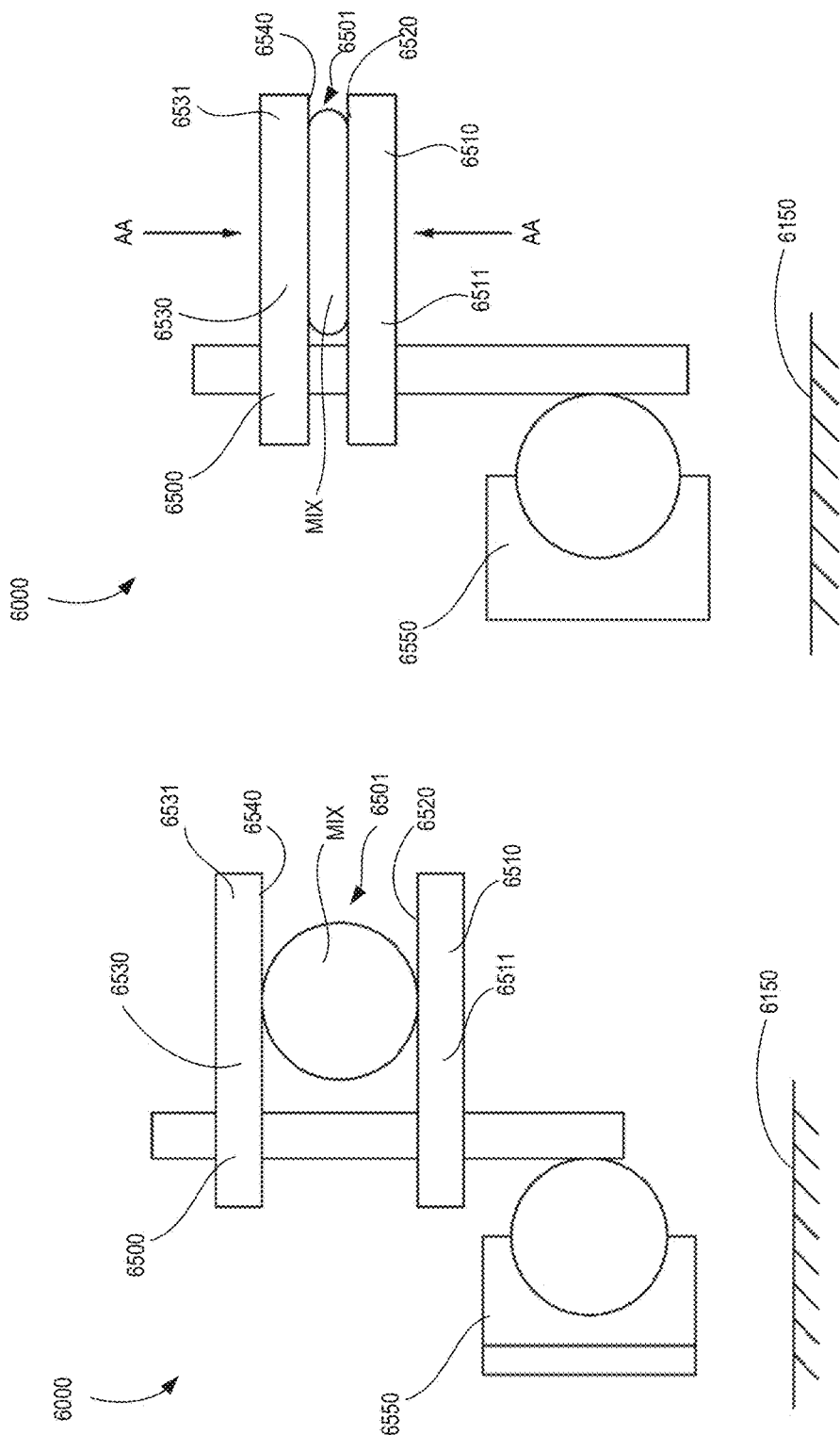

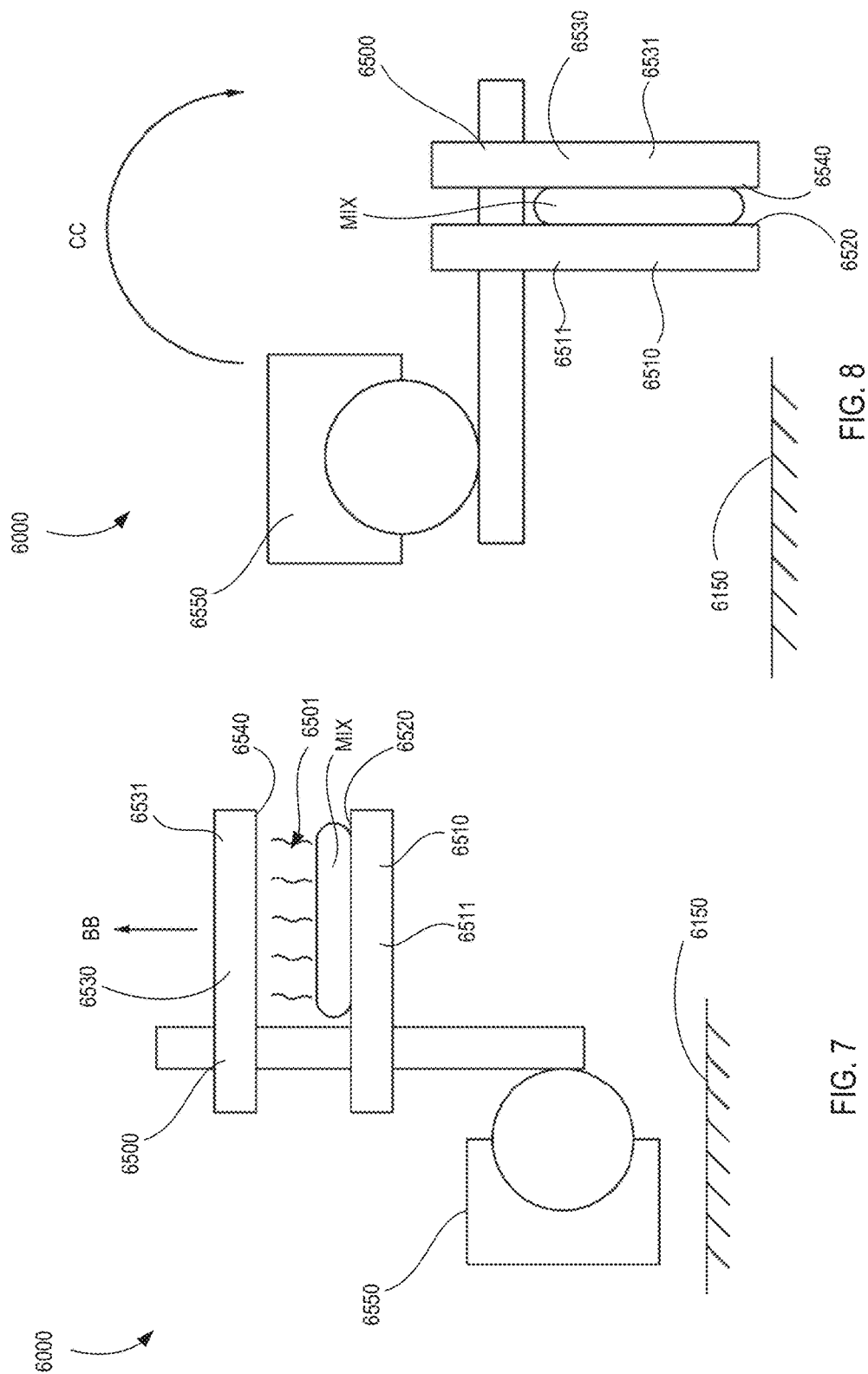

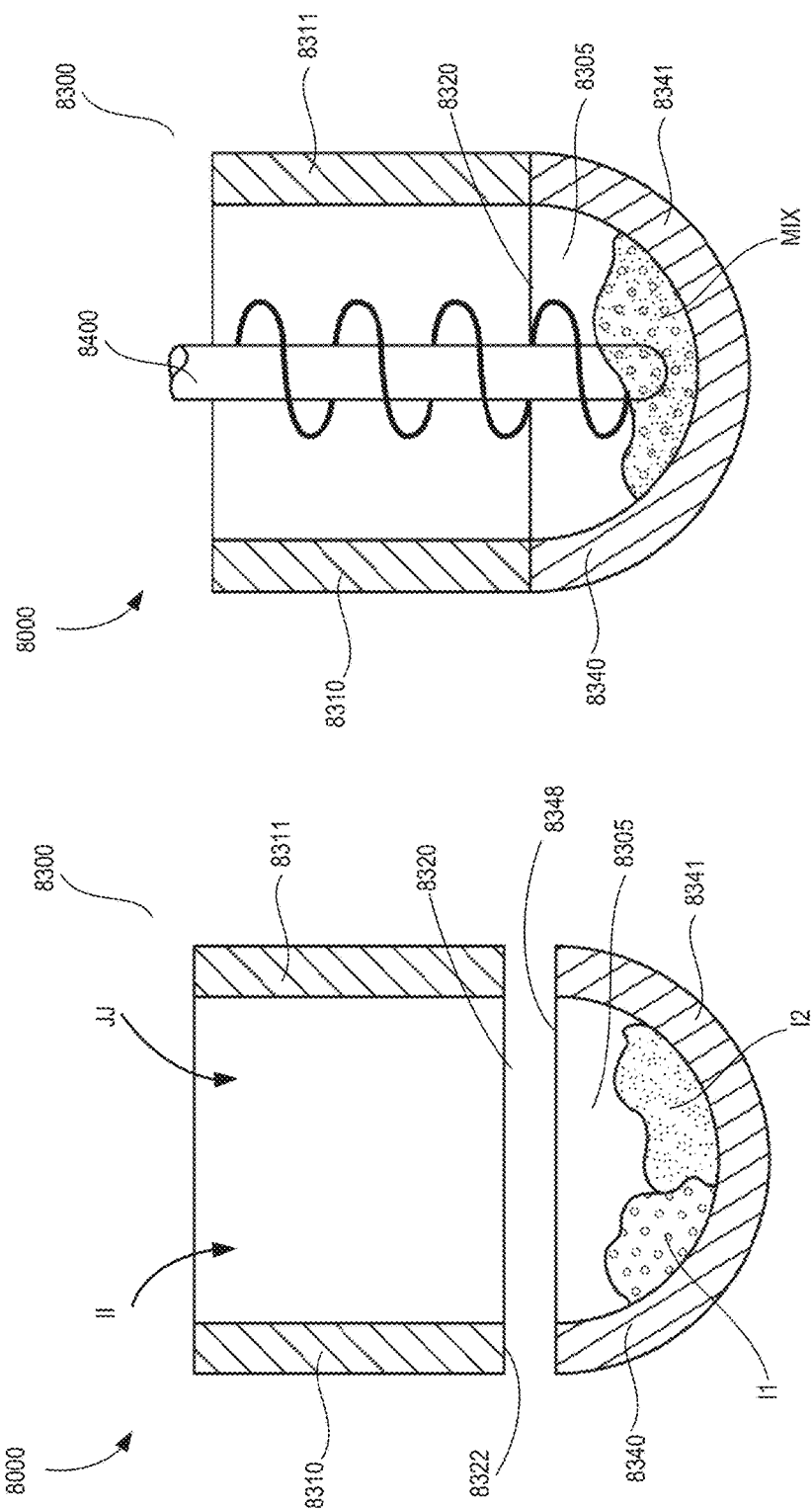

Step 2

Step 4

Step 1

Step 3

US 10,334,984 B2

APPARATUS AND METHODS FOR MAKING BREAD

CROSS-REFERENCE TO RELATED APPLICATIONS

This application claims benefit of priority to U.S. Provisional Application Ser. No. 62/463,856, entitled "Apparatus and Methods for Making Bread," filed Feb. 27, 2017, which is incorporated herein by reference in its entirety.

BACKGROUND

The embodiments described herein relate generally to the field of making bread, specifically flatbread.

Roti, also known as chapatti, is an unleavened flatbread originating from the Indian subcontinent. Although a piece of roti can have any suitable shape (e.g., an irregular shape), many rotis are roughly circular in shape having a diameter within the range of 150 mm to 300 mm and a thickness of between approximately 1mm and 4 mm. The main ingredients used to make roti are flour, water and oil. Additional herbs and seasonings can be added to make the roti more flavorful. Roti is often used in place of a utensil to eat food. The user tears off a small portion of roti, folds it around a piece of food, and pinches the food in order to bring the food from the plate to the user's mouth. Roti can also be used as a wrap where the user places food into the roti, and folds the roti over the food.

The traditional method for cooking roti involves creating a large batch of dough by mixing and kneading the ingredients. A small bit of dough is removed and rolled flat with a rolling pin on a flat surface. The flattened dough is placed on a hot cooking surface, flipped once, and then placed on an open flame to puff the Roti into a nearly spherical shape. The roti is removed from the flame and allowed to return to a flattened state. Finally, the roti is placed in a closed lid container with other pieces of roti until ready to be served. This method involves many steps, is time consuming, and is not well-suited for being automated with existing bread makers.

Most traditional automatic bread makers require that the user manually measure and add all of the ingredients to the machine. These bread makers then mix the ingredients and bake the dough in the same chamber for a fixed amount of time set by the cycle selected by a user. Such known bread makers are not suitable for making flatbread such as roti. For example, although such known bread makers can mix ingredients to produce dough, they are reliant on the user to select and measure the ingredients. This can result in inconsistent baked products, as a result of differences in flour, inaccurate measurements, and the like. Such known bread makers also do not have any mechanism to flatten the dough and cook a flatbread into its final form. Moreover, known bread makers do not have a mechanism to flip dough during the baking process, which is important to producing an authentic roti. For example, by flipping the dough, the dough can be heated from a single side, and the moisture can escape from an upwardly-oriented side (i.e., the "top" side). Known bread makers, however, do not emulate this portion of the cooking process.

Some known bread makers include a mechanism that flattens the dough with two plates (like a press) and then bakes the dough on both sides. Although these devices are acceptable for some flatbreads such as focaccia and tortillas, but they not acceptable for making certain flatbreads such as roti. As described above, when roti is cooked the dough puffs up into a nearly spherical shape which cannot be done in such known flatbread maker devices.

Thus, a need exists for devices and methods of automating the process of making flatbreads, such as roti.

SUMMARY

Devices and methods for automating the process of making a flatbread, such as roti, are disclosed herein. In some embodiments, a method includes inserting an ingredient container into a cooking device. The ingredient container contains a first ingredient and is associated with a machine-readable component storing recipe information associated with the first ingredient. The cooking device is the actuated to A) cause a recipe module of the cooking device to receive the recipe information from the machine-readable component; B) mix a first amount of the first ingredient with a second amount of a second ingredient to produce an ingredient mixture, the first amount and the second amount based on the recipe information; and C) cook the ingredient mixture at a temperature for a cook time, the temperature and the cook time based on the recipe information.

In some embodiments, an apparatus includes a container and a machine-readable component. The container is configured to contain an ingredient, and is configured to be coupled to a cooking device. The machine-readable component is associated with the container, and stores recipe information associated with the ingredient. The recipe information includes at least an amount of the ingredient. An electronic circuit system of the cooking device is configured to receive the recipe information from the machine-readable component. The cooking device is configured to manipulate the container based on the recipe information to convey the amount of the ingredient from the container.

In some embodiments, an apparatus includes a cooking assembly and an actuator assembly. The cooking assembly includes a first platen and a second platen. The first platen has a first flattening mass and a first heating surface. The second platen has a second flattening mass and a second heating surface, and is coupled to the first platen such that the first heating surface and the second heating surface define a platen volume within which an ingredient mixture can be disposed. The actuator assembly is configured to move at least one of the first platen or the second platen to reduce the platen volume to place the cooking assembly in a flattening configuration. The first heating surface and the second heating surface are each configured to contact the ingredient mixture when the cooking assembly is in the flattening configuration. The actuator assembly is configured to rotate at least one of the first platen or the second platen between a first orientation and a second orientation. The first heating surface is below the second heating surface when the cooking assembly is in the first orientation, and the second heating surface is below the first heating surface when the cooking assembly is in the second orientation.

In some embodiments, an apparatus includes a housing, an ingredient metering assembly, a mixing bowl assembly, a mixing actuator assembly, a cooking assembly, and an electronic assembly. The housing defines an interior volume and several access openings with corresponding access lids and/or covers. The ingredient metering assembly includes a flour container assembly, a flour delivery system, a water reservoir, and an oil reservoir. The mixing bowl assembly includes an upper bowl, a lower bowl, and a measurement system. The mixing actuator assembly includes a mixing mount, a mixing motor, a mixing paddle assembly, and a lower motor. The cooking assembly includes a first platen, a second platen, and an actuator assembly. The electronic assembly includes a power source, a control module, and a LCD input/output screen. All of these components are integrated within the housing such that the apparatus is a countertop appliance.

BRIEF DESCRIPTION OF THE DRAWINGS

FIGS. 1 and 2 are schematic illustrations of a cooking device, according to an embodiment.

FIGS. 5-9 are schematic illustrations of a cooking device, according to an embodiment, in a receiving configuration (FIG. 5), a flattening configuration (FIG. 6), a first cooking configuration (FIG. 7), during rotation (FIG. 8), and a second cooking configuration (FIG. 9).

FIGS. 15-17 are schematic illustrations of a container assembly, according to an embodiment, in a measurement configuration (FIG. 15), a mixing configuration (FIG. 16), and a delivery configuration (FIG. 17).

DETAILED DESCRIPTION

Figure 3:
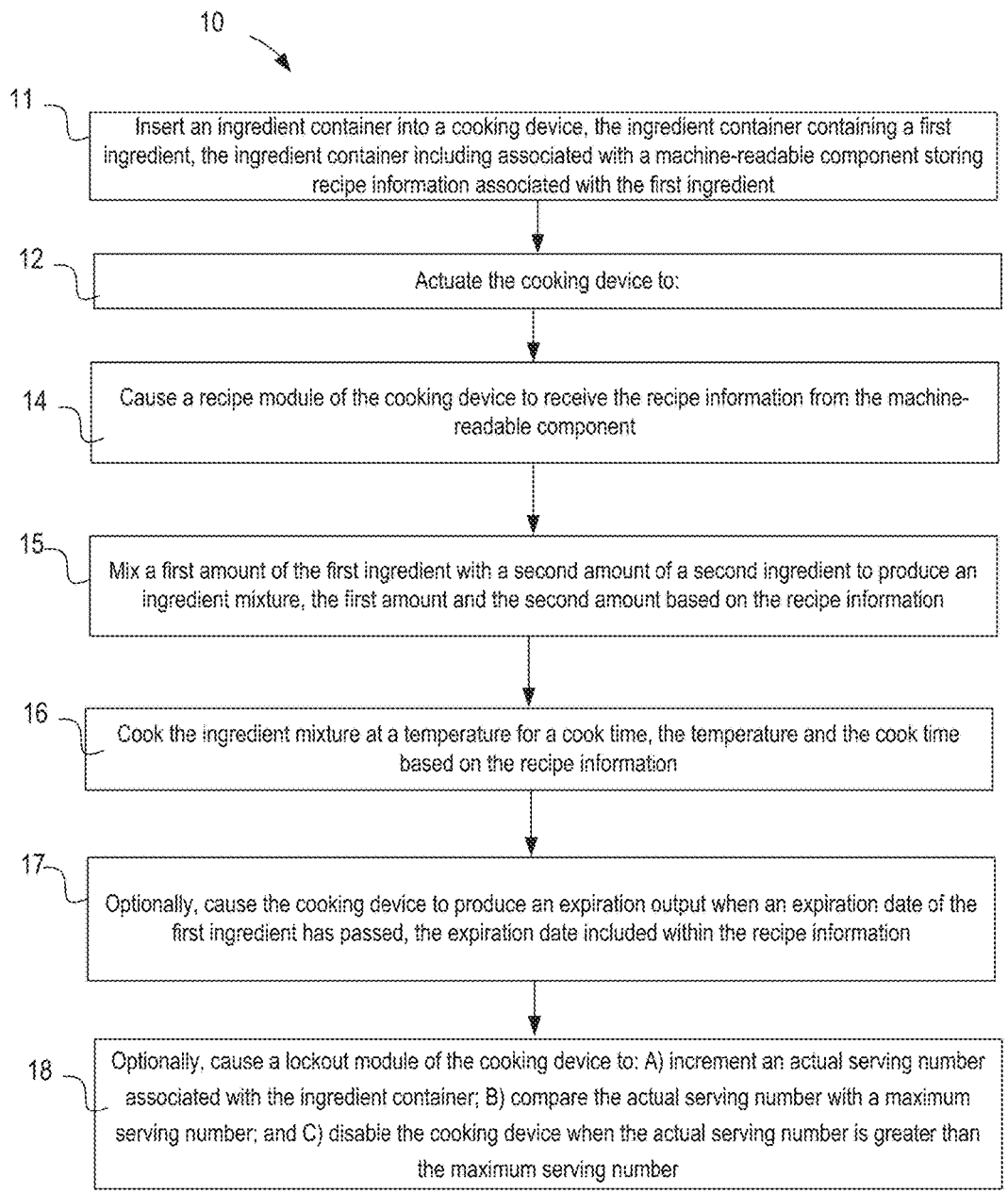
FIG. 3 is a flow chart of a method of cooking an item, according to an embodiment.

The embodiments described herein provide a novel apparatus and methods for automating the process of making flatbread using a countertop appliance. Specifically, devices and methods for automating the process of making a flatbread, such as roti, are described herein. In some embodiments, an apparatus includes a housing, an ingredient metering assembly, a mixing bowl assembly, a mixing actuator assembly, a cooking assembly, and an electronic assembly. The housing defines an interior volume and several access openings with corresponding access lids and/or covers. The ingredient metering assembly includes a flour container assembly, a flour delivery system, a water reservoir, and an oil reservoir. The mixing bowl assembly includes an upper bowl, a lower bowl, and a measurement system. The mixing actuator assembly includes a mixing mount, a mixing motor, a mixing paddle assembly, and a lower motor. The cooking assembly includes a first platen, a second platen, and an actuator assembly. The electronic assembly includes a power source, a control module, and a LCD input/output screen. All of these components are integrated within the housing such that the apparatus is a countertop appliance.

In some embodiments, a method of automating a process of making a flatbread including storing ingredients in separate containers within a housing and then dispensing the ingredients in a specific amount from the separate container into a mixing bowl. The ingredients are then mixed in the mixing bowl to form dough. In some embodiments, the dough is kneaded within the mixing bowl to form a substantially spherical dough ball. At least a portion of the dough is moved from the mixing bowl to a first platen. A second platen is used to flatten the portion of dough on the first platen and the cooking assembly is then heated to cook a first side of the portion of dough for a specific amount of time. The dough is then flipped such that a second side of the portion of dough is then cooked for a specific amount of time. The portion of cooked dough is then deposited into a storage container.

In some embodiments, a method includes inserting an ingredient container into a cooking device. The ingredient container contains a first ingredient and is associated with a machine-readable component storing recipe information associated with the first ingredient. The cooking device is the actuated to A) cause a recipe module of the cooking device to receive the recipe information from the machine-readable component; B) mix a first amount of the first ingredient with a second amount of a second ingredient to produce an ingredient mixture, the first amount and the second amount based on the recipe information; and C) cook the ingredient mixture at a temperature for a cook time, the temperature and the cook time based on the recipe information.

In some embodiments, a computer-implemented method includes receiving, from a machine-readable component of an ingredient container, recipe information associated with a first ingredient stored within the ingredient container. The recipe information includes a first amount of the first ingredient, a second amount of a second ingredient, a cook temperature, and a cook time. A first metering signal associated with the first amount is transmitted to a metering assembly of a cooking device. The metering assembly dispenses the first amount of the first ingredient into a mixing bowl of the cooking device in response to the first metering signal. A second metering signal associated with the second amount is transmitted to the metering assembly. The metering assembly dispenses the second amount of the second ingredient into the mixing bowl in response to the second metering signal. A cook signal associated with the cook temperature and the cook time is transmitted to a cooking assembly of the cooking device. The cooking assembly cooks an ingredient mixture of the first ingredient and the second ingredient based on the cook signal.

In some embodiments, the computer-implemented method includes sending, from a radio of the cooking device, a wireless signal associated with an operation of the cooking device. The wireless signal can be received by a mobile computing device. In some embodiments, the wireless signal is associated with any one of an expiration date, a second recipe information, a quantity of bread, or a low ingredient indicator.

In some embodiments, a computer-implemented method includes receiving, from a machine-readable component of an ingredient container, a first recipe information associated with a first ingredient stored within the ingredient container. The first recipe information includes at least one of first amount of the first ingredient, a second amount of a second ingredient, a cook temperature, and a cook time. A second recipe information is received. The second recipe information includes a target number of cooked items. A first metering signal associated with the first amount is transmitted to a metering assembly of a cooking device. The metering assembly dispenses the first amount of the first ingredient into a mixing bowl of the cooking device in response to the first metering signal. A second metering signal associated with the second amount is transmitted to the metering assembly. The metering assembly dispenses the second amount of the second ingredient into the mixing bowl in response to the second metering signal. A cook signal associated with the cook temperature and the cook time is transmitted to a cooking assembly of the cooking device. The cooking assembly cooks an ingredient mixture of the first ingredient and the second ingredient based on the cook signal. The metering and cooking process (i.e., each of the transmitting the first metering signal, the transmitting the second metering signal, and the transmitting the cook signal) is then repeated based on the target number of cooked items.

In some embodiments, receiving the second recipe information includes receiving a wireless signal associated with the second recipe information from a mobile computing device.

In some embodiments, an apparatus includes a container and a machine-readable component. The container is configured to contain an ingredient, and is configured to be coupled to a cooking device. The machine-readable component is associated with the container, and stores recipe information associated with the ingredient. The recipe information includes at least an amount of the ingredient. An electronic circuit system of the cooking device is configured to receive the recipe information from the machine-readable component. The cooking device is configured to manipulate the container based on the recipe information to convey the amount of the ingredient from the container.

In some embodiments, an apparatus includes an ingredient metering assembly, a mixing assembly, a cooking assembly, and an electronic circuit system. The ingredient metering assembly is configured to convey a first amount of a first ingredient into a mixing volume and a second amount of a second ingredient into the mixing volume. The mixing assembly is configured to mix the first ingredient and the second ingredient to form an ingredient mixture. The cooking assembly includes at least one heating surface, and is configured to cook the ingredient mixture at a cook temperature for a cook time. The electronic circuit system includes a processing device, a memory, a recipe module, a metering module and a cook module. The recipe module is implemented in at least one of the memory or the processing device, and is configured to receive, from a machine-readable component of an ingredient container, recipe information associated with at least the first ingredient stored within the ingredient container. The recipe information includes the first amount of the first ingredient, the second amount of the second ingredient, the cook temperature, and the cook time. The metering module is implemented in at least one of the memory or the processing device, and is configured to produce a first metering signal to actuate the ingredient metering assembly to convey the first amount of the first ingredient into the mixing volume. The metering module is configured to produce a second metering signal to actuate the ingredient metering assembly to convey the second amount of the second ingredient into the mixing volume. The cook module is implemented in at least one of the memory or the processing device, and is configured to produce a cook signal to actuate the cooking assembly to cook the ingredient mixture at the cook temperature for a cook time.

In some embodiments, an apparatus includes a cooking assembly and an actuator assembly. The cooking assembly includes a first platen and a second platen. The first platen has a first flattening mass and a first heating surface. The second platen has a second flattening mass and a second heating surface, and is coupled to the first platen such that the first heating surface and the second heating surface define a platen volume within which an ingredient mixture can be disposed. The actuator assembly is configured to move at least one of the first platen or the second platen to reduce the platen volume to place the cooking assembly in a flattening configuration. The first heating surface and the second heating surface are each configured to contact the ingredient mixture when the cooking assembly is in the flattening configuration. The actuator assembly is configured to rotate at least one of the first platen or the second platen between a first orientation and a second orientation. The first heating surface is below the second heating surface when the cooking assembly is in the first orientation, and the second heating surface is below the first heating surface when the cooking assembly is in the second orientation.

In some embodiments, an apparatus includes a cooking assembly and an actuator assembly. The cooking assembly includes a first platen and a second platen. The first platen has a first flattening mass and a first heating surface. The first heating surface is configured to rotate relative to the first flattening mass. The second platen includes a second flattening mass and a second heating surface. The second platen is coupled to the first platen such that the first heating surface and the second heating surface define a platen volume within which an ingredient mixture can be disposed. The actuator assembly is configured to move at least one of the first platen or the second platen to transition the cooking assembly from a receiving configuration to a flattening configuration. The first heating surface is nonparallel to the second heating surface when the cooking assembly is in the receiving configuration. The first heating surface and the second heating surface are each configured to contact the ingredient mixture to limit movement of the ingredient mixture within the platen volume when the cooking assembly is in the receiving configuration. The first heating surface is parallel to the second heating surface when the cooking assembly is in the flattening configuration. The first heating surface and the second heating surface each configured to exert a press force on the ingredient mixture when the cooking assembly is in the flattening configuration.

In some embodiments, a method includes conveying an ingredient mixture into a platen volume defined by a cooking assembly. The cooking assembly includes a first platen and a second platen, and the platen volume is defined between a first heating surface of the first platen and a second heating surface of the second platen. At least one of the first platen or the second platen is moved to place the cooking assembly in a flattening configuration. The first heating surface and the second heating surface are each in contact with the ingredient mixture when the cooking assembly is in the flattening configuration. The cooking assembly is rotated between a first orientation and a second orientation. The first heating surface is below the second heating surface when the cooking assembly is in the first orientation. The second heating surface is below the first heating surface when the cooking assembly is in the second orientation.

In some embodiments, an apparatus includes a container assembly that includes a first container and a second container. The container can be used in any of the cooking devices described herein. The first container and the second container define a mixing volume within which a first ingredient and a second ingredient can be mixed to produce an ingredient mixture. At least one of the first container or the second container includes a coupling portion configured to movably couple the second container to the first container. The container assembly is configured to transition between a measurement configuration, a mix configuration, and a delivery configuration. The second container is unsupported by the first container when the container assembly is in the measurement configuration. A first seal surface of the first container is in contact with a second seal surface of the second container when the container assembly is in the mix configuration. The first seal surface is spaced apart from and defining a tilt angle with the second seal surface when the container assembly is in the delivery configuration.

In some embodiments, the coupling portion of the first container defines an elongated slot. The second container is coupled to the first container by a pin disposed within the elongated slot. The second container configured to rotate relative to the first container about the pin when the container assembly is moved between the mix configuration and the delivery configuration. The elongated slot allows the second container to be coupled to, but unsupported by the first container when the container assembly is in the measurement configuration.

In some embodiments, the apparatus also includes a container actuator assembly configured to manipulate the second container to transition the container assembly between the measurement configuration, the mix configuration, and the delivery configuration. An outer surface of second container is configured to contact a platform of the container actuator assembly. In some embodiments, the container actuator assembly includes a motor and a load cell. The motor is configured to move the platform to exert a force on the second container to maintain the second seal surface in contact with the first seal surface when the container assembly is in the mix configuration. The load cell is configured to support the second container when the container assembly is in the measurement configuration, and produces a signal associated with an amount of at least the first ingredient within the container assembly.

In some embodiments, the apparatus also includes a mixing actuator assembly configured to mix the first ingredient and the second ingredient within the mixing volume to produce the ingredient mixture when the container assembly is in the mix configuration. In some embodiments, the mixing actuator assembly includes a paddle having a first portion and a second portion. The first portion is configured to rotate relative to the container assembly. The second portion configured to move relative to the first portion to produce the ingredient mixture.

The term "about" when used in connection with a referenced numeric indication means the referenced numeric indication plus or minus up to 10 percent of that referenced numeric indication. For example, "about 100" means from 90 to 110.

As used herein, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

As used herein, a "set" can refer to multiple features or a singular feature with multiple parts. For example, when referring to set of walls, the set of walls can be considered as one wall with distinct portions, or the set of walls can be considered as multiple walls.

FIGS. 1 and 2 are schematic illustrations of a cooking system 5000 (also referred to herein as a "cooking device 5000") according to an embodiment. The cooking system 5000 includes a housing 5100 that contains a metering assembly 5200 (also referred to as an ingredient metering assembly), a mixing assembly 5300, and a cooking assembly 5500. The cooking system also includes an electronic circuit system 5900, which can be coupled to or contained within the housing 5100. The cooking system also includes an ingredient container 5205 that is coupled to and/or received within the housing 5100, and that provides at least a portion of the ingredients to for processing by the cooking assembly 5000. The cooking system 5000 can be any of the cooking systems described herein. For example, the cooking system 5000 can be a cooking system similar to the cooking system 3000 or the cooking system 1000 described below. As described herein, the cooking system 5000 automatically or semi-automatically completes all steps in the cooking process, including metering of the ingredients, mixing of the ingredients, and cooking of the mixed ingredients to prepare a cooked item. Specifically, the cooking system 5000 (and the associated methods) provides an end-to-end method of preparing cooked items with minimal user input. For example, in some embodiments, the user can load the ingredient container 5505 into the housing 5100 and simply press a "start" button to begin the preparation process. The cooking system 5000 can then, without further user input, complete all processes to prepare the cooked item. In some embodiments, the "start" button can be included within the electronic circuit system 5900, and can also indicate a desired quantity (or number) of cooked items (e.g., three items, four items, etc.). In other embodiments, the "start" button can be a virtual button conveyed to the user via a mobile computing device (e.g., a smart phone). In such embodiments, a wireless signal to start the process can be conveyed from the mobile computing device to the electronic circuit system. In this manner, the user can control and/or monitor the bread making process via an application stored locally on their smart phone that provides detailed instructions unique to that user.

Although described herein as flat bread, any of the cooked items described herein can be, for example, a bread product (identified as BR in FIG. 2) of any type, including flatbread, tortillas, bagels, or pita bread. The cooked item need not be limited to flour-based breads, but can include baked products of any type, including, but not limited to corn-based bread, rice products, or other gluten-free baked products.

The ingredient container 5205 includes a package 5210 within which an ingredient is contained, and a machine-readable component 5227. The ingredient can be a solid or substantially dry ingredient, such as, for example, a mixture of dry flour, dry corn meal, and/or seasonings used for a bread product. In other embodiments, the ingredient can be a liquid, flowable paste, or slurry. For example, in some embodiments, the ingredient within the package 5210 can include water, oil, vegetable extract, or other liquid or semi-liquid constituents. Moreover, as described below, in some embodiments, the ingredient within the package 5210 can be mixed with other ingredients to form an ingredient mixture. For example, in some embodiments, the ingredient within the package 5210 can be a substantially dry ingredient that is mixed with predetermined amounts of oil and water that are supplied to the cooking system 5000 by other means. For example, in some embodiments, the cooking system 5000 can include one or more reservoirs (not shown) that store additional ingredients. Thus, the ingredient within the ingredient container 5205 need not be the only ingredient used in preparing the cooked product.

The package 5210 can be any suitable structure that contains the ingredient and that can be coupled to or engaged with the housing 5100 and/or the cooking system 5000. For example, in some embodiments, the package 5210 (and any of the ingredient packages or containers described herein) can be a rigid container that is not deformed during delivery of the ingredients from the package 5210 via the metering assembly 5200 into the mixing assembly 5300. Such rigid containers can include, for example, rigid tubes, boxes, vials, or the like, that are constructed from cardboard, plastic, glass, or any suitable compatible material. In other embodiments, the package 5210 (and any of the ingredient packages or containers described herein) can be a flexible container that is deformed during delivery of the ingredients from the package 5210 via the metering assembly 5200 into the mixing assembly 5300. Such flexible containers can include, deformable tubes (e.g., squeeze tubes), flexible pouches, or the like. Such flexible containers can be manipulated and deformed by the metering assembly 5200 to convey a desired amount of the ingredient from the package 5210 into the mixing assembly 5300.

The machine-readable component 5227 (also referred to as a machine-readable tag, tag, or chip) is coupled to the package 5210 and stores (is associated with or encoded with) recipe information associated with the ingredient. The machine-readable component 5227 (or any of the machine-readable components described herein) can be any suitable component that can be read by or that can transmit information to the electronic circuit system 5900. For example, in some embodiments, the machine-readable component 5227 (or any of the machine-readable components described herein) can be a bar code, a QR Code™ and/or an address of a website. In other embodiments, the machine-readable component 5227 (or any of the machine-readable components described herein) can be a radio frequency identification (RFID) tag configured to output an electronic signal that is read by the electronic circuit system 5900 (e.g., by the recipe module 5931 or any other module of the electronic circuit system 5900). Such RFID tags can be read-only, or can also be writable, and can be either a passive RFID tag or an active RFID tag. In yet other embodiments, the machine-readable component 5227 (or any of the machine-readable components described herein) can be any other suitable tag or chip configured to output an electronic signal that is read by the electronic circuit system 5900.

In some embodiments, the machine-readable component 5227 can also be a writable component. In other words, in some embodiments, the electronic circuit system 5900 can write information to the machine-readable component 5227, such as, for example, to increment a quantity of cooked items prepared, a date stamp, a time stamp, or the like. In this manner, when the ingredient container 5205 is used in subsequent operations (and/or with different cooking systems), the updated information can be read into the electronic circuit system 5900.

Although the machine-readable component 5227 is shown as being coupled to the package 5210 that is directly placed into the housing 5100, in other embodiments, the machine-readable component 5227 (and any of the machine-readable components described herein) can be coupled to any portion of the ingredient container 5205. For example, in some embodiments, the ingredient container 5205 can include an outer package (not shown) or peelable label to which the machine-readable component 5227. In such embodiments, for example, the outer package or peelable label can be removed from about the package 5210 and placed in proximity to the electronic circuit system 5900.

The recipe information can include any suitable information that is read by the electronic circuit system 5900, and that is associated with the preparation of one or more cooked items. For example, in some embodiments, the recipe information can include an amount of the ingredient used in the preparation of one cooked item (e.g., a weight of flour used to prepare one roti). In other embodiments, the recipe information can include an amount of additional ingredients (i.e., those not included within the package 5210, such as, for example, oil and water) used in the preparation of one cooked item. Such additional amounts can be unique to the specific ingredient contained within the package. For example, in some embodiments, the recipe information can include one or more characteristics of the ingredient contained within the package 5210, such as, a moisture content, a granularity of the ingredient, a specific type of the ingredient (e.g., type of flour), or the like. In such instances, the additional amounts of other ingredients may be dependent on such characteristics, and therefore may vary for different packages.

In some embodiments, the recipe information can include any information associated with the metering, mixing, or cooking of the ingredients (including those stored within the package 5210 or those received from other sources). For example, in some embodiments, the recipe information can include a cook time and/or temperature associated with the ingredient used in the preparation of one cooked item. In other embodiments, the recipe information can include a mixing time or mixing speed associated with the ingredient used in the mixing of the ingredients.

In some embodiments, the recipe information can include an expiration date of the ingredient contain within the package 5210. In this manner, as described herein, the electronic circuit system 5900 (e.g., the input/output module 5934) can produce an expiration output when the expiration date has passed.

In some embodiments, the recipe information can include a maximum quantity or maximum number of services associated with the package 5210. For example, in some embodiments, the ingredient container 5205 can store an amount of the ingredient sufficient to make any suitable number of cooked items. For example, in some embodiments, the ingredient container 5205 can contain a sufficient amount of flour to make up to forty roti. Accordingly, the recipe information can include this maximum quantity (e.g., the total number of cooked items available from the ingredient container 5205 and/or the total weight of the ingredient available for use). In this manner, the electronic circuit system 5900 can increment (or count) the total number of cooked items produced from the ingredient container 5205. In some embodiments, the cooking system 5000 and/or the electronic circuit system 5900 can include a "lockout module" that compares the actual serving number (or quantity of cooked items prepared) with the maximum serving number (or maximum quantity), and can disable the cooking device 5000 when the actual serving number (or quantity) is greater than the maximum serving number (or maximum quantity). In this manner, the cooking system 5000 can limit the likelihood that counterfeit (or non-authorized) ingredient containers can be used. This advantageously reduces the likelihood that ingredients of a lesser quality or ingredients that are not appropriate for the given recipe information will be used.

In some embodiments, all or a portion of the recipe information can be encrypted. In such embodiments, the electronic circuit system 5900 (e.g., the recipe module 5931) can decrypt the recipe information. In this manner, the cooking system 5000 can limit the likelihood that the recipe information will be received by an unauthorized system, overwritten, or otherwise used improperly. This advantageously enhances the quality of the cooked items by maintaining the integrity of the recipe information.

The ingredient metering assembly 5200 is configured to convey a first amount of the ingredient from the ingredient container 5205 into the mixing assembly 5300. The ingredient metering assembly 5200 is also configured to convey a first amount of the ingredient from the ingredient container 5205 into the mixing assembly 5300. The ingredient metering assembly 5200 functions to supply the ingredients necessary to produce the cooked item, and can be similar to any of the ingredient metering (or supply) assemblies shown and described herein. For example, in some embodiments, the ingredient metering assembly 5200 can include one or more electronically controlled valves (e.g., to deliver a liquid ingredient), one or more pumps (e.g., a peristaltic pump, a piston pump, or the like, to delivery one or more ingredients), and one or more motors (e.g., to manipulate the ingredient container 5205). The ingredient metering assembly 5200 can also include one or more scales configured to measure an amount of an ingredient conveyed, based on the recipe information. The ingredient metering assembly 5200 can be, for example, the ingredient metering assembly 1200 or the ingredient metering assembly 3200.

The mixing assembly 5300 is configured to mix at least the first ingredient and the second ingredient to form an ingredient mixture. The mixing assembly 5300 can be similar to any of the ingredient metering (or supply) assemblies shown and described herein, such as the mixing bowl assembly 1300 and the mixing assembly 3300. In some embodiments, the mixing assembly 5300 can include a bowl or other structure that defines a mixing volume (not shown in FIGS. 1 and 2) within which the ingredients can be mixed. The bowl or other structure can include any suitable features to facilitate mixing, such as, for example, ribs, contoured surfaces, or the like. Moreover, the mixing assembly 5300 can include one or more movable components that mix, stir, or agitate the ingredients within the mixing volume. For example, in some embodiments, the mixing assembly 5300 (and any of the mixing assemblies described herein) can include a motor (e.g., a stepper motor) that moves the bowl or structure that defines the mixing volume. In this manner, the mixing assembly 5300 can include a vibratory mixing function to prepare the ingredient mixture. In other embodiments, the mixing assembly 5300 can include a movable blade, paddle, or whisk that moves relative to (and within) the mixing volume.

The cooking assembly 5500 is configured to heat the ingredient mixture to produce the cooked item. Similarly stated, the cooking assembly 5500 is configured to cook the ingredient mixture produced by the mixing assembly 5300 at a cook temperature and for a cook time to produce the desired type of cooked item. The cooking assembly 5500 (and any of the cooking assemblies described herein) can heat (or cook) the ingredient mixture in in any suitable manner, such as, for example, by baking, broiling, frying, or any other known cooking technique. Thus, the cooking assembly 5500 includes at least one heating surface (not shown) that can heat the ingredient mixture to the desired temperature to produce the cooked item (shown as the item BR in FIG. 2). The cooking assembly 5500 can be similar to any of the ingredient metering (or supply) assemblies shown and described herein, such as the cooking assembly 1500 and the cooking assembly 3500. In some embodiments, the cooking assembly 5500 can include one or more platens or heating surfaces of the types shown and described herein. In some embodiments, the cooking assembly 5500 can include any number of sensors (e.g., thermistors, thermocouples, or the like) to provide feedback to the electronic circuit system 5900.

The electronic circuit system 5900 can be coupled to and/or within a housing 5100 or any other portion of the cooking system 5000. The electronic circuit system 5900 includes a processor 5921, a memory 5922, one or more sensors (e.g., temperature sensors, mass sensors, etc.; not shown), and any other electronic components to accomplish the functions described herein. For example, in some embodiments, the electronic circuit system can include an of a radio, an antenna, and/or a transceiver to send and/or receive wireless signals associated with the operation of the cooking system 5000 (e.g., via the input/output module 5934). As shown in FIGS. 1 and 2, the electronic circuit system 5900 also includes a recipe module 5931, a mix module 5932 (also referred to as a metering module), a cook module 5933, and an input/output module 5934. Although shown as including each of these application modules, in other embodiments, an electronic circuit system need not include all (or any) of these modules, and can include any other modules described herein. For example, in some embodiments, an electronic circuit system of a cooking system includes only a recipe module 5931 and a cook module 5933, and is configured to perform the methods of flipping the ingredient mixture during cooking, as disclosed herein. Alternatively, in other embodiments, an electronic circuit system includes only the recipe module 5931 and the mix module 5932.

The processor 5921, and any of the processors described herein can be any suitable processor for performing the methods described herein. In some embodiments, processor 5921 can be configured to run and/or execute application modules, processes and/or functions associated with the cooking system 5000. For example, the processor 5921 can be configured to run and/or execute the recipe module 5931, the mix module 5932, the cook module 5933, the input/output module 5934, and/or any of the other modules described herein, and perform the methods associated therewith. The processor 5921 can be, for example, a Field Programmable Gate Array (FPGA), an Application Specific Integrated Circuit (ASIC), a Digital Signal Processor (DSP), and/or the like. The processor 5921 can be configured to retrieve data from and/or write data to memory, e.g., the memory 5922. In some embodiments, the processor 5921 can cooperatively function with a radio (not shown) and/or execute instructions from code to provide signals to communicatively couple the electronic circuit system 5900 to a remote computing device, as shown in FIG. 2 (e.g., via wireless communication). In some embodiments, the processor 5921 is a Bluetooth® low energy (BLE) processor, for example a processor suitable or configured specifically to execute the Bluetooth® v4.0 low energy stack.

The memory 5922 can be, for example, random access memory (RAM), memory buffers, hard drives, databases, erasable programmable read only memory (EPROMs), electrically erasable programmable read only memory (EEPROMs), read only memory (ROM), flash memory, hard disks, floppy disks, cloud storage, and/or so forth. In some embodiments, the memory 5922 stores instructions to cause the processor 5921 to execute modules, processes and/or functions associated with the cooking system 5000. For example, the memory 5922 can store instructions to cause the processor 5921 to execute any of the application modules described herein, and perform the methods associated therewith.

The recipe module 5931 can be a hardware and/or software module (stored in memory 5922 and/or executed in the processor 5921). The recipe module 5931 is configured to receive the recipe information from the machine-readable component 5227 of the ingredient container 5205. The recipe module 5931 can store the recipe information in the memory 5922, and can also include additional information associated with the recipe information, such as, for example, adjustments in the cook time, adjustments in the cook temperature (e.g., to compensate for altitude changes), etc. The recipe module 5931 interacts with (or functions cooperatively with) the input/output module 5934 to receive the recipe information. For example, in some embodiments, the input/output module 5931 receives the recipe information from an antenna of the electronic circuit system 5900. In other embodiments, the input/output module 5931 receives the recipe information via an optical scanner of the electronic circuit system 5900.

The mix module 5932 (also referred to as a metering module) can be a hardware and/or software module (stored in memory 5922 and/or executed in the processor 5921). The mix module 5932 is configured to produce a first metering signal to actuate the ingredient metering assembly 5200 to convey the first amount of the first ingredient, based on the recipe information (which includes the first amount), into the mixing volume. The first metering signal can be, for example, an electrical signal received by a motor, a valve, or any other electromechanical device that conveys the first ingredient from the ingredient container 5205 into the mixing volume. For example, in some embodiments, the ingredient metering assembly 5200 includes a motor that manipulates and/or moves the ingredient container 5205 in response to the first metering signal to convey the first amount of the first ingredient into the mixing volume. The motor (not shown) can, for example, rotate the package 5210, move a plunger within the package 5210, deform the package 5210, or otherwise manipulate the package 5210 to convey the first ingredient from therein. The mix module 5932 is configured to produce a second metering signal to actuate the ingredient metering assembly 5200 to convey the second amount of the second ingredient, based on the recipe information (which includes the second amount), into the mixing volume. The second ingredient can be stored outside of the ingredient container 5205. For example, in some embodiments, the second ingredient can be a liquid, such as oil or water, that is stored within a reservoir (not shown) of the cooking system 5000. The second metering signal can be, for example, an electrical signal received by a motor, a valve, or any other electromechanical device that conveys the second ingredient into the mixing volume. For example, in some embodiments, the ingredient metering assembly 5200 includes a valve that, when actuated in response to the second metering signal, allows a flow of the second ingredient into the mixing volume.

In some embodiments, the mix module 5932 can produce a mix signal to actuate the mixing assembly 5300 to mix the first ingredient and the second ingredient within the mixing volume to produce an ingredient mixture. The mix signal can be, for example, an electrical signal received by a motor, a valve, or any other electromechanical device that mixes, agitates, and/or stirs the ingredients within the mixing volume. For example, in some embodiments, the mixing assembly 5300 includes a motor that manipulates and/or moves a mixing member (not shown) in response to the mixing signal to mix the ingredients within the mixing volume. The mix module 5932 can control the characteristics of the mixing process, such as the mixing speed, duration, or the like.

The cook module 5933 can be a hardware and/or software module (stored in memory 5922 and/or executed in the processor 5921). The cook module 5933 is configured to produce a one or more cook signals to actuate the cooking assembly 5500 to cook the ingredient mixture. The cook signals can be, for example, an electrical signal received by a motor, a heating element, or any other device that can flatten the ingredient mixture, heat the ingredient mixture for a predetermined time, or the like. For example, in some embodiments, the cooking assembly 5500 includes a first platen having a first heating surface and a second platen having a second heating surface. The cook module 5933 can produce a first cook signal that heats the first heating surface to cook a first side of the ingredient mixture for a first amount of time. The cook module 5933 can produce a second cook signal that heats the second heating surface to cook a second side of the ingredient mixture for a second amount of time. In other embodiments, the cooking assembling can include a platen actuator assembly (not shown) configured to rotate the cooking assembly between a first orientation and a second orientation. The first heating surface is below the second heating surface when the cooking assembly is in the first orientation, and the second heating surface is below the first heating surface when the cooking assembly is in the second orientation. The cook module 5933 can produce a cook signal received by the platen actuator assembly, which then rotates the cooking assembly between the first orientation and the second orientation. In this manner, the cook module 5933 can control the flipping or rotating of the ingredient mixture during the cooking process.

The input/output module 5934 can be a hardware and/or software module (stored in memory 5922 and/or executed in the processor 5921). The input/output module 5934 is configured to receive one or more signals (e.g., from the machine-readable tag 5527, from a mobile device, or from a user interface). The signals can be associated with the recipe information, a start timer, a number of cooked items to be produced or the like. For example, in some embodiments, the user can scan or otherwise read the machine-readable tag 2227 using either a portion of the control system 2900 or a mobile communication device (e.g., a cellular phone) to access instructions. In other embodiments, the user's cellular phone can be placed in communication with (or "paired with") the input/output module 5934. In this manner, the user can control and/or monitor the cooking process via an application stored locally on their mobile phone that provides detailed instructions unique to that user.

The input/output module 5934 is configured to produce one or more output signals. Such output signals can include, for example, signals to produce a light output or a sound output (see, e.g., FIG. 2). In other embodiments, an output signal produced by the input/output module 5934 can a wireless signal to be received by a mobile computing device. The input/output module 5934 interacts with (or functions cooperatively with) a radio to produce such wireless signals. Such wireless signals can be any suitable type of signal, and can be produced according to any suitable protocol. For example, in some embodiments, the input/output module 5934 can produce a short-range wireless signal (e.g., according to the Bluetooth® protocol).

In some embodiments, the input/output module 5934 is configured to produce an expiration output when an expiration date associated with the ingredient container 5205 has passed.

FIG. 3 is a flow chart of a method 10 of preparing a cooked item, according to an embodiment. The method 10 can be performed by the cooking system 5000 or any of the cooking systems described herein (e.g., the cooking system 1000 or the cooking system 3000). Moreover, although the method 10 is described in connection with the recipe module 5931, the mix module 5932, and/or the cook module 5934, in other embodiments, the method 10 can be performed in connection with any module described herein. The method 10 includes inserting an ingredient container into a cooking device (e.g., the cooking system 5000), at 11. The ingredient container can be, for example, the ingredient container 5205, and contains a first ingredient. Additionally, the ingredient container is associated with a machine-readable component (e.g., the machine-readable component 5227) storing recipe information associated with the first ingredient. The recipe information can be any of the recipe information described herein, such as for example, a a first amount of the first ingredient, a second amount of a second ingredient, a cook temperature, and/or a cook time.

The cooking device is then actuated, at 12, to perform the following functions. First, a recipe module of the cooking device receives the recipe information from the machine-readable component, at 14. The recipe module can be, for example, the recipe module 5931 as described above. Next, a first amount of the first ingredient is mixed with a second amount of a second ingredient to produce an ingredient mixture, at 15. The first amount and the second amount are based on the recipe information. In this manner, the recipe information read in by the cooking device can be used to automatically (or semi-automatically) mix the desired ingredients. Similarly stated, in some embodiments, the method includes mixing the first amount and the second amount without a user input (e.g., beyond simply actuating the device). In some embodiments, the mixing can be controlled by the mix module 5932 as described above. The ingredient mixture is then cooked at a temperature for a cook time, at 16. The temperature and the cook time are based on the recipe information. In this manner, the recipe information read in by the cooking device can be used to automatically (or semi-automatically) cook the desired ingredients. In some embodiments, the cooking can be controlled by the cook module 5932 as described above. Similarly stated, in some embodiments, the method includes cooking the ingredient mixture amount without a user input (e.g., beyond simply actuating the device).

In some embodiments, upon actuating the cooking device, the device optionally produces an expiration output when an expiration date has passed, at 17. The expiration date can be included within the recipe information. In this manner, the method can limit the likelihood that expired ingredients are used to make the cooked item(s).

In some embodiments, the recipe information includes a maximum serving number (or quantity) associated with the ingredient container. In such embodiments, the actuating the cooking device further causes a lockout module of the cooking device to perform additional functions, at 18. Specifically, the lockout module can A) increment an actual serving number associated with the ingredient container; B) compare the actual serving number with the maximum serving number; and C) disable the cooking device when the actual serving number is greater than the maximum serving number.

The cooking device can be actuated by manually pressing a start button on the cooking device. In other embodiments, the cooking device can be actuated by receiving a start signal from a mobile computing device, or any other suitable mechanism. For example, in some embodiments, the cooking device can be actuated by indicating (or selecting) a number of cooked items to be prepared. In such embodiments, the method can be repeated a desired number of times based on the number of cooked items to be prepared.

Figure 4:
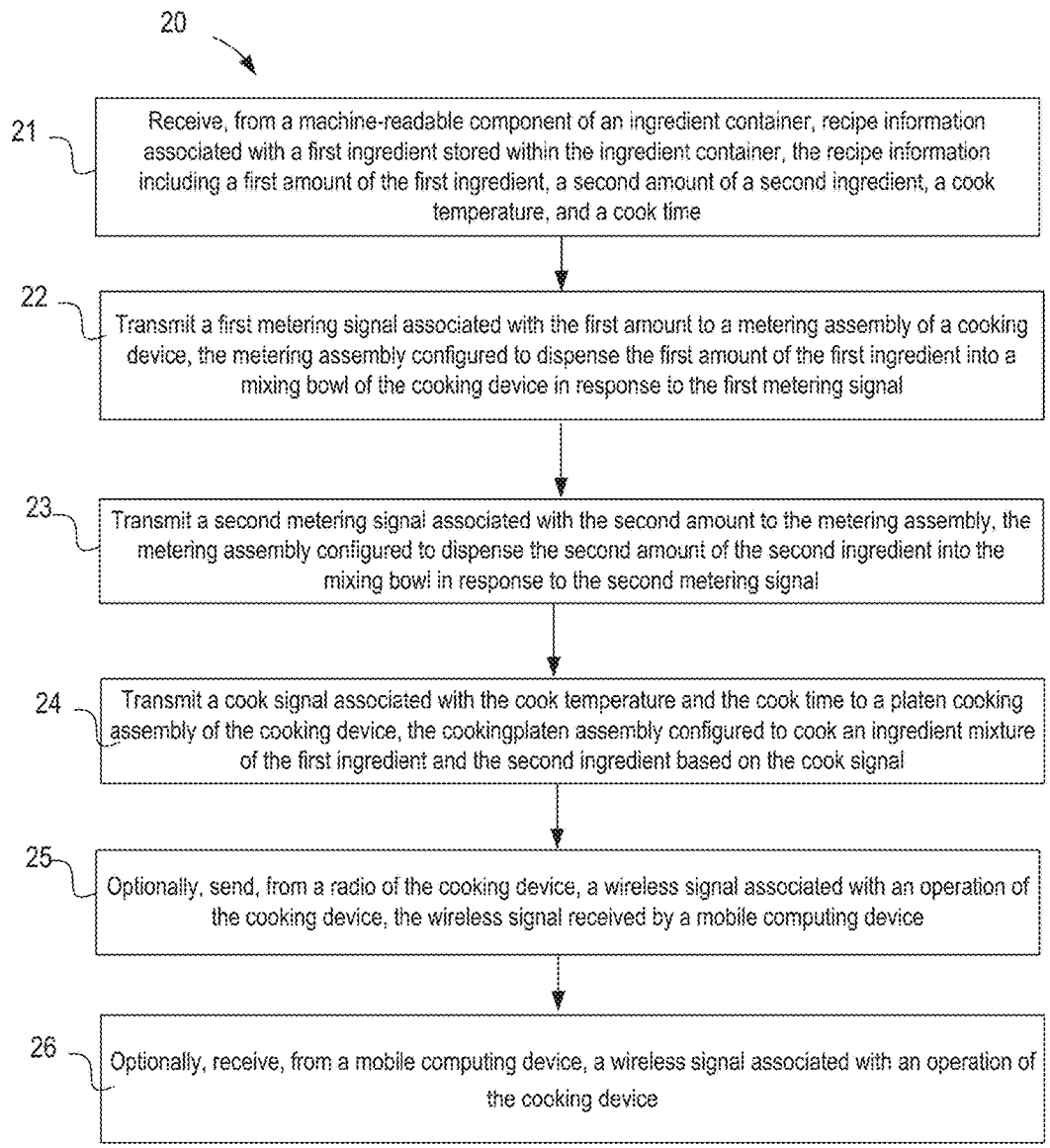
FIG. 4 is a flow chart of a method of cooking an item, according to an embodiment.

FIG. 4 is a flow chart of a method 20 of preparing a cooked item, according to an embodiment. The method 20 can be performed by the cooking system 5000 or any of the cooking systems described herein (e.g., the cooking system 1000 or the cooking system 3000). Moreover, although the method 20 is described in connection with the recipe module 5931, the mix module 5932, and/or the cook module 5934, in other embodiments, the method 20 can be performed in connection with any module described herein. The method 20 includes receiving, from a machine-readable component of an ingredient container, recipe information associated with a first ingredient stored within the ingredient container, at 21. The machine-readable component can be any of the machine-readable components described herein, including the machine-readable component 5227. In some embodiments, the machine-readable component can be any one of a wirelessly machine-readable component, a radio frequency identification (RFID) tag, a bar code, or a Quick Response (QR) code. The recipe information includes a first amount of the first ingredient, a second amount of a second ingredient, a cook temperature, and a cook time.

A first metering signal associated with the first amount is transmitted to a metering assembly of a cooking device, at 22. The metering assembly, which can be the metering assembly 5200 or any other metering assemblies described herein, is configured to dispense the first amount of the first ingredient into a mixing volume (or bowl) of the cooking device in response to the first metering signal. A second metering signal associated with the second amount is transmitted to the metering assembly, at 23. The metering assembly is configured to dispense the second amount of the second ingredient into the mixing bowl in response to the second metering signal. In some embodiments, the method can include receiving a feedback signal associated with either the first amount or the second amount, and adjusting either the first metering signal or the second metering signal in response to the feedback signal.

A cook signal associated with the cook temperature and the cook time is then transmitted to a cooking assembly of the cooking device, at 24. The cooking assembly, which can be the cooking assembly 5500 or any other cooking assembly described herein, is configured to cook an ingredient mixture of the first ingredient and the second ingredient based on the cook signal. In some embodiments, the cook signal can cause the cooking assembly to selectively heat one or more heating surfaces, as described herein. In some embodiments, the cook signal can cause the cooking assembly to flip or rotate one or more cooking surface (including the ingredient mixture), as described herein.

In some embodiments, the method optionally includes sending, from a radio of the cooking device, a wireless signal associated with an operation of the cooking device, at 25. The wireless signal can be received by a mobile computing device, as shown for example, in FIG. 2. In some embodiments, the method optionally includes receiving, from a mobile computing device, a wireless signal associated with an operation of the cooking device, at 26.

FIGS. 5-9 are schematic illustrations of a portion of a cooking system 6000 (also referred to herein as a "cooking device 6000") according to an embodiment. The cooking system 6000 includes a housing or support surface 6150 that can support the cooking system 6000 on a countertop or other work surface. Thus, the cooking system 6000 can be a portable countertop appliance used to produce one or more cooked items, as described herein. The cooking system 6000 includes cooking assembly 6500 and a platen actuator assembly 6550. As described herein, the cooking assembly 6500 is designed to press, cook, and flip an ingredient mixture (e.g., dough) to produce a cooked item (e.g., a flat bread). The cooking assembly 6500 can be included within any of the cooking systems described herein. For example, the cooking assembly 6500 can be a cooking assembly similar to those shown in connection with the cooking system 3000 described or the cooking system 1000 described below. Specifically, as described herein, the cooking assembly 6500 flips (or rotates) the ingredient mixture during cooking to emulate the manual cooking process. The cooking assembly 6500 is configured to cook the ingredient mixture one side-at-a-time at a cook temperature and for a cook time to produce the desired type of cooked item. The cooking assembly 6500 (and any of the cooking assemblies described herein) can heat (or cook) the ingredient mixture in in any suitable manner, such as, for example, by baking, broiling, frying, or any other known cooking technique. Although the cooked item is described herein as flat bread, any of the cooked items described herein can be, for example, a bread product of any type, including flatbread, tortillas, bagels, or pita bread. The cooked item need not be limited to flour-based breads, but can include baked products of any type, including, but not limited to corn-based bread, rice products, or other gluten-free baked products.

Referring to FIG. 5, the cooking assembly 6500 includes a first platen 6510 and a second platen 6530. The first platen 6510 and the second platen 6530 can include generally flat surfaces that can exert a pressure or force on an ingredient mixture MIX to flatten, press, or otherwise manipulate the ingredient mixture MIX for cooking. The first platen 6510 has a first flattening mass 6511 and a first heating surface 6520. The second platen has a second flattening mass 6531 and a second heating surface 6540. The first flattening mass 6511 and the second flattening mass 6531 can be any suitable structure that can transfer a force to the ingredient mixture MIX to flatten, shape, or otherwise press the ingredient mixture. For example, in some embodiments, either or both of the first flattening mass 6511 and the second flattening mass 6531 can be flat rigid structures that can exert a press force of at least 200 pounds (890 N), 400 pounds (1.78 kN), 500 pounds (2.22 kN), or 600 pounds (2.67 kN). In some embodiments, either or both of the first flattening mass 6511 and the second flattening mass 6531 can be contoured to ensure that the maximum force is applied evenly across the surface of the platens. In other embodiments, either or both of the first flattening mass 6511 and the second flattening mass 6531 can be coupled to the platen actuator assembly 6550 via multiple locations to ensure spatial uniformity of the applied force. The first heating surface 6520 and the second heating surface 6540 can include suitable structure, heating elements, or the like to heat the ingredient mixture MIX to produce a cooked item. For example, in some embodiments, either or both of the first heating surface 6520 and the second heating surface 6540 can be similar to any of the heating surfaces described herein (e.g., the heating surface 1520 or the heating surface 3520).

The second platen 6510 coupled to the first platen 6530 such that the first heating surface 6520 and the second heating surface 6540 define a platen volume 6501 within which the ingredient mixture MIX can be disposed. For example, in some embodiments, the ingredient mixture MIX can be conveyed from any other portion of the cooking system 6000, such as for example a mixing assembly (not shown, but which can be similar to the mixing assembly 5300 or any of the mixing assemblies described herein). In some embodiments, all or a portion of the either the first platen 6510 and the second platen 6530 can move to capture the ingredient mixture MIX within the platen volume 6501. For example, in some embodiments, the first heating surface 6520 can move relative to the first flattening mass 6511 to limit movement of the ingredient mixture within the platen volume 6501.

The platen actuator assembly 6550 is configured to move at least one of the first platen 6510 or the second platen 6530 to reduce the platen volume 6501 to place the cooking assembly 6500 in a flattening configuration (FIG. 6). For example, as shown by the arrows AA in FIG. 6, the platen actuator assembly 6550 can move the platens towards each other to reduce the platen volume 6501. Specifically, the first heating surface 6520 and the second heating surface 6540 each contact the ingredient mixture MIX when the cooking assembly 6500 is in the flattening configuration. In this manner, the first platen 6510 or the second platen 6530 can exert a force on the ingredient mixture MIX. The platen actuator assembly 6550 can include any suitable mechanism to move the first platen 6510 and/or the second platen 6530, such as for example, one or more motors, lead screws, hydraulic components, or the like. The platen actuator assembly 6550 can be, for example, the platen actuator assembly 1550, the platen actuator assembly 3550, or any other platen actuator assembly described herein.

Referring to FIG. 7, the platen actuator assembly 6550 is configured to move at least one of the first platen 6510 or the second platen 6530 to place the cooking assembly 6500 in a first cooking configuration. When in the first cooking configuration, the first heating surface 6520 is in contact with the ingredient mixture MIX, and the second heating surface 6540 is spaced apart from the ingredient mixture MIX. Similarly stated, when in the first cooking configuration, a distance between the first heating surface 6520 and the second heating surface 6540 is greater than a thickness of the ingredient mixture. Thus, when the cooking assembly is in the first cooking configuration the first heating surface 6520 can heat a first side of the ingredient mixture. In this manner, the cooking assembly 6500 can function both as a press to flatten or shape the ingredient mixture (e.g., dough), and also to heat a single side of the ingredient mixture. This arrangement allows moisture to escape from a second side of the ingredient mixture, and also allows the ingredient mixture to expand ("puff up") without being impeded by the second platen 6530. Although FIG. 7 shows the second platen 6530 moving upward (arrow BB) to transition the cooking assembly 6500 into the first cooking configuration, in other embodiments, either or both of the platens can move to transition the cooking assembly 6500.

Figure 9:
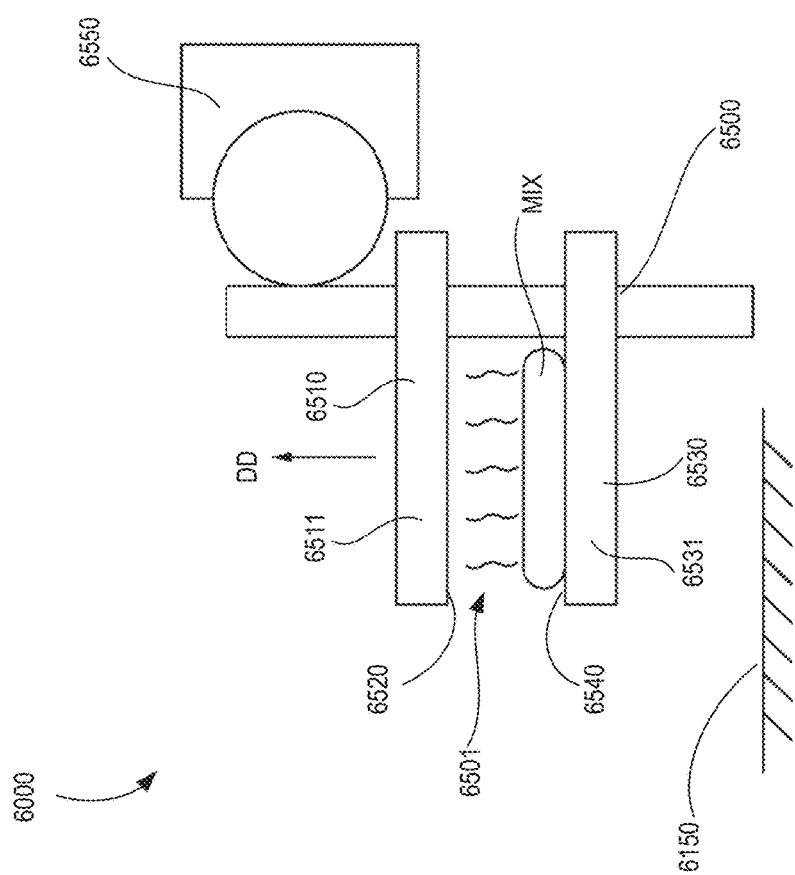

Referring to FIGS. 8 and 9, the platen actuator assembly 6550 is configured to rotate at least one of the first platen 6510 or the second platen 6530 between a first orientation (FIG. 7) and a second orientation (FIG. 9). When the cooking assembly 6500 is in the first orientation, the first heating surface 6520 is below the second heating surface 6540. Similarly stated, when the cooking assembly 6500 is in the first orientation, the first heating surface 6520 is between the support surface 6150 and the second heating surface 6540. When the cooking assembly 6500 is in the second orientation, the first heating surface 6520 is above the second heating surface 6540 (i.e., the second heating surface 6540 is below the first heating surface 6520). Similarly stated, when the cooking assembly 6500 is in the second orientation, the second heating surface 6540 is between the support surface 6150 and the first heating surface 6520. In this manner, the platen actuator assembly 6550 can flip or rotate the ingredient mixture during the cooking process.

The platen actuator assembly 6550 can rotate the first platen 6510, the second platen 6530, or both by any suitable mechanism and in any suitable manner. For example, as shown, the platen actuator assembly 6550 is configured to rotate the cooking assembly 6500 between the first orientation and the second orientation about an axis of rotation that is parallel to at least one of the first heating surface 6520 or the second heating surface 6540. The platen actuator assembly 6550 can include a motor to rotate the cooking assembly 6500, a set of rollers, or the like. Although the arrow CC in FIG. 8 shows the platen actuator assembly 6550 rotating both the first platen 6510 and the second platen 6530, in other embodiments the platen actuator assembly 6550 can rotate only the first platen 6510 or the second platen 6530. In yet other embodiments, the platen actuator assembly 6550 can rotate the first platen 6510 and the second platen 6530 at different times. The platen actuator assembly 6550 can be controlled by an electronic circuit system similar to the electronic circuit system 5900 described above. For example, in some embodiments, an electronic circuit system can include a cook module or a flip module that produces electronic signals or otherwise controls the speed, timing and/or direction of rotation of the first platen 6510 and/or the second platen 6530.

Referring to FIG. 9, the cooking assembly 6500 is in the second orientation, the platen actuator assembly 6550 is configured to move at least one of the first platen 6510 or the second platen 6530 to place the cooking assembly 6500 in a second cooking configuration. When in the second cooking configuration, the second heating surface 6540 is in contact with the ingredient mixture MIX, and the first heating surface 6520 is spaced apart from the ingredient mixture MIX. Similarly stated, when in the second cooking configuration, a distance between the first heating surface 6520 and the second heating surface 6540 is greater than a thickness of the ingredient mixture. Thus, when the cooking assembly is in the second cooking configuration the second heating surface 6540 can heat the second side of the ingredient mixture. Although FIG. 9 shows the first platen 6510 moving upward (arrow DD) to transition the cooking assembly 6500 into the second cooking configuration, in other embodiments, either or both of the platens can move to transition the cooking assembly 6500.

In some embodiments, a cooking assembly can include one or more platens that include multiple structures that can move relative to each other. This arrangement can allow the cooking assembly to perform multiple functions, such as retaining an ingredient mixture, applying a force to press or manipulate the ingredient mixture in a uniform manner, or conveying a cooked item from the cooking assembly to a storage assembly. For example, FIGS. 10-13 are schematic illustrations of a portion of a cooking system 7000 (also referred to herein as a "cooking device 7000") according to an embodiment. The cooking system 7000 can be a portable countertop appliance used to produce one or more cooked items, as described herein. The cooking system 7000 includes cooking assembly 7500 and a platen actuator assembly 7550. As described herein, the cooking assembly 7500 is designed to receive, press, and cook an ingredient mixture (e.g., dough) to produce a cooked item (e.g., a flat bread). The cooking assembly 7500 can be included within any of the cooking systems described herein. For example, the cooking assembly 7500 can be a cooking assembly similar to those shown in connection with the cooking system 3000 or the cooking system 1000 described below. Specifically, as described herein, the cooking assembly 7500 receives the ingredient mixture, presses (or flattens) the ingredient mixture, and includes a movable heating surface to rapidly cook the ingredient mixture. In some embodiments, the cooking assembly 7500 is configured to cook the ingredient mixture one side-at-a-time at a cook temperature and for a cook time to produce the desired type of cooked item. The cooking assembly 7500 (and any of the cooking assemblies described herein) can heat (or cook) the ingredient mixture in in any suitable manner, such as, for example, by baking, broiling, frying, or any other known cooking technique. Although the cooked item is described herein as flat bread, any of the cooked items described herein can be, for example, a bread product of any type, including flatbread, tortillas, bagels, or pita bread. The cooked item need not be limited to flour-based breads, but can include baked products of any type, including, but not limited to corn-based bread, rice products, or other gluten-free baked products.

Figure 10:
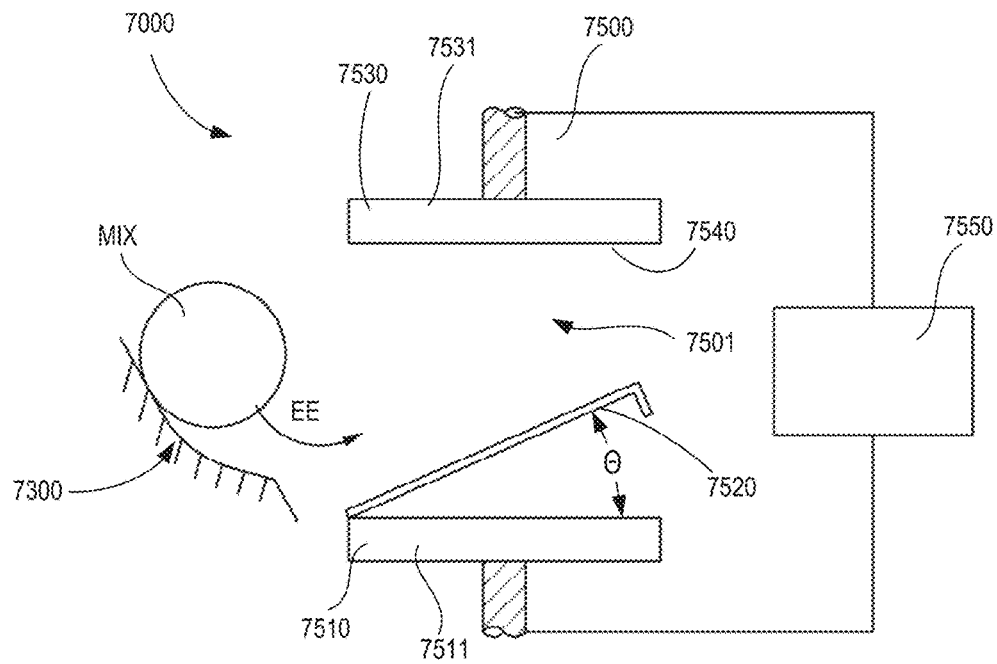
FIGS. 10-13 are schematic illustrations of a cooking device, according to an embodiment, in a receiving configuration (FIGS. 10-11), a flattening configuration (FIG. 12), and a first cooking configuration (FIG. 13).

Referring to FIG. 10, the cooking assembly 7500 includes a first platen 7510 and a second platen 7530. The first platen 7510 and the second platen 7530 can include generally flat surfaces that can exert a pressure or force on an ingredient mixture MIX to flatten, press, or otherwise manipulate the ingredient mixture MIX for cooking. The first platen 7510 has a first flattening mass 7511 and a first heating surface 7520. The second platen has a second flattening mass 7531 and a second heating surface 7540. The first flattening mass 7511 and the second flattening mass 7531 can be any suitable structure that can transfer a force to the ingredient mixture MIX to flatten, shape, or otherwise press the ingredient mixture. For example, in some embodiments, either or both of the first flattening mass 7511 and the second flattening mass 7531 can be flat rigid structures that can exert a press force of at least 200 pounds (890 N), 400 pounds (1.78 kN), 500 pounds (2.22 kN), or 700 pounds (2.67 kN). In some embodiments, either or both of the first flattening mass 7511 and the second flattening mass 7531 can be contoured to ensure that the maximum force is applied evenly across the surface of the platens. In other embodiments, either or both of the first flattening mass 7511 and the second flattening mass 7531 can be coupled to the platen actuator assembly 7550 via multiple locations to ensure spatial uniformity of the applied force. The first heating surface 7520 and the second heating surface 7540 can include suitable structure, heating elements, or the like to heat the ingredient mixture MIX to produce a cooked item. For example, in some embodiments, either or both of the first heating surface 7520 and the second heating surface 7540 can be similar to any of the heating surfaces described herein (e.g., the heating surface 1520 or the heating surface 3520).

The second platen 7510 coupled to the first platen 7530 such that the first heating surface 7520 and the second heating surface 7540 define a platen volume 7501 within which the ingredient mixture MIX can be disposed. For example, in some embodiments, the ingredient mixture MIX can be conveyed from a mixing assembly 7300, which can be similar to the mixing assembly 1300, 3300, 5300 or any of the mixing assemblies described herein. As described herein, the first heating surface 7520 is configured to move relative to the first flattening mass 7511. For example, the first heating surface 7520 can rotate relative to the first flattening mass 7511 (e.g., via a hinge joint). In this manner, the cooking assembly 7500 can capture the ingredient mixture MIX within the platen volume 7501. The movable heating surface 7520 also allows the heating surface 7520 to be spaced apart from (or thermally separated from) the first flattening mass 7511, which allows for faster heating of the first heating surface 7520.

Figure 11:
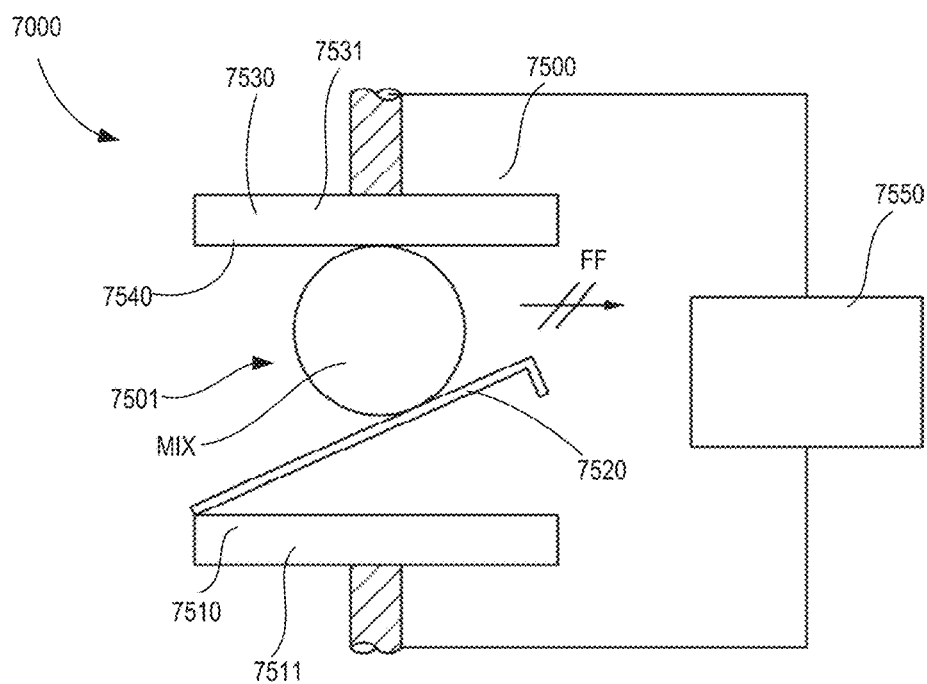
Figure 12:
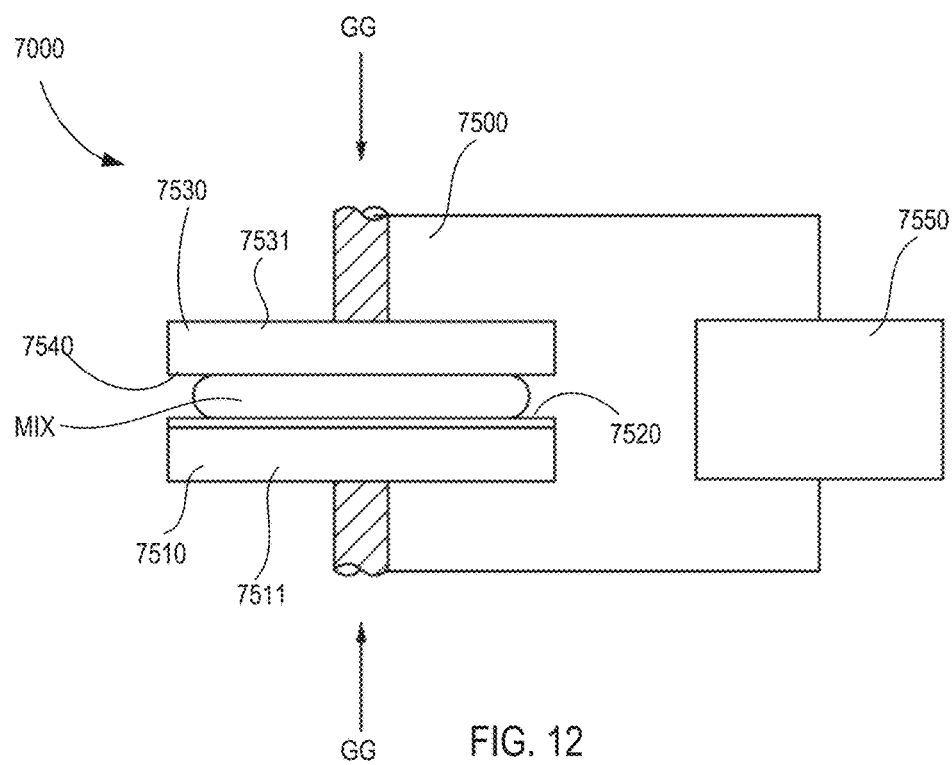

The platen actuator assembly 7550 is configured to move at least one of the first platen 7510 or the second platen 7530 to transition the cooking assembly 7500 from a receiving configuration (FIGS. 10 and 11) to a flattening configuration (FIG. 12). For example, as shown by the arrows EE in FIG. 10, the ingredient mixture MIX can be moved from the mixing assembly 7300 into the platen volume 7501 when the cooking assembly 7500 is in the receiving configuration. As shown, when the cooking assembly 7500 is in the receiving configuration, the first heating surface 7520 is nonparallel to at least one of the second heating surface 7540 or the first flattening mass 7511. As shown, the first heating surface 7520 and the second heating surface 7540 define a wedge angle $\theta$. This arrangement can capture or limit movement of the ingredient mixture MIX within the platen volume 7501. For example, as shown in FIG. 11, the wedge angle $\theta$ can limit movement of the ingredient mixture MIX in the direction FF. The wedge angle $\theta$ can be any suitable angle, for example, ranging from 10 degrees to 45 degrees. Moreover, the wedge angle $\theta$ can be selected (or controlled) to align a center of the ingredient mixture MIX with a center of one of the first platen 7510 or the second platen 7530. This allows the ingredient mixture to be repeatably placed in a desired position to allow for proper flattening.

As shown in FIG. 12, the platen actuator assembly 7550 can move the platens towards each other to reduce the platen volume 7501 and place the cooking assembly 7500 in the flattening configuration. When the cooking assembly 7500 is in the flattening configuration, the first heating surface 7520 is parallel to the second heating surface 7540. Additionally, the first heating surface 7520 and the second heating surface 7540 each contact the ingredient mixture MIX when the cooking assembly 7500 is in the flattening configuration. In this manner, the first platen 7510 or the second platen 7530 can exert a force on the ingredient mixture MIX. The platen actuator assembly 7550 can include any suitable mechanism to move the first platen 7510 and/or the second platen 7530, such as for example, one or more motors, lead screws, hydraulic components, or the like. The platen actuator assembly 7550 can be, for example, the platen actuator assembly 1550, the platen actuator assembly 3550, or any other platen actuator assembly described herein.

Figure 13:
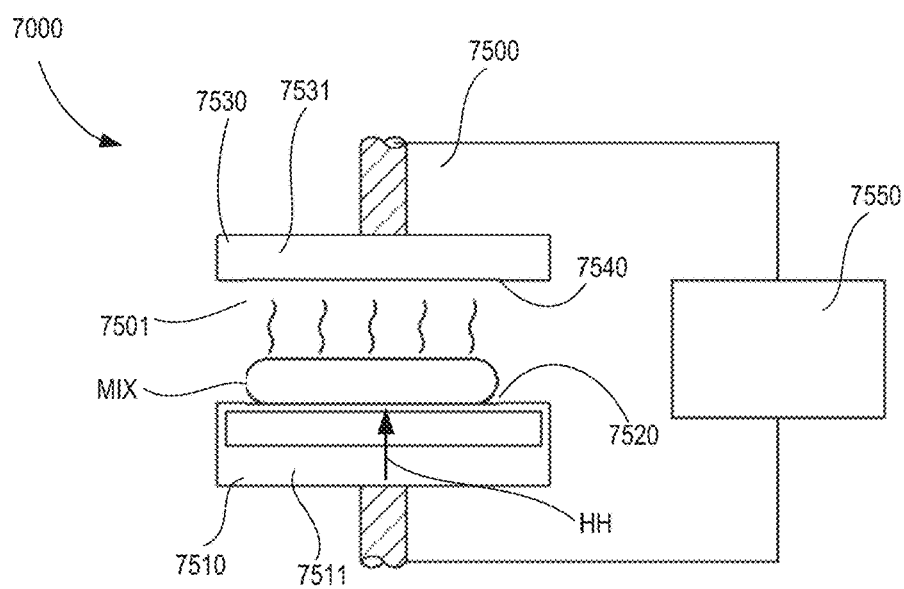

Referring to FIG. 13, the platen actuator assembly 7550 is configured to move at least one of the first platen 7510 or the second platen 7530 to place the cooking assembly 7500 in a first cooking configuration. When in the first cooking configuration, the first heating surface 7520 is in contact with the ingredient mixture MIX, and the second heating surface 7540 is spaced apart from the ingredient mixture MIX. Similarly stated, when in the first cooking configuration, a distance between the first heating surface 7520 and the second heating surface 7540 is greater than a thickness of the ingredient mixture. Thus, when the cooking assembly is in the first cooking configuration the first heating surface 7520 can heat a first side of the ingredient mixture. In this manner, the cooking assembly 7500 can function both as a press to flatten or shape the ingredient mixture (e.g., dough), and also to heat a single side of the ingredient mixture. This arrangement allows moisture to escape from a second side of the ingredient mixture, and also allows the ingredient mixture to expand ("puff up") without being impeded by the second platen 7530.

Additionally, when the cooking assembly 7500 is transitioned to the first cooking configuration, the first heating surface 7520 moves relative to the first flattening mass 7511, as shown by the arrow HH. In this manner, the first heating surface 7520 can be spaced apart from the first flattening mass 7511 when the first heating surface is actuated to heat the first ingredient mixture MIX. This arrangement allows the thermal mass of the heating element to include only the first heating surface 7520, and not the first flattening mass 7511. This advantageously allows the first heating surface 7520 to be heated (and cooled) more rapidly than if the first heating surface 7520 remained in constant contact with the first flattening mass 7511. This arrangement also allows the first flattening mass 7511 to provide the desired rigidity to the first heating surface 7520 during the flattening process.

Figure 14:
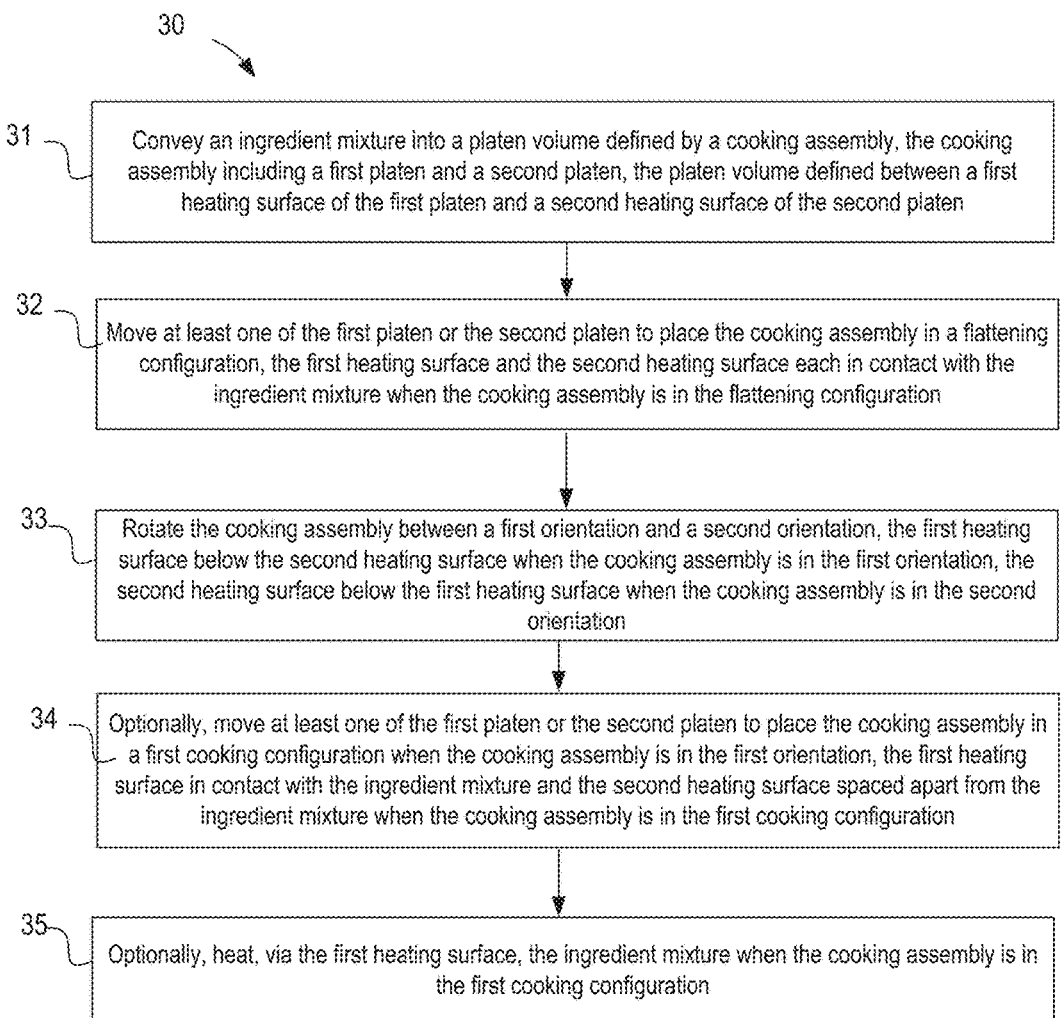
FIG. 14 is a flow chart of a method of cooking an item, according to an embodiment.

FIG. 14 is a flow chart of a method 30 of preparing a cooked item, according to an embodiment. The method 30 can be performed by the cooking system 6000, 7000 or any of the cooking systems described herein (e.g., the cooking system 1000 or the cooking system 3000). The method 30 includes conveying an ingredient mixture into a platen volume defined by a cooking assembly, at 31. The cooking assembly includes a first platen and a second platen, which can be, for example, the first platen 6510 and the second platen 6530. The platen volume is defined between a first heating surface of the first platen and a second heating surface of the second platen.

At least one of the first platen or the second platen is moved to place the cooking assembly in a flattening configuration, at 32. The first heating surface and the second heating surface are each in contact with the ingredient mixture when the cooking assembly is in the flattening configuration. The cooking assembly is then rotated between a first orientation and a second orientation, at 33. The first heating surface is below the second heating surface when the cooking assembly is in the first orientation, and the second heating surface is below the first heating surface when the cooking assembly is in the second orientation.

In some embodiments, the method optionally includes moving at least one of the first platen or the second platen to place the cooking assembly in a first cooking configuration when the cooking assembly is in the first orientation, at 34. The first heating surface is in contact with the ingredient mixture and the second heating surface spaced apart from the ingredient mixture when the cooking assembly is in the first cooking configuration. In some embodiments, the method optionally includes heating, via the first heating surface, the ingredient mixture when the cooking assembly is in the first cooking configuration, at 35.

Figure 17:
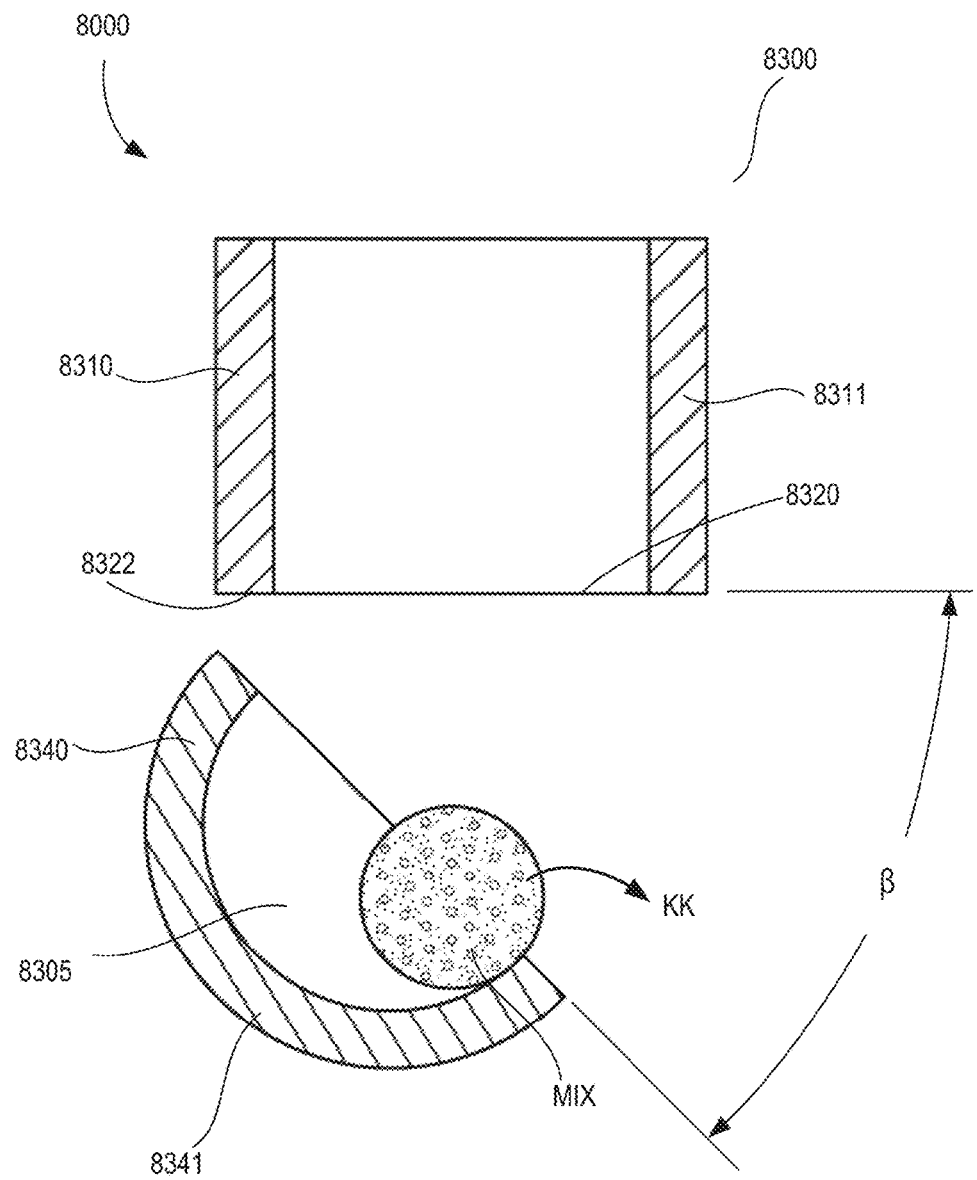

In some embodiments, a cooking assembly can include a multi-function container assembly. For example, in some embodiments, a cooking system can include a container assembly that functions both to easily weigh ingredients therein and also to provide a sealed container suitable for mixing. In other embodiments, a cooking system can include a container assembly that transitions to a configuration to facilitate movement of an ingredient mixture into a cooking assembly. For example, FIGS. 15-17 are schematic illustrations of a portion of a cooking system 8000 (also referred to herein as a "cooking device 8000") according to an embodiment. The cooking system 8000 can be a portable countertop appliance used to produce one or more cooked items, as described herein. The cooking system 8000 includes container assembly 8300. As described herein, the container assembly 8300 is designed to transition between a measurement configuration, a mixing configuration, and a delivery configuration. The container assembly 8300 can be included within any of the cooking systems described herein. For example, the container assembly 8300 can be a cooking assembly similar to those shown in connection with the cooking system 3000 or the cooking system 1000 described below. Although the cooked item is described herein as flat bread, any of the cooked items described herein can be, for example, a bread product of any type, including flatbread, tortillas, bagels, or pita bread. The cooked item need not be limited to flour-based breads, but can include baked products of any type, including, but not limited to corn-based bread, rice products, or other gluten-free baked products.

Referring to FIG. 15, the container assembly 8300 includes a first container 8310 that includes a wall 8311 and a second container 8340 that includes a wall 8341. The first container 8310 and the second container 8340 define a mixing volume 8305 within which a first ingredient I1 and a second ingredient I2 can be conveyed. The first ingredient I1 can be, for example, a dry ingredient (e.g., flour) conveyed into the mixing volume 8305 (as shown by the arrow II) by a metering assembly (e.g., including a flour container or the like) as described herein. The second ingredient I2 can be, for example, a liquid ingredient (e.g., water or oil) conveyed into the mixing volume 8305 (as shown by the arrow JJ) by a metering assembly (e.g., including a reservoir, valve, or the like) as described herein.

Either the first container 8310, the second container 8340, or both include a coupling portion 8320 that movably couples the second container 8340 to the first container 8310. The coupling portion 8320 can be any suitable structure or mechanism that allows the container assembly 8300 to transition between a measurement configuration (FIG. 15), a mix configuration (FIG. 16), and a delivery configuration (FIG. 17). For example, in some embodiments, the coupling portion 8320 can include a slot and a pin matingly disposed within the slot in a manner that allows the second container 8340 to rotate and translate relative to the first container 8310. In other embodiments, the coupling portion 8320 can include a resilient member (e.g., a spring or elastic member) that allows the second container 8340 to move relative to the first container 8310 with multiple degrees of freedom.

As shown in FIG. 15, when the container assembly is in the measurement configuration, the second container 8340 is unsupported by the first container 8310. Similarly stated, the second container 8340 can move relative to the first container 8310 in a manner that such that the first container 8310 does not bear any weight or load of the second container 8340. As shown, when the container assembly is in the measurement configuration, a seal surface 8348 of the second container 8340 is spaced apart from a seal surface 8322 of the first container 8310. In this manner, the second container 8340 can freely rest against a load cell (not shown). The load cell can produce a signal associated with an amount of the first ingredient I1 or the second ingredient I2 within the container assembly 8300. For example, in some embodiments, the signal can be input to a metering module (e.g., a metering module 5932), which can control a metering assembly (e.g., motors, valves, or the like) to add additional amounts of the first ingredient I1 or the second ingredient I2.

As shown in FIG. 16, when the container assembly 8300 is in the mix configuration, the second container 8340 is firmly contacted against the first container 8310. Specifically, the seal surface 8322 of the first container 8310 is in contact with the seal surface 8348 of the second container 8340. The seal surfaces can include any structure or mechanism to seal the mixing volume 8305, such as, for example, o-rings, gaskets, or the like. This arrangement allows the container assembly 8300 to be placed in a spill-proof (or fluidically isolated) configuration for mixing. As shown, in some embodiments, a mixing assembly 8400 can be moved within the mixing volume 8305 to produce an ingredient mixture MIX of the first ingredient I1 and the second ingredient I2. The mixing assembly 8400 can be any suitable mixing assembly of the types shown and described herein. For example, in some embodiments, the mixing assembly can be similar to the mixing assembly 1400 or the mixing assembly 3400. For example, in some embodiments, the mixing assembly 8400 includes a paddle having a first portion and a second portion. The first portion can rotate relative to the container assembly, and the second portion can move relative to the first portion to produce the ingredient mixture MIX.

After the ingredient mixture MIX is produced within the mixing volume 8305, the container assembly 8300 can be transitioned to the delivery configuration. As shown in FIG. 17, when the container assembly 8300 is in the mix configuration, the seal surface 8322 is spaced apart from the seal surface 8348, the two seal surfaces define a tilt angle β. In this manner, the container assembly 8300 facilitates transfer of the ingredient mixture MIX from the container assembly 8300 into another portion of the cooking device 8000 (e.g., a cooking assembly, not shown), as shown by the arrow KK. The tilt angle β can be any suitable value, and can range from about 10 degrees to 45 degrees.

In some embodiments, an apparatus includes any of the assemblies described herein (e.g., a container assembly, a cooking assembly, and an electronic circuit system). In some embodiments, an apparatus can include three, four, or five subassemblies contained within a housing such that the apparatus is a countertop appliance. Such subassemblies can include an ingredient metering assembly, a mixing bowl assembly, a mixing actuator assembly, a cooking assembly, and an electronic assembly. As one example, FIGS. 18-38 are various views of a countertop device 1000 (also referred to as a bread maker or a flatbread maker) according to an embodiment. The bread maker 1000 includes a housing 1100, within which a variety of modules (or assemblies) are contained. Specifically, the bread maker 1000 includes an ingredient metering assembly 1200, a mixing bowl assembly 1300, a mixing actuator assembly 1400, a cooking assembly 1500, and a control/electronic assembly 1900. A description of each module and/or subsystem follows. Additionally, as described below, the housing 1100 includes a storage assembly (also referred to as a "storage area") within which the cooked bread can be stored.

Figure 18:
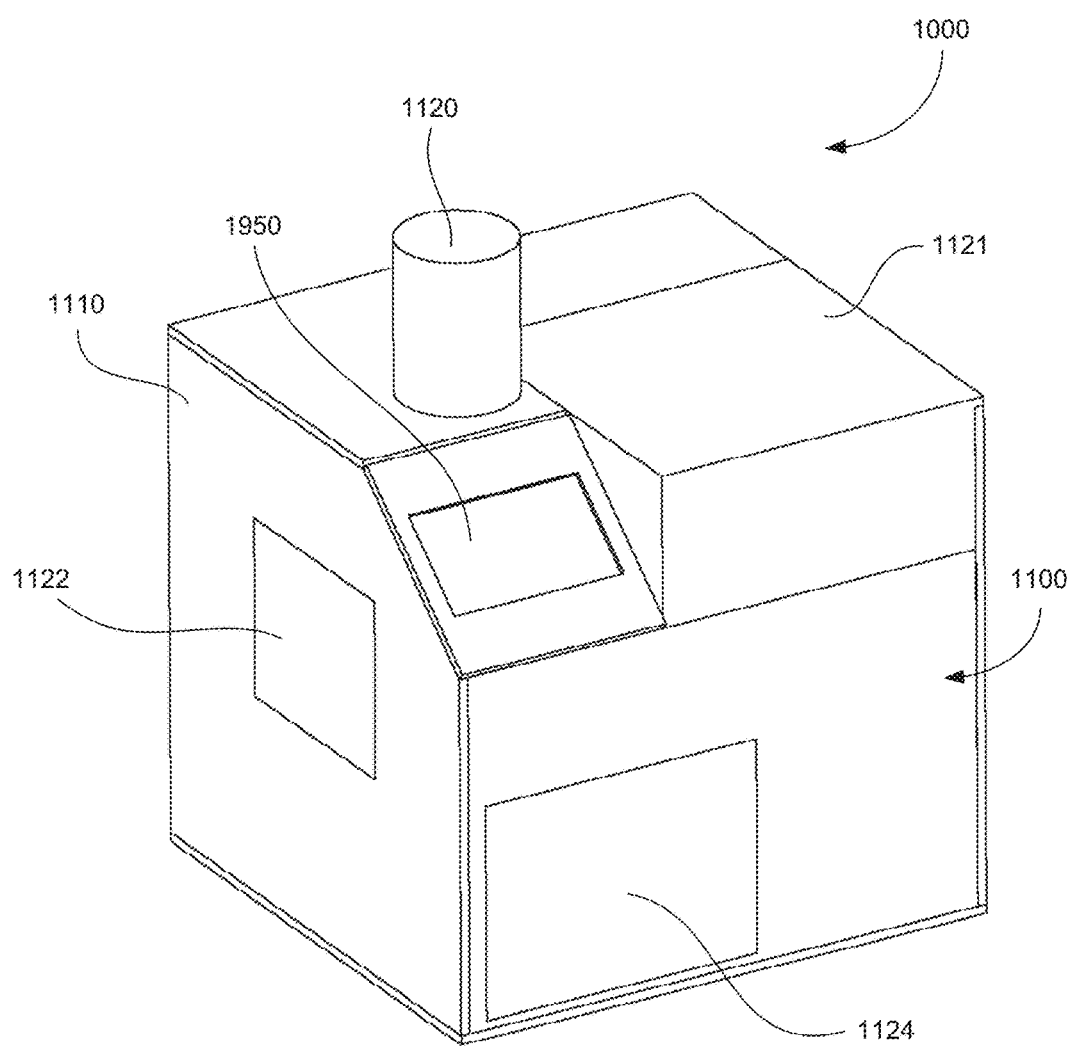
FIG. 18 is a perspective view of a countertop appliance according to an embodiment, showing an exterior view of the left side of the device.
Figure 19:
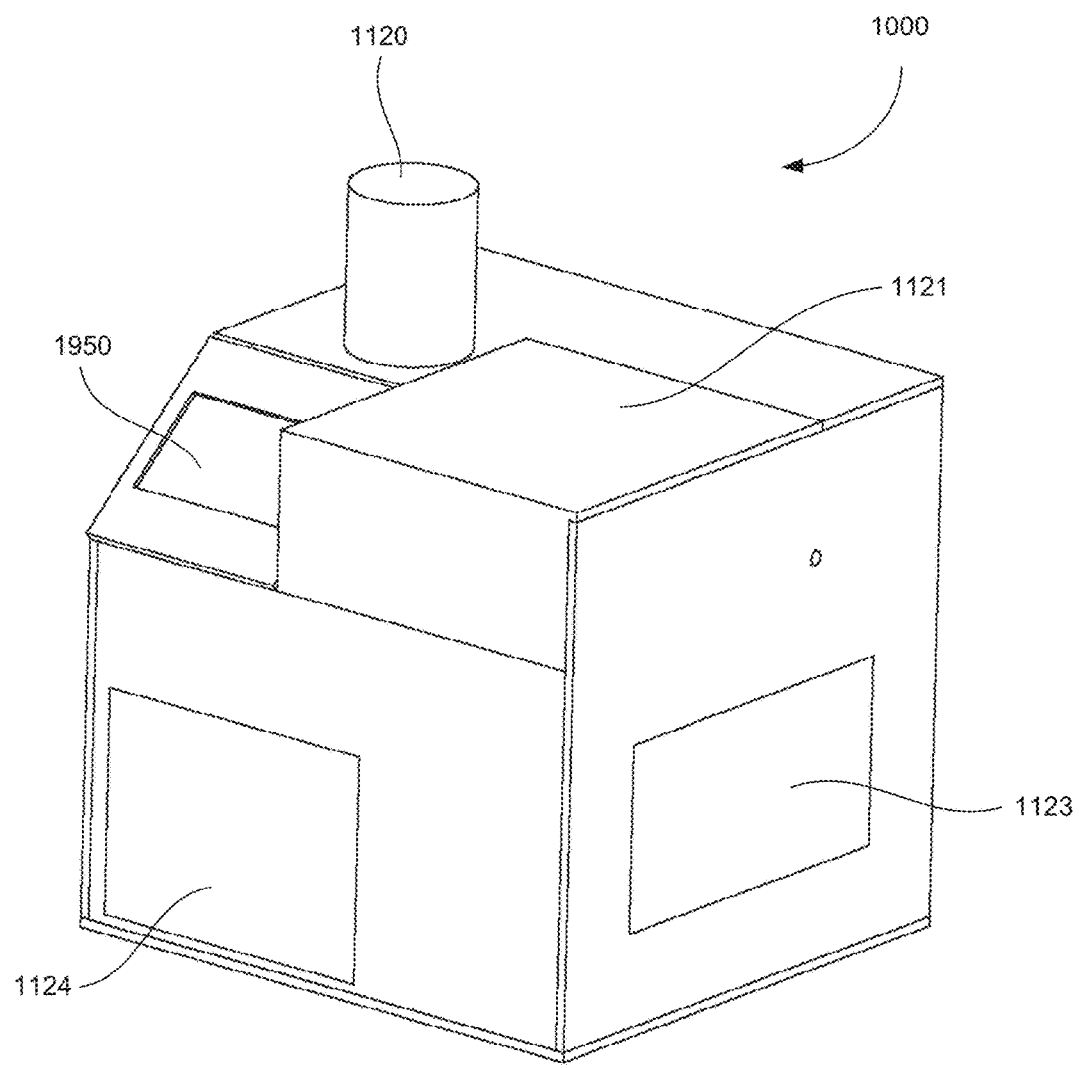
FIG. 19 is a perspective view of the countertop appliance shown in FIG. 18, showing an exterior view of the right side of the device.
Figure 20:
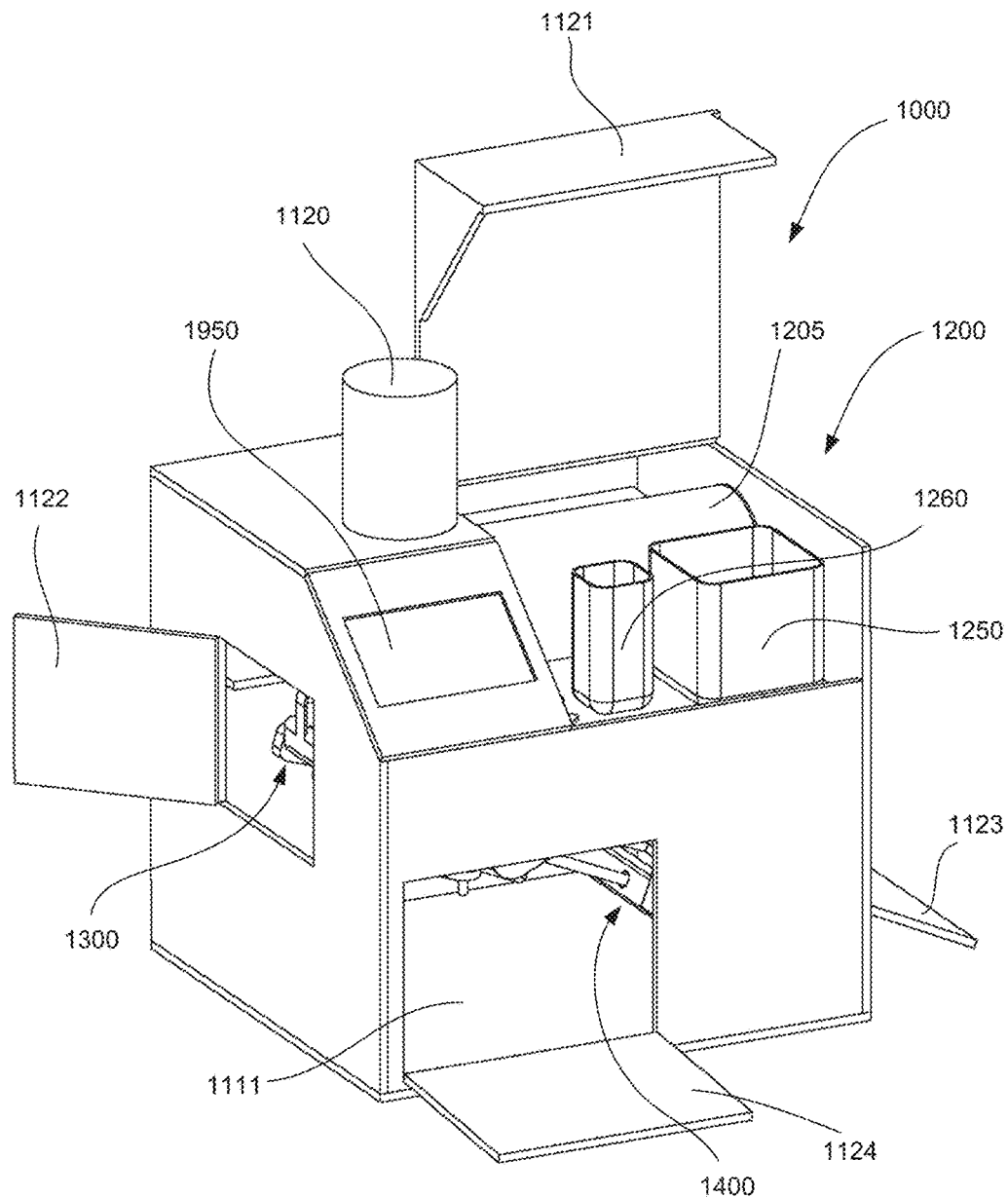
FIG. 20 is a perspective view of the countertop appliance shown in FIG. 18, showing an exterior view of the left side of the device with all access panels in an open configuration.

FIGS. 18-20 show a housing 1100 of the bread maker 1000. The housing 1100 includes sidewalls 1110 that define an interior volume 1111. The interior volume 1111 contains the five subassemblies and a storage area where the finished bread is stored. The housing 1100 is made of a strong, durable, heat resistant material that is lightweight and easy to clean. For example, in some embodiments, the housing 1100 can be made of aluminum, stainless steel, plastic, ceramic, or the like. The top surface of the housing 1100 includes a mixing motor mount 1135. The front surface (or sidewall) of the housing 1100 defines an opening 1125 where an input/output module of the electronic assembly can be mounted to provide a user interface. The user interface can include, for example, a touchscreen LCD or any other suitable interface.

Figure 21:
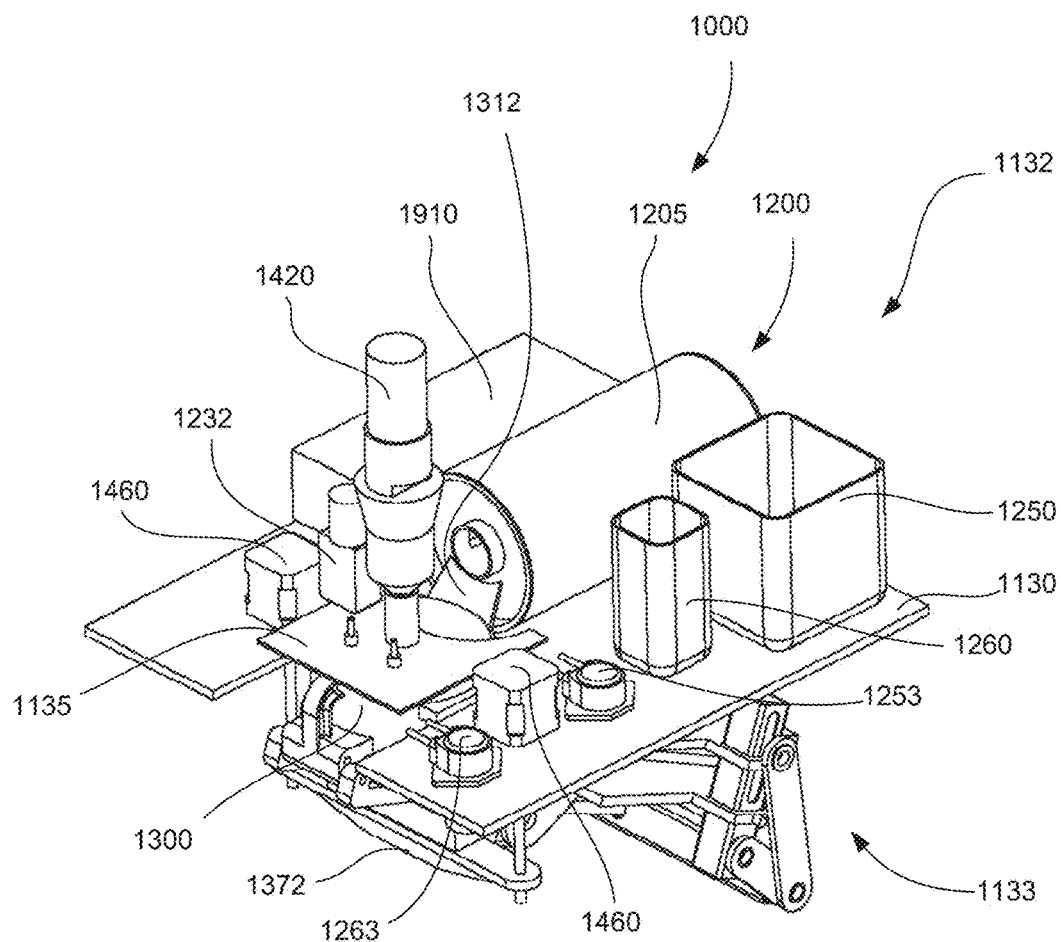
FIGS. 21 and 22 are is a perspective view of the countertop appliance shown in FIG. 18, with the housing removed to show the internal components.

The housing 1100 includes a frame 1130 that separates the interior of the housing into an upper portion 1132 and a lower portion 1133, as shown in FIG. 21. The frame 1130 includes mounting portions upon which the subassemblies are mounted. The frame 1130 can be made of the same material as the housing but, in some embodiments, also includes insulative material to limit heat transfer from the lower portion 1133 of the housing to the upper portion 1132 during use. The insulative material allows the apparatus to maintain consistent cooking temperatures within the lower portion 1133, maintain the integrity of stored ingredients, and conserve energy. The insulative material can include ceramic fibers, polyethylene, extruded polystyrene, and synthetic industrial felt, polycrystalline mullite fibers, or the like.

The housing 1100 defines several access openings or "openings") that allow a user to access the subassemblies within the housing 1100. As shown, each of the openings is covered by a corresponding panel or lid. There is an ingredient access panel 1121 that allows access to the ingredient metering assembly 1200, a mixing bowl access panel 1122 that allows access to the mixing bowl assembly 1300, a platen access panel 1123 that allows access to the cooking assembly (not shown), and an output panel 1124 that allows access to both the mixing actuator assembly 1400 and the storage area of the inner volume 1111 of the housing where the finished bread is stored. Each of the access openings is large enough to allow a user to add ingredients, extract the finished flatbread product, and take out parts, such as a mixing bowl or a container, for cleaning. The access openings can also be large enough to allow access to the subassemblies for maintenance and cleaning. Each of the covers can include or be constructed from an insulative material to limit heat transfer from a specific subassembly, such as the platen subassembly 1500. The insulative material can include ceramic fibers, polyethylene, extruded polystyrene, and synthetic industrial felt, polycrystalline mullite fibers, or the like. Each of the covers can also include a safety latch (not shown) that is coupled to the electronic assembly 1900 such that the latch is activated when the apparatus is in use preventing a user from opening the cover.

Although not shown in FIG. 20, the storage area (or storage assembly) can include one or more insulated walls surrounding the cooked bread that facilitate maintaining a "warming" temperature within the storage area. In other embodiments, the storage area (or storage assembly) can include one or more heaters configured to maintain the storage area at a desired warming temperature. Moreover, in some embodiments, a storage assembly can include a movable tray that can be moved into and/or out of the opening 1111, within which cooked bread is stored.

Figure 23:
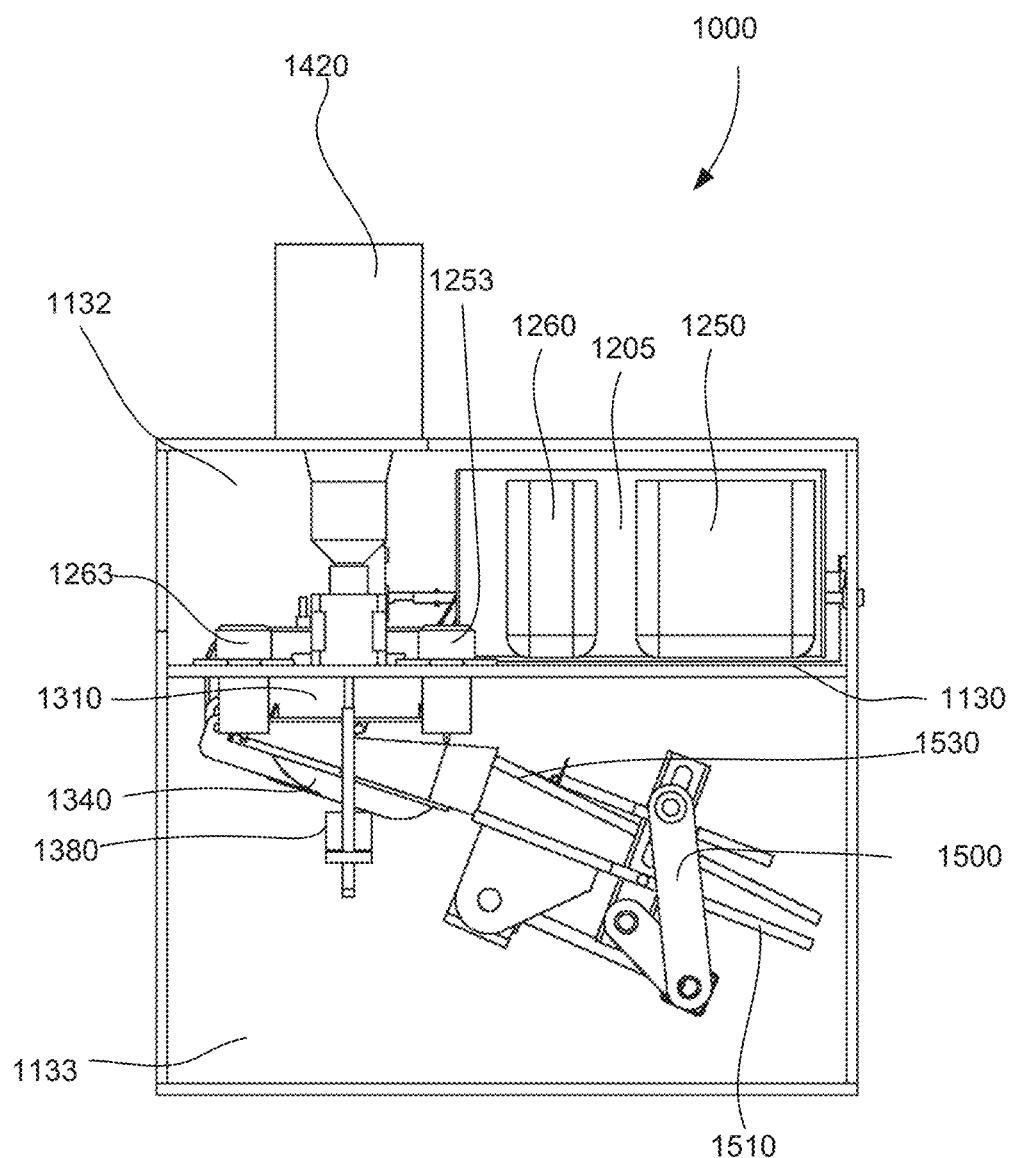
FIG. 23 is a cross-sectional view of the countertop appliance shown in FIG. 18, when the mixing bowl assembly is in a second configuration and the cooking assembly is in a first configuration.

The ingredient metering assembly 1200, shown in FIGS. 20, 21 and 23, includes a water reservoir 1250, an oil reservoir 1260, a flour container assembly 1205, and a flour delivery system 1230. The ingredient metering assembly 1200 is located in the upper portion 1132 of the housing 1100, and also includes the tubing, interconnects and other components to couple the ingredient metering assembly 1200 to the mixing assembly 1300 and/or other assemblies within the bread maker 1000. The water reservoir 1250 is configured to store water. The water is dispensed from the water reservoir 1250 to the mixing bowl assembly through tubing (not shown) and the nozzle 1254 when the water delivery pump 1253 is activated. In some embodiments, the water reservoir 1250 can be removably attached to the frame 1130 to allow for easy refilling and/or cleaning. In some embodiments, the water reservoir 1250 can include one or more filters to remove impurities from the water stored therein.

The oil reservoir 1260 is configured to store oil. The oil is dispensed from the oil reservoir 1260 to the mixing bowl assembly through tubing (not shown) and the nozzle 1264 when the oil delivery pump 1263 is activated. In some embodiments, the oil reservoir 1260 can be removably attached to the frame 1130 to allow for easy refilling and/or cleaning. In some embodiments, the oil reservoir 1260 can include one or more filters to remove impurities from the oil stored therein. In some embodiments, one or both of the water reservoir 1250 and the oil reservoir 1260 can include valves (not shown) that are used to control the flow of the liquids from the respective reservoirs.

Figure 24:
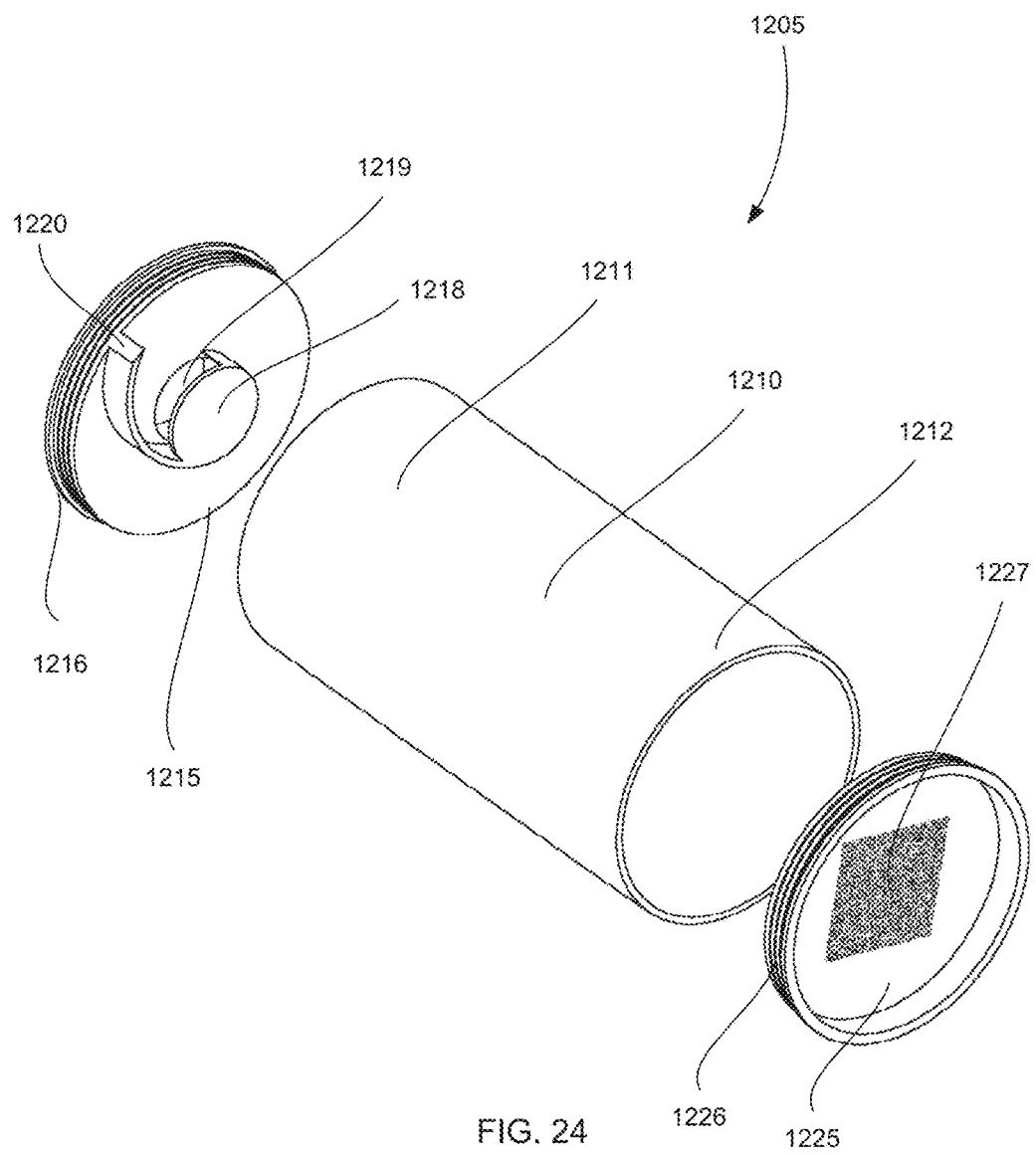
FIG. 24 is an exploded perspective view of a flour container assembly of the countertop appliance shown in FIG. 18.

The flour container assembly 1205 stores dry flour and seasonings and is designed to hold an amount of ingredients sufficient to make any suitable number of roti. For example, in some embodiments, the flour container assembly 1205 can contain a sufficient amount of flour to make up to forty roti. In other embodiments, however, the flour container assembly 1205 can contain a sufficient amount of flour to make up to only about ten roti. The flour container assembly 1205 can be removed from the housing 1100. As shown in FIG. 24, the flour container assembly 1205 includes a tube 1210, a first lid 1215 and a second lid 1225. The tube 1210 has a first end portion 1211, a second end portion 1212, and a central portion 1213 that defines an inner volume.

The first lid 1215 has a connection portion 1216 that connects the first lid 1215 with the first end portion 1211 of the tube 1210. As shown in FIG. 24, the connection portion 1216 is threaded or ribbed such that the first lid 1215 screws onto the first end portion 1211 of the tube 1210. In some embodiments, the connection portion 1216 can be ribbed or otherwise proportioned such that the first lid is press fit into the first end portion 1211 of the tube 1210. The first lid 1215 is designed to allow for the release of flour in specific measurements. The first lid 1215 includes a shield 1218 and a dispensing arm 1220. The shield 1218 is designed so that a specific amount of flour can be dispensed from the inner volume of the tube 1210 when the tube 1210 is rotated, as described below. Specifically, the shield 1218 defines an outlet slot 1219 on one side of the shield through which the flour can exit the inner volume of the tube 1210. The outlet slot 1219 is located adjacent to the dispensing arm 1220 which funnels, directs and/or conveys the flour from the outlet slot 1219 to the outlet opening (not shown) defined by the first lid 1215.

The second lid 1225 of the flour container assembly 1210 includes a connection portion 1226 that is threaded such that the second lid 1225 screws onto the second end portion 1212 of the tube 1210. In some embodiments, the connection portion can be ribbed or otherwise proportioned such that the second lid 1225 is press fit into the second end portion of the tube 1210. The second lid 1225 also includes a machine-readable tag 1227 located on the outer surface of the second lid 1225. The machine-readable tag 1227 provides the apparatus 1000 with instructions such as the amount of each ingredient—flour, water, and oil—that is needed for a recipe, the time required for mixing the ingredients, the cooking temperature and time required for the recipe, and the like. The machine-readable tag 1227 is read by the electronic assembly 1900, as described in detail herein. The machine-readable code can be, for example, an RFID chip, a bar code, a QR Code™ and/or an address of a website.

As described in more detail below, the user can scan or otherwise read the machine-readable tag 1227 using either a portion of the control system 1900 or a mobile communication device (e.g., a cellular phone) to access instructions. For example, in some embodiments, upon scanning the machine-readable tag 1227, the user's cellular phone will be directed to a website or other location in which instructions for using the bread maker 1000 are provided. In other embodiments, the user's cellular phone can be placed in communication with (or "paired with") the control system 1900. In this manner, the user can control and/or monitor the bread making process via an application stored locally on their cellular phone that provides detailed instructions unique to that user.

Figure 25:
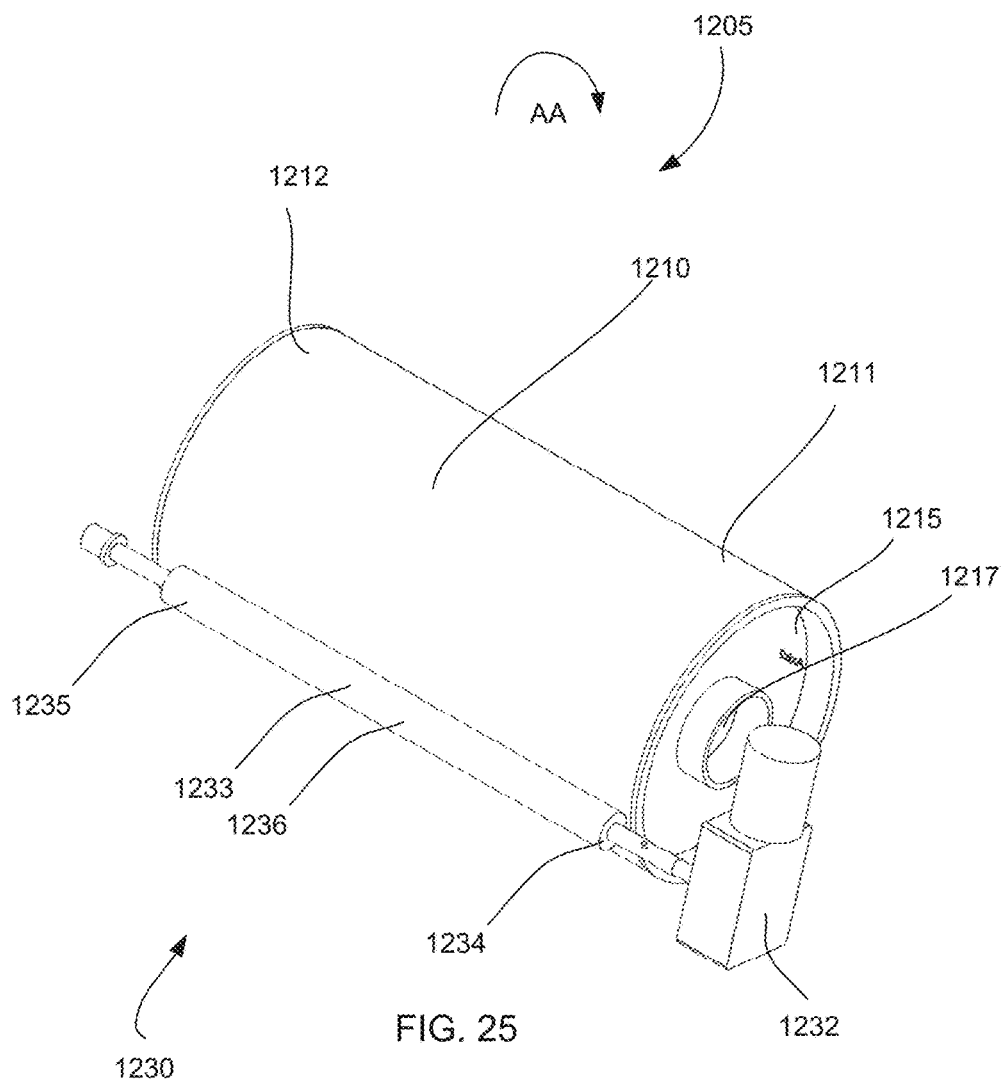
FIG. 25 is a perspective view of a portion of the countertop appliance shown in FIG. 18, showing the flour container assembly and the flour delivery system.

When the flour container assembly 1205 is fully assembled—when the first lid and the second lid are attached to the tube—the flour container assembly is placed into the housing 1100 adjacent to the flour delivery system 1230. The flour container assembly 1205 can be placed in the apparatus horizontally or with the first end portion of the tube angled in a slightly downward direction. FIGS. 21 and 25 show the flour container assembly 1205 located adjacent to the flour delivery system 1230 in a horizontal configuration, with the tube 1210 being in contact with the rollers 1233 (also referred to as a drive shaft 1233). The flour delivery system 1230 includes a drive motor 1232 and a drive shaft 1233. As shown in FIG. 25, the drive shaft 1233 has a first end portion 1234, a second end portion 1235, and a central portion 1236. The first end portion 1234 connects the drive shaft 1233 to the drive motor 1232. The second end portion 1235 connects the drive shaft 1233 to a sidewall of the housing (not shown). The central portion 1236 engages the outer surface 1214 of the tube of the flour container assembly 1210 and rolls the tube when the drive motor 1232 is engaged. As the tube rolls, the flour contained in the inner volume of the tube is driven into the outer slot 1219 of the first lid 1215 by the dispensing arm 1220, assisted by the agitation of the flour within the tube 1210 caused by the rotation of the tube 1210 and gravity. The flour then travels through the outer slot 1219 to the outlet opening 1217 of the first lid 1215.

In some embodiments, the dispensing arm 1220 is movable relative to the first lid 1215. For example, in some embodiments, the end portion of the dispensing arm 1220 opposite the slot 1219 is separated from the first lid 1215 such that it can bend, flex and/or move when the tube 1210 is rotated. This arrangement can further agitate the flour within the tube 1210 and/or can direct the flour towards the outlet opening 1217. In other embodiments, the dispensing arm 1220 can be in a fixed position relative to the first lid 1215. Although the dispensing arm 1220 is shown and described as being aligned with (or extending substantially parallel to) the inner surface of the first lid 1215, in other embodiments, the dispensing arm 1220 can extend into the tube 1210. For example, in some embodiments, the dispensing arm 1220 can be a wire, whisk, or corkscrew-like structure that extends into the tube 1210 to facilitate agitation of the flour therein.

Although the flour delivery system 1230 is shown as including a single drive motor 1232 and drive shaft 1233, in other embodiments, the flour delivery system 1230 can include two or more drive shafts 1233. Although the flour delivery system 1230 is shown as relying on friction between the central portion 1236 of the drive shaft (or roller) 1233 and the tube 1210, in other embodiments, any drive mechanism or connection between the drive shaft 1233 (or drive motor 1232) and the tube 1210 can be employed. For example, in some embodiments, the drive shaft 1233 (or drive motor 1232) can be coupled to the tube 1210 via a belt or a gear arrangement.

Moreover, although the flour delivery system 1230 is shown as rotating the tube 1210 to dispense the flour therein, in other embodiments, a flour delivery system can include any suitable mechanism for dispensing flour from the flour container assembly 1205. For example, in some embodiments, a flour delivery system can include a linear actuator that moves a plunger within the tube 1210 to dispense the flour therein. In other embodiments, a flour delivery system can include an actuator that both rotates and translates a plunger within the tube 1210 to dispense the flour therein.

The amount of flour dispensed from the tube 1210 can depend on several factors, including the amount of rotation of the tube 1210 (i.e., how many revolutions the tube 1210 is rotated during the dispense operation), the amount of flour within the tube 1210 (i.e., is the tube full or partially emptied), the construction of the dispensing arm 1220, and the size of the outer slot 1219 and the outlet opening 1217. For example, in some embodiments, a narrower slot 1219 can allow for lower amounts of flour transferred for a given rotation of the tube 1210 (i.e., similar to a smaller opening in a package). Thus, a narrower slot 1219 can, in some instances, provide for more accurate control of the amount dispensed, but may take a longer time to complete the flour dispensation. The slot 1219 can have any suitable aspect ratio to accommodate the desired dispensation rate and accuracy. For example, in some embodiments, a ratio of the slot length to the slot width can be greater than 2:1, 2.5:1, or 3:1. In some embodiments, a ratio of the area of the slot 1219 to the area of the exit opening 1217 (an "area ratio") can be any suitable value. For example, in some embodiments, the area ratio can be less than 1.0 (thus, the slot 1219 can be the rate limiting area). In other embodiments, the area ratio can be greater than 1.0 (e.g., greater than 1.2, 1.4, 1.6, or 1.8).

Figure 22:
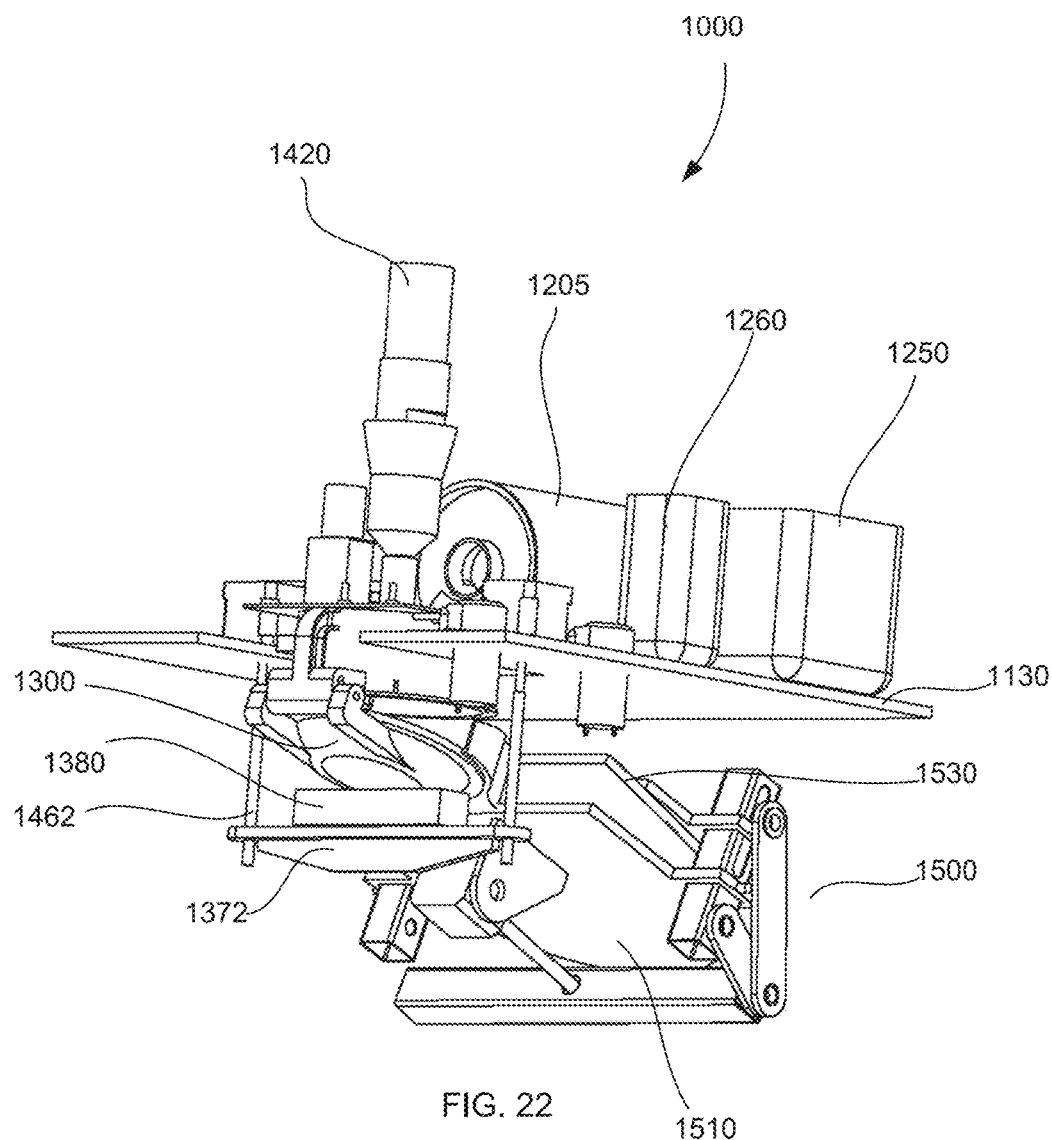

When the apparatus 1000 is activated, the ingredients from the ingredient metering assembly 1200 are dispensed from their respective containers into the mixing bowl assembly 1300, which is located in the lower portion 1132 of the housing 1100, as shown in FIGS. 21-23. As shown in FIG. 23, the mixing bowl assembly 1300 includes a mixing bowl 1302 and a measurement system 1370.

Figure 26:
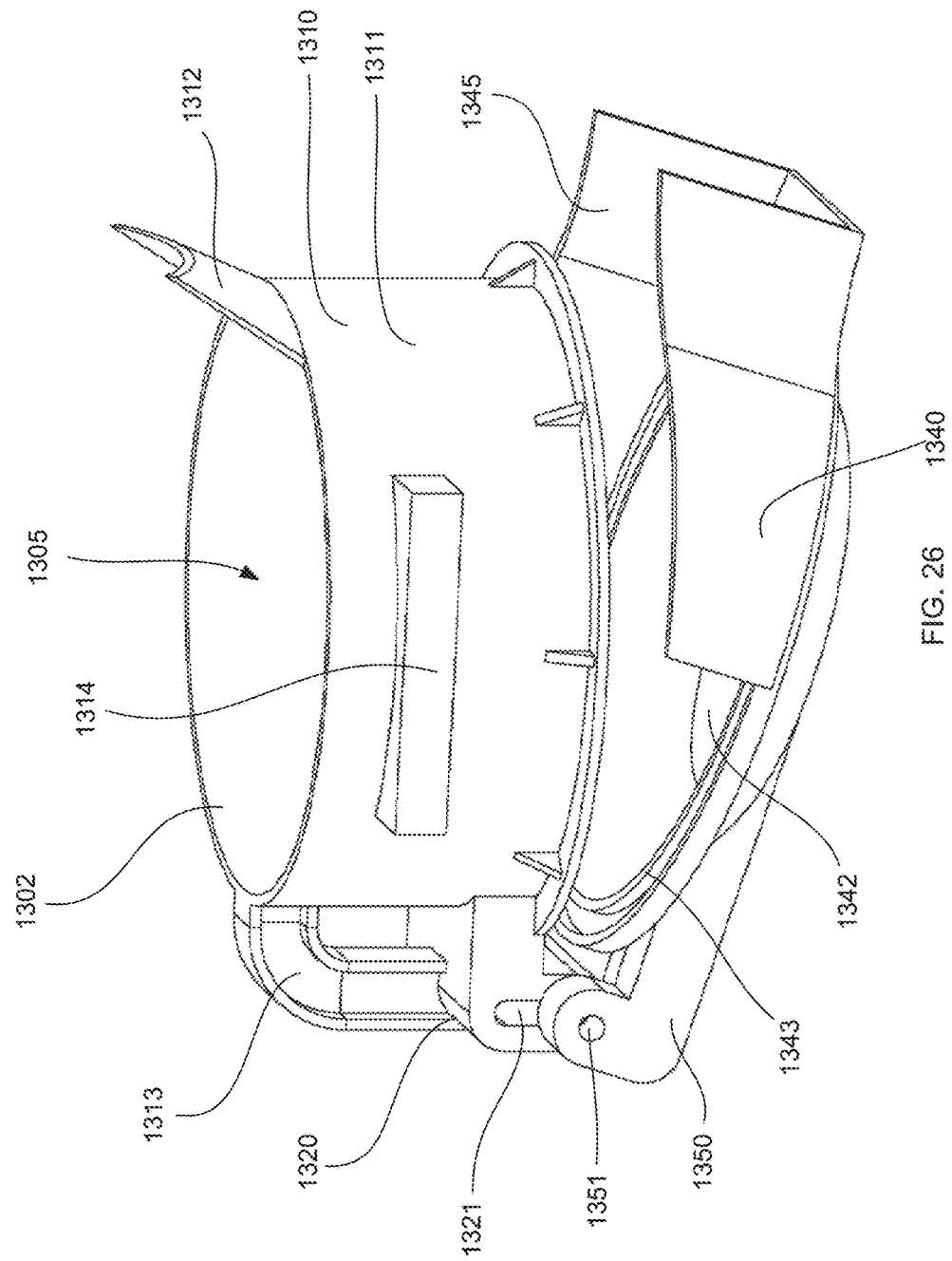
FIG. 26 is a perspective view of the countertop appliance shown in FIG. 18, showing the mixing bowl assembly of the device.

FIG. 26 provides a detailed view of the mixing bowl 1302. The mixing bowl 1302 includes an upper portion 1310 and a lower portion 1340. The upper portion 1310 includes a cylindrical sidewall 1311 that defines a portion of the mixing volume 1305. The outer surface of the sidewall 1311 includes a mounting protrusion 1314 that is used to secure the mixing bowl 1302 within the apparatus 1000. The upper portion 1310 also includes a flour intake chute 1312, a handle 1313, and a coupling arm 1320. The flour intake chute 1312 is attached to the top of the sidewall 1311 and provides a pathway for the dry ingredients to enter the mixing volume 1305 from the flour container assembly 1205. The handle 1313 attaches to the top of the sidewall 1311 across from the flour intake chute 1312. The handle 1313 allows the user to easily insert the mixing bowl 1302 into the apparatus 1000 and remove the mixing bowl 1302 from the apparatus 1000 for cleaning and maintenance. The coupling arm 1320 is located at the bottom of the handle 1313 and defines a slot 1321. The slot 1321 allows for the lower portion 1340 to be moved between a first (or opened) configuration and a second (or closed) configuration, as discussed herein.

Figure 30:
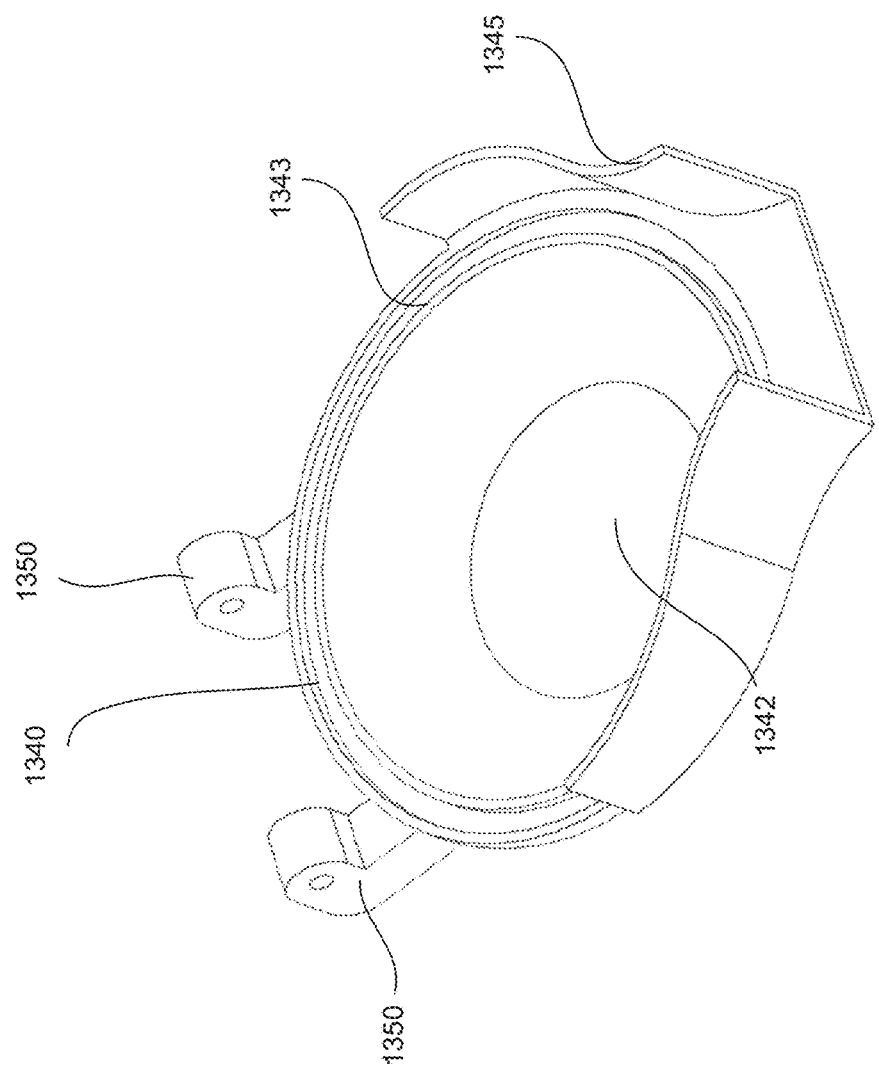
FIG. 30 is a perspective view of a lower bowl of the mixing bowl assembly shown in FIGS. 26-28.

As shown in FIG. 26, the lower portion 1340 of the mixing bowl 1302 includes an outer sidewall 1341, an inner sidewall 1342, an exit guide 1345, and an actuation arm 1350. The outer sidewall 1341 defines the bottom of the mixing bowl 1302. The inner sidewall 1342 is concave, as shown in FIGS. 26 and 30, and defines a portion of the mixing volume 1305 when the lower portion 1340 is connected to the upper portion 1310, and when the lower portion 1340 is in the second (closed) configuration, as discussed herein. The inner sidewall 1342 contains ridges that cause the dough ball to roll instead of slide during kneading and formation. The inner sidewall 1342 defines an O-ring groove 1343 within which an O-ring (not shown) is inserted to provide a liquid tight seal when the lower portion 1340 is in the second (closed) configuration, and is further "locked" to the upper portion 1310 (i.e., after the ingredients have been weighed). The exit guide 1345 is attached to the top of the outer sidewall 1341 and defines a pathway to transfer dough, once it is formed, from the mixing volume 1305 to the cooking assembly (not shown). The actuation arm 1350 is attached to the surface of the outer sidewall 1341 across from the exit guide 1345. The actuation arm 1350 is attached to the coupling arm 1320 of the upper portion 1310 of the mixing bowl 1302 by a pin 1351. The pin 1351 rides in the slot 1321 of the coupling arm 1320 of the upper portion 1310. The arrangement of the actuation arm 1350 and the coupling arm allows the lower portion 1340 to move between the first configuration and the second configuration.

Figure 27:
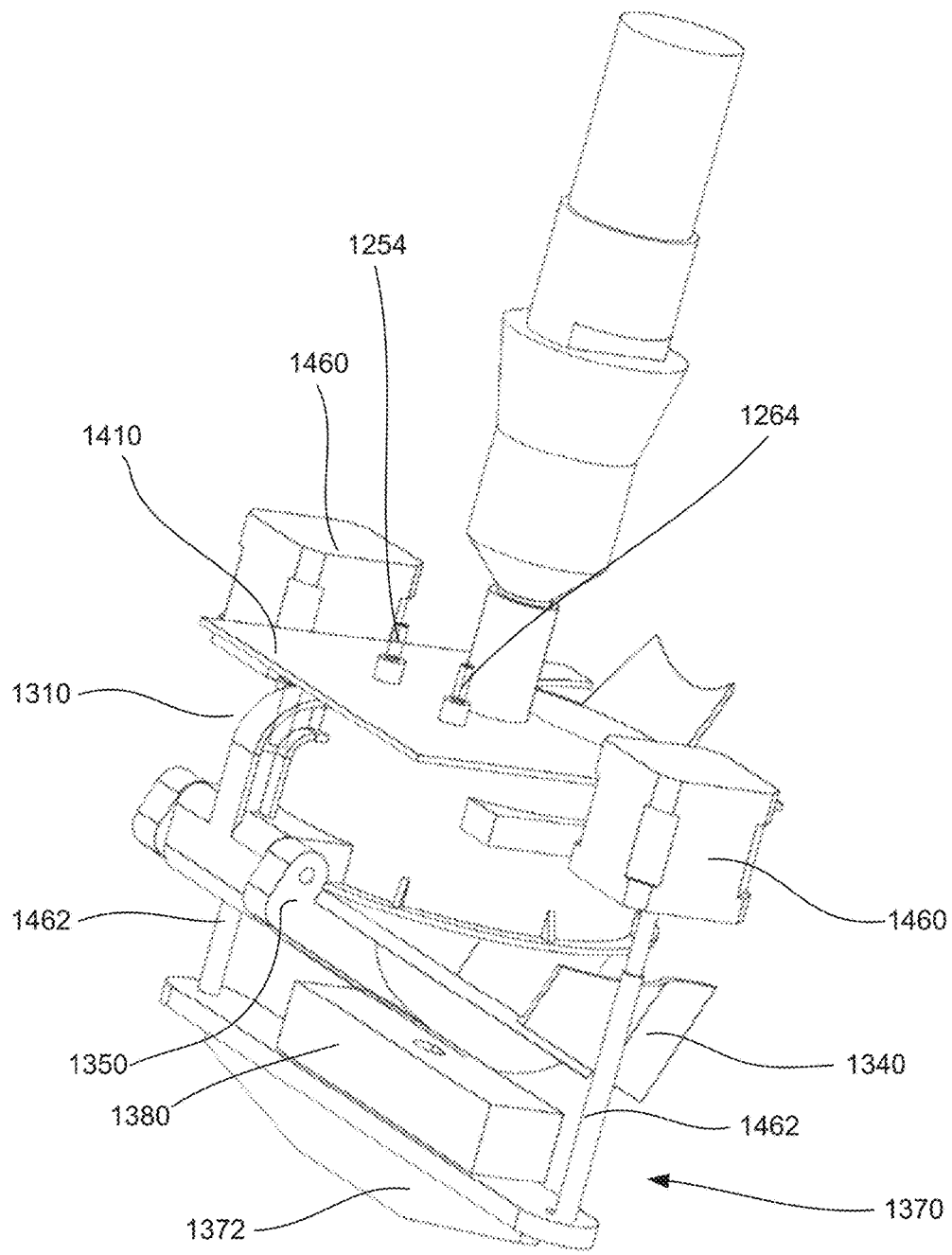
FIG. 27 is a perspective view of the countertop appliance shown in FIG. 18, showing a rear view of the mixing bowl assembly and the mixing actuator assembly.
Figure 28:
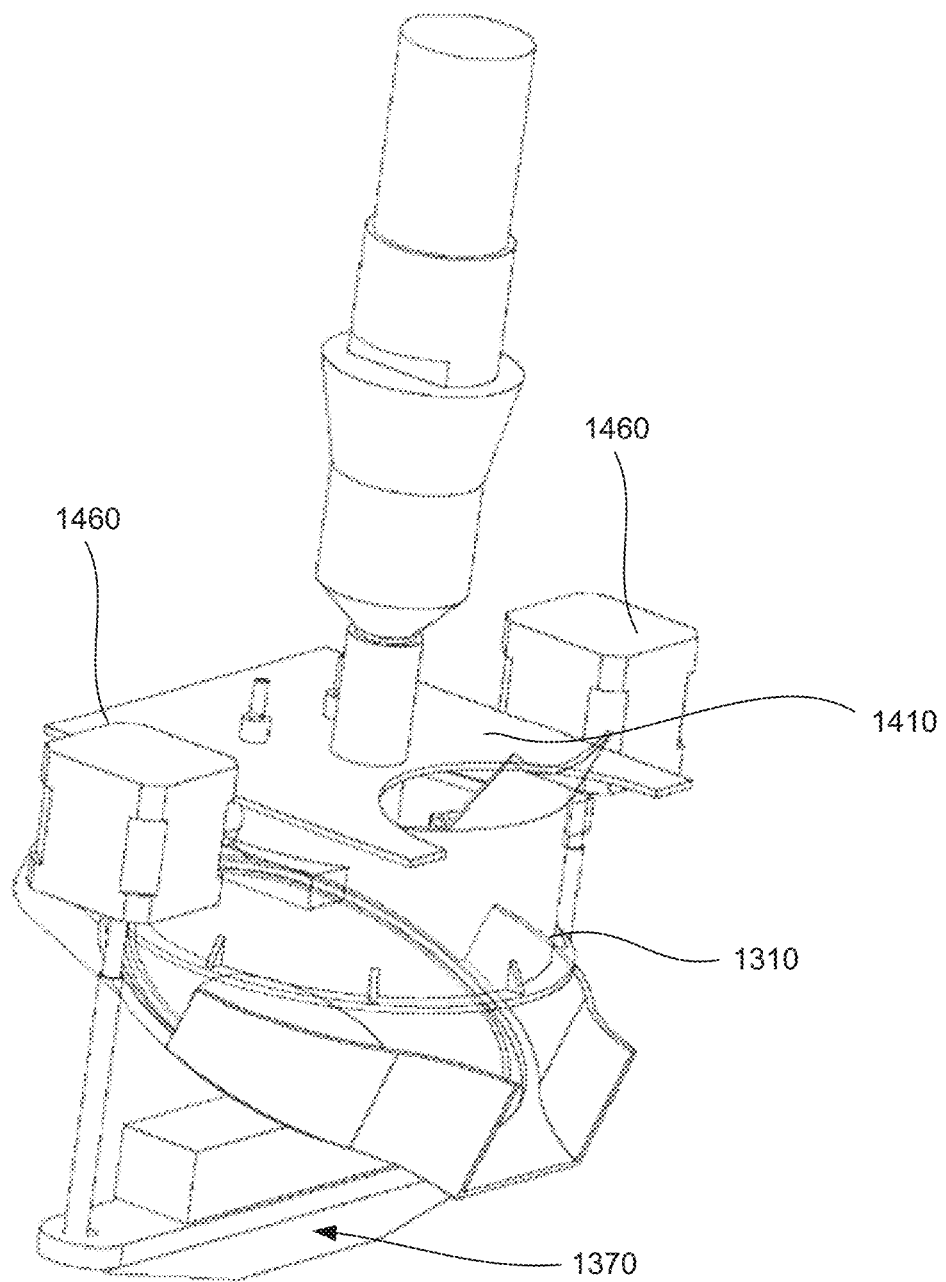
FIG. 28 is a perspective view of the countertop appliance shown in FIG. 18, showing a front view of the mixing bowl assembly and the mixing actuator assembly.
Figure 29:
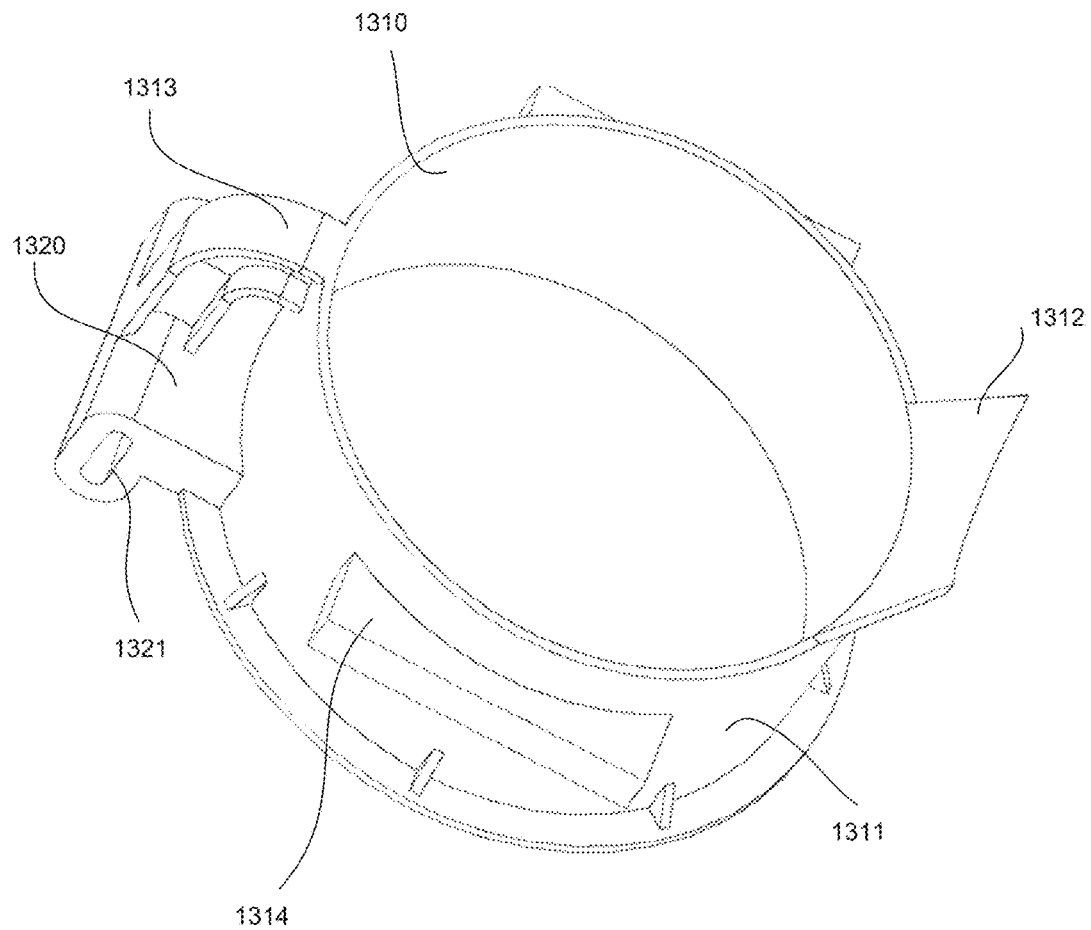
FIG. 29 is a perspective view of an upper bowl of the mixing bowl assembly shown in FIGS. 26-28.
Figure 35:
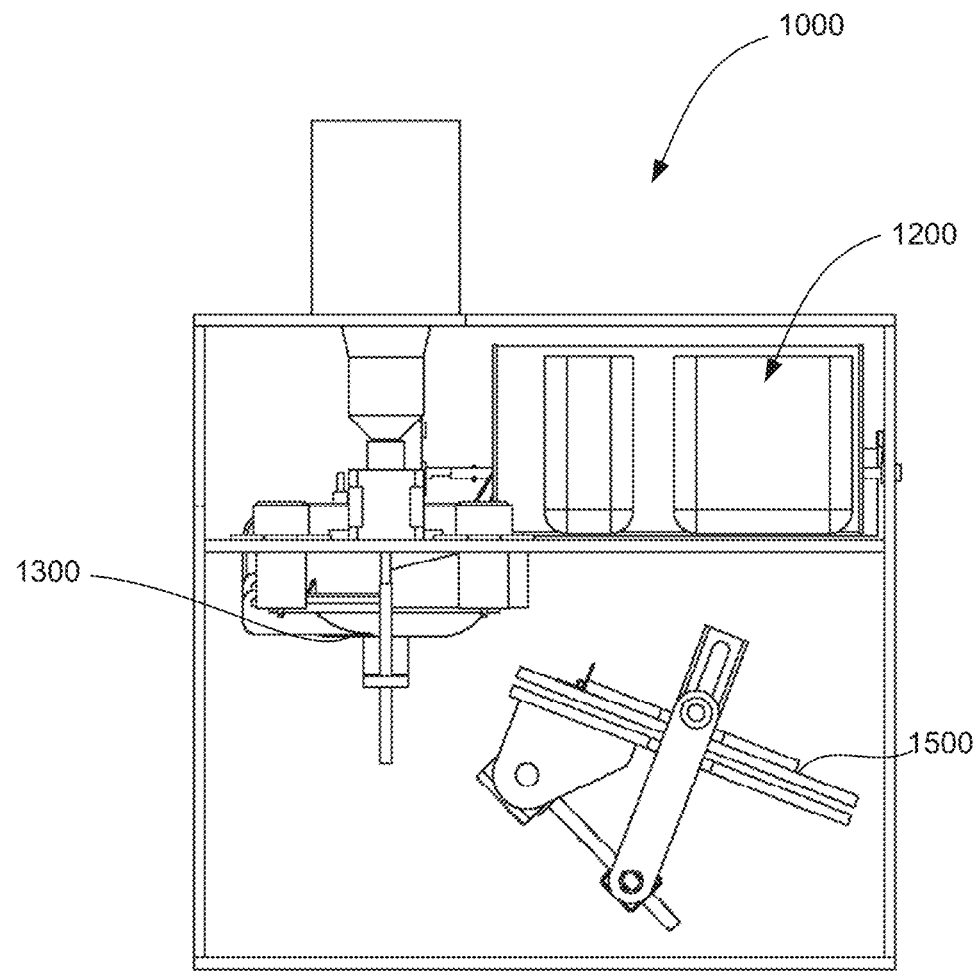
FIG. 35 is a cross-sectional side view of the countertop appliance shown in FIG. 18, showing the mixing bowl assembly in a second configuration and the cooking assembly in a second configuration.

As mentioned above, the lower portion 1340 can be moved between a first (opened) configuration and a second (closed) configuration. As shown in FIGS. 26-28, when the lower portion 1340 is in the first configuration the lower portion 1340 is rotated relative to the upper portion 1310 and the mixing bowl 1302 is open. In this manner, the dough can be transferred from mixing bowl assembly 1302 into the cooking assembly 1500, as described herein. When the lower portion 1340 is in the second configuration it is aligned with the upper portion 1310 and the mixing bowl 1302 is closed as shown in FIG. 35. Additionally, when the lower portion 1340 is in the second configuration, it can either remain movable relative to the upper portion 1310 or it can be locked (i.e., fixed) relative to the upper portion 1310. When the lower portion 1340 is locked in the second configuration, the O-ring (not shown) provides a liquid tight seal between the upper portion 1310 and the lower portion 1340 so that the ingredients can mixed to form dough.

When the lower portion 1340 is unlocked and in the second configuration, as shown in FIG. 10, the outer sidewall 1341 of the lower portion 1340 rests on a scale 1380 of the measurement system 1370. By remaining unlocked, the weight increase caused by the addition of ingredients into the lower portion 1340 can be accurately measured even though the upper portion 1310 is fixedly secured within the housing 1100. Specifically, the scale 1380 is attached to a platform 1372 and it is used to measure the individual ingredients as they are dispensed into the mixing volume 1305. The ingredients are added one at a time (in any suitable order). and the scale 1380 is tared after each ingredient is added so that it is ready to accept the next ingredient. The scale 1380 receives information from the machine-readable tag 1227 so that the desired quantity of each ingredient is known. The platform 1372 is attached to two threaded rods 1462 that are connected to lower portion motors 1460 which are part of the mixing actuator assembly 1400. After all ingredients have been added, the lower portion 1340 is then locked to the upper portion 1310 in the second configuration to facilitate mixing and kneading in a water-tight mixing volume 1305.

As shown in FIG. 27, the mixing actuator assembly 1400 includes a mixing mount 1410, a mixing motor 1420, a mixing paddle assembly 1430 (only shown in FIG. 31), and two lower portion motors 1460. The mixing actuator assembly 1400 has multiple purposes—(1) to move the lower portion 1341 of the mixing bowl 1305 between the first configuration and the second configuration, (2) to mix the ingredients in the mixing volume 1305 when the lower portion 1341 is in the second configuration, and (3) to form or knead the mixed dough into a ball (or spherical shape) suitable for producing a roti.

As shown in FIG. 27, the mixing mount 1410 is located at the top of the upper portion 1310 of the mixing bowl assembly. The mixing mount 1410 has a first opening 1412 to accommodate the flour intake chute 1312 and a second opening 1413 to accommodate the mixing paddle assembly (not shown). The mixing motor 1420 is located above the mixing mount 1410 and is attached to the mixing paddle assembly (not shown). The mixing motor 1420 provides the force to the mixing paddle assembly (not shown) required to mix, knead, and form a ball of dough from the ingredients provided by the ingredient metering assembly.

Figure 31:
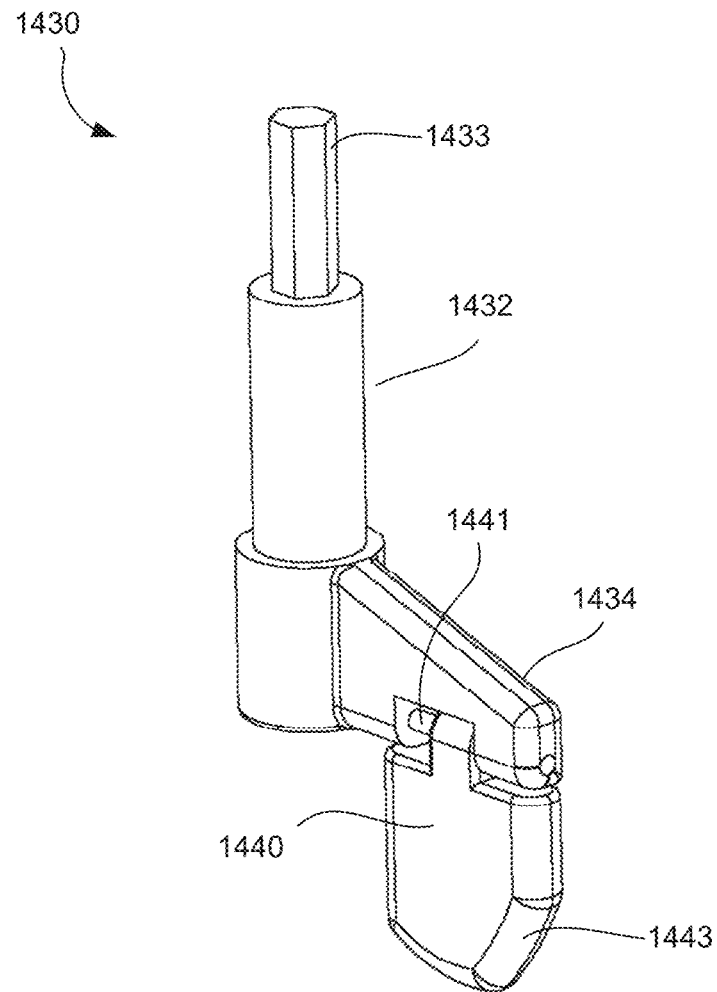
FIG. 31 is a perspective view of the mixing paddle assembly of the countertop appliance shown in FIG. 18.

As shown in FIG. 31, the mixing paddle assembly 1430 includes an adapter shaft 1432, and a paddle 1440. The adapter shaft 1432 has a proximal end portion 1433 and a distal end portion 1434. The proximal end portion 1433 is in the shape of a hexagon and attaches the adapter shaft 1432 to the mixing motor (not shown). The distal end portion 1434 is a lateral protrusion of the adapter shaft 1432 which connects the adapter shaft 1432 to the paddle 1440. The paddle 1440 extends from the adapter shaft 1432 to reach the bottom of the mixing volume (not shown) to mix ingredients. The paddle 1440 attaches to the distal end portion 1434 of the adapter shaft via a spring 1441. The spring 1441 is a torsion spring that allows the paddle 1440 to deflect out of the way for kneading and ball formation of dough. The paddle 1440 has an edge 1443 that is contoured to meet the inner sidewall of the lower portion of the mixing bowl.

As stated above, the mixing actuation assembly 1400 is configured to move the lower portion 1340 of the mixing bowl 1302 between the first configuration and the second configuration. Specifically, the lower portion motors 1460 exert a force on and/or move the lower portion 1340 to change configurations. As shown in FIGS. 27-28, the lower portion motors 1460 are located adjacent to the mixing mount 1410 and are each attached to a threaded rod 1462. The lower portion motors 1460 provide an actuation force to the platform 1372 of the mixing actuator assembly to move the lower portion 1340 between the first (opened) configuration and the second (closed) configuration. Ingredients from the ingredient metering assembly are added to the mixing volume when the lower portion 1340 is in the second configuration, but is unlocked from the upper portion 1310. The lower portion motors 1460 are actuated to move the platform 1372 and thus lock the lower portion 1340 into the upper portion 1310.

The mixing motor 1420 is then activated to provide a force to the mixing paddle assembly 1430 required to mix, knead, and form a ball of dough from the ingredients. In some embodiments, the mixing motor 1420 can rotate in a first direction and at a first speed to mix the ingredients. The paddle 1440 is coupled to the adapter shaft 1432 in a manner such that the paddle 1440 does not deflect relative to the adapter shaft 1432. In this manner, the adapter shaft 1432 and the paddle 1440 form a rigid mixing implement that can reach the bottom of the bowl. In some embodiments, the mixing motor 1420 can rotate in a second direction (opposite the first direction) to knead or form the mixed dough. In such embodiments, the paddle 1440 is coupled to the adapter shaft 1432 via the torsion spring 1441 in a manner such that the paddle 1440 can deflect or move relative to the adapter shaft 1432 to facilitate kneading and ball formation of dough. In some embodiments, the mixing motor 1420 can rotate at a second speed, different from the first speed, during the kneading and forming operation.

Once the dough is prepared, the lower portion motors 1460 are activated to move the lower portion 1340 into the first (or opened) configuration. The mixing motor 1420 then activates the paddle 1440 to push the dough from the lower portion 1340 onto the cooking assembly 1500, as guided by the exit guide 1345. When the dough is transferred to the cooking assembly 1500, the lower portion motors 1460 move the lower portion 1340 back into the second configuration, as shown in FIG. 35. If the instructions contained in the machine-readable tag call for more than one piece of flatbread to be made, when the lower portion is returned to the second configuration the apparatus can begin another cycle of adding ingredients to the mixing volume and mixing the ingredients to produce another dough ball. In this manner, the various subassemblies in the bread maker 1000 can be continuously operating in different portions of the bread-making cycle.

Figure 32:
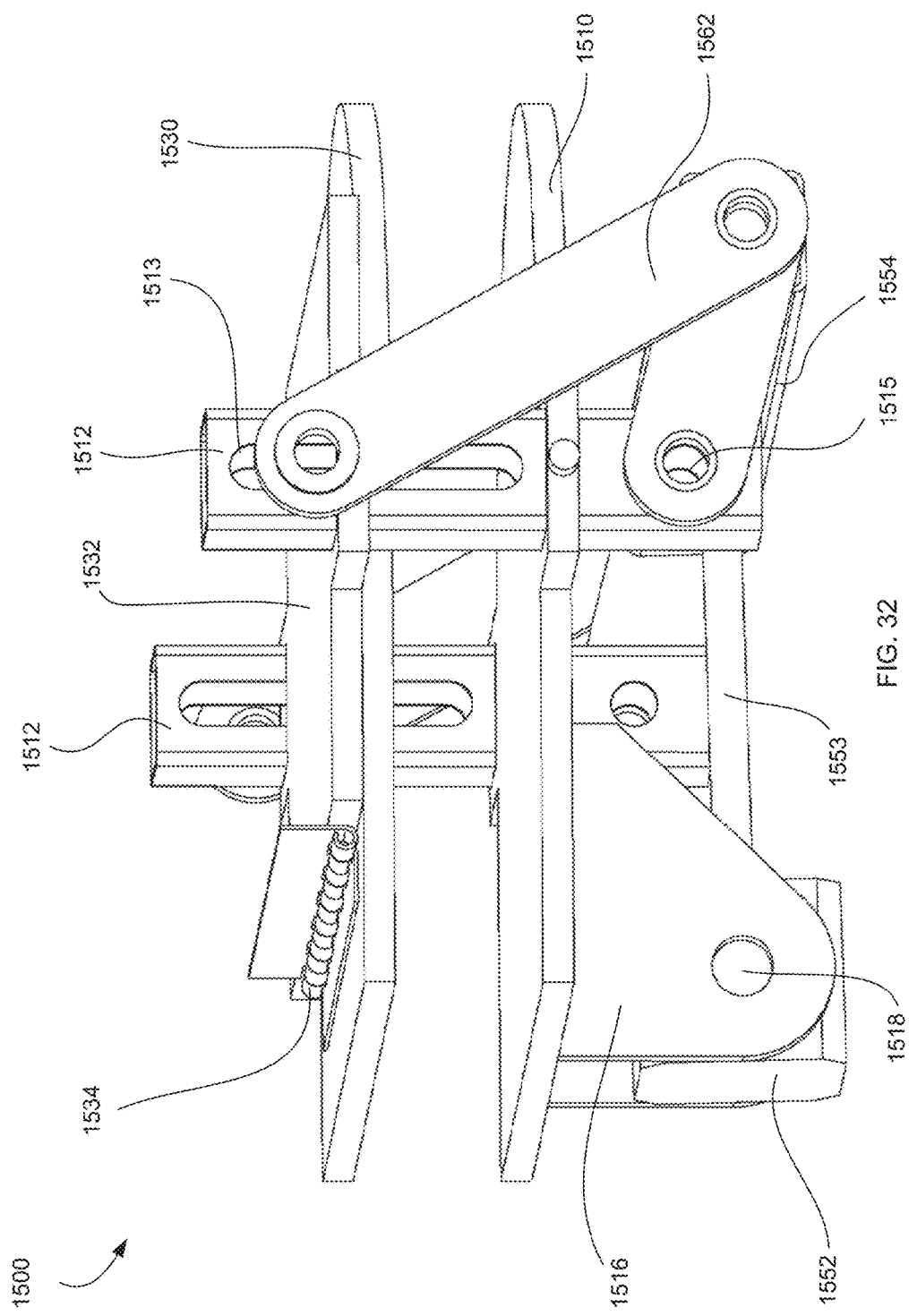
FIG. 32 is a perspective view of the cooking assembly of the countertop appliance shown in FIG. 18.
Figure 33:
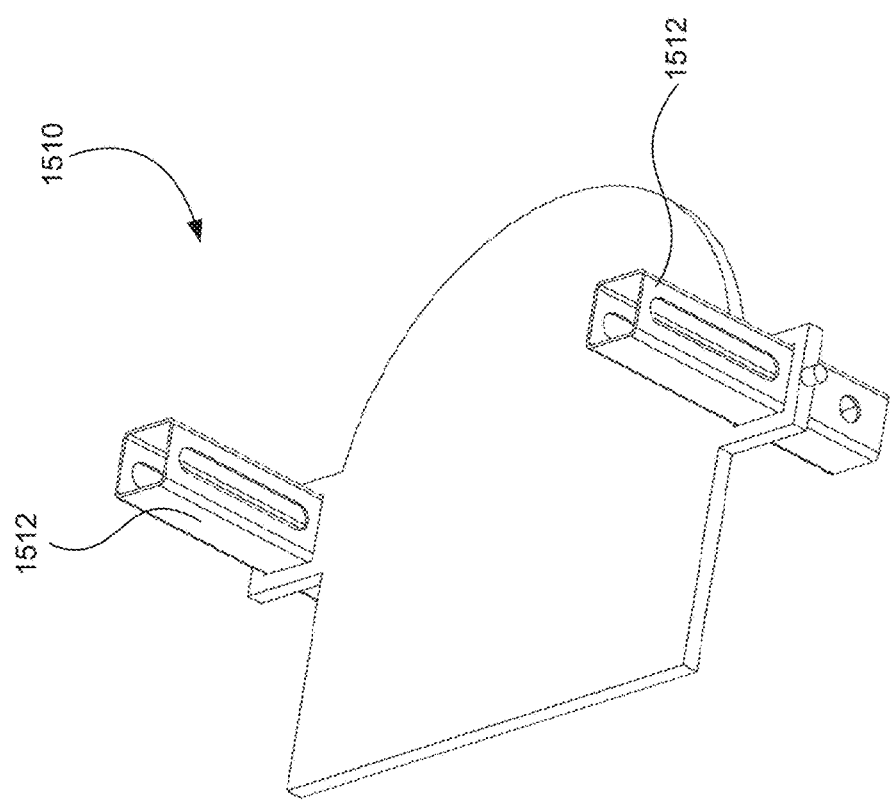
FIG. 33 is a top perspective view of the lower platen of the cooking assembly shown in FIG. 32.

The cooking assembly 1500 is designed to press, cook, and flip flatbread. FIG. 32 shows the cooking assembly 1500 which includes a first platen 1510, a second platen 1530, an actuator assembly 1550, and a heater (not shown). The first platen 1510 includes two connection posts 1512, a heating surface 1520, and a lower connection portion 1516, as shown in FIGS. 16-17. The connection posts 1512 connect the first platen 1510 and the second platen 1530, and provide a rigid structure for the rectilinear motion of the cooking assembly 1500. The connection posts 1512 each define a slot 1513 where the actuator assembly 1550 connects to move the second platen 1530. The heating surface 1520 is fixedly mounted to the connection posts 1512 and is a heated surface to cook dough. The heating surface 1520 can be made of any material that can conduct heat such as steel, aluminum, or the like. In some embodiments, the heating surface 1520 can include a non-stick material (e.g., a Teflon or ceramic material) to facilitate removal of the cooked flat bread therefrom. The lower connection portion 1516 is located at the base of the heating surface 1520 and allows the first platen 1510 to be connected to the motor 1552 of the actuator assembly 1550.

Figure 34:
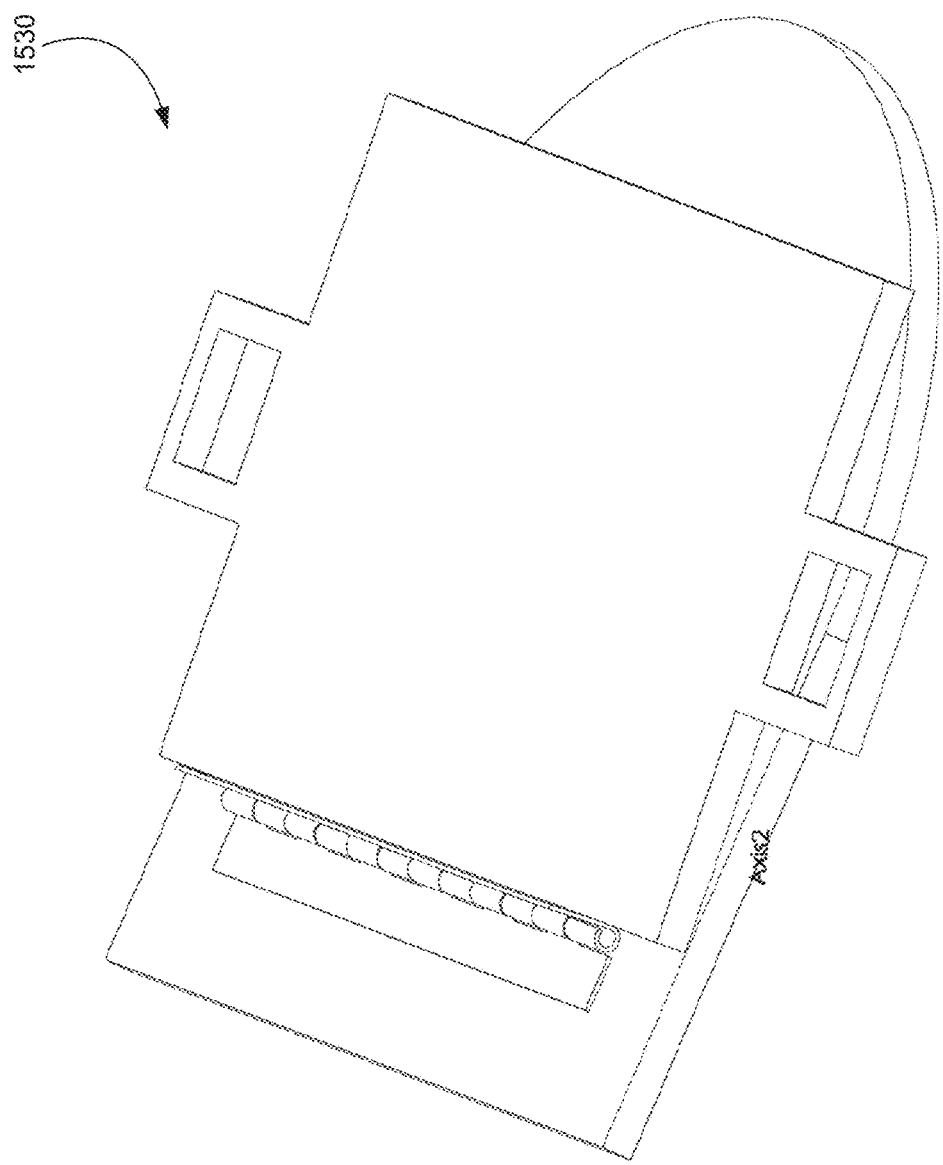
FIG. 34 is a top perspective view of the upper platen of the cooking assembly shown in FIG. 32.

As shown in FIGS. 32 and 34, the second platen 1530 includes an upper carriage 1532, a heating surface 1540, and a hinge 1534. The upper carriage 1532 defines slots 1533 that receive the connection posts 1512 of the first platen. The heating surface 1540 is a heated surface that can cook dough. The heating surface 1540 can be made of any material that can conduct heat such as steel, aluminum, or the like. In some embodiments, the heating surface 1540 can include a non-stick material (e.g., a Teflon or ceramic material) to facilitate removal of the cooked flat bread therefrom. The upper carriage 1532 and the heating surface 1540 are connected by the hinge 1534. The hinge 1534 allows the heating surface 1540 move relative to the heating surface 1520. In this manner, the heating surface 1540 can form a wedge with the heating surface 1520 of the first platen 1510. The wedge is used to catch the dough as it is ejected from the lower portion of the mixing bowl assembly. FIG. 23 shows the cooking assembly 1500 in a first (or receiving) configuration where the first platen 1510 and the second platen 1540 form the wedge. In this first configuration the cooking assembly 1500 is ready to receive dough from the lower portion 1340 of the mixing bowl assembly 1302. When the dough is captured in the wedge created by the first platen 1510 and the second platen 1530, the actuator assembly of the cooking assembly is activated, e.g., to flatten the dough.

When the cooking assembly 1500 is in the first (or receiving) configuration, the first platen 1510 and the second platen 1530 can produce a wedge of any suitable angle. In this manner, formed dough portions having different sizes (i.e. different diameters) can be positioned in the desired location between the heating surface 1520 and the heating surface 1540. For example, a larger angle accommodates dough portions of larger sizes, whereas a smaller angle accommodates dough portions having smaller sizes. In some embodiments, the wedge angle can be less than about 5 degrees. In other embodiments, the wedge angle can be between about 5 degrees and about 15 degrees. In yet other embodiments, the wedge angle can be between about 10 degrees and about 25 degrees.

Figure 36:
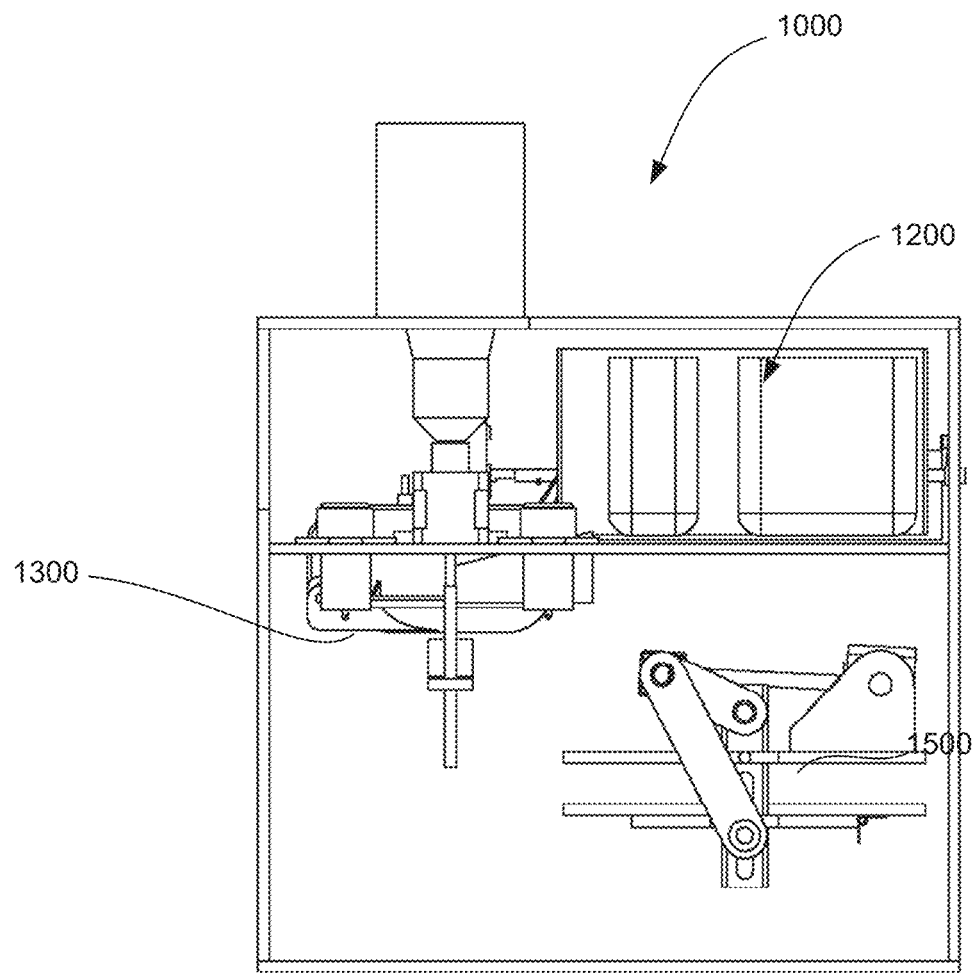
FIG. 36 is a cross-sectional side view of the countertop appliance shown in FIG. 18, showing the mixing bowl assembly in a second configuration and the cooking assembly in a third configuration.
Figure 37:
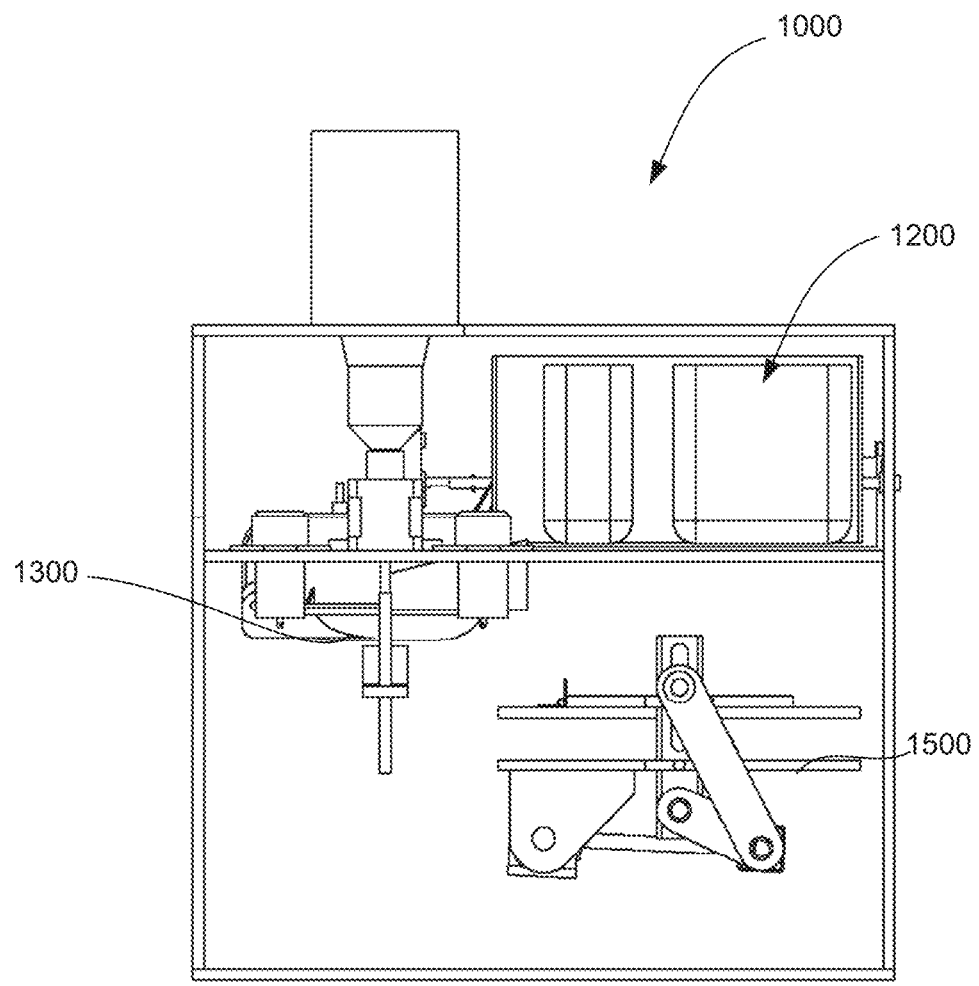
FIG. 37 is a cross-sectional side view of the countertop appliance shown in FIG. 18, showing the mixing bowl assembly in a second configuration and the cooking assembly in a fourth configuration.

As shown in FIG. 32, the actuator assembly 1550 includes a motor 1552, a lead screw 1553, a pull bar 1554, and a linkage 1560. The motor 1552 is attached to the lower connection portion 1516 of the first platen 1510. The lead screw 1553 is attached to the motor 1552 and to the pull bar 1554. When the motor 1552 is activated the lead screw 1553 turns which then rotates the pull bar 1554. The pull bar 1554 is also attached to the linkage 1560. The linkage 1560 includes a first arm 1562 and a second arm 1563. The first arm 1562 is attached to the slots 1513 of the first platen 1510 and the second arm 1563. As the pull bar 1554 rotates, the second arm 1563 rotates causing the first arm 1562 to move up and down within the slots 1513 of the first platen 1510. Thus, activation of the motor 1552 causes the cooking assembly to move from the first configuration to a second configuration, as shown in FIG. 36. In the second configuration the second platen 1540 pivots to be parallel with the first platen 1510 and is lowered to the first platen 1510 causing the dough ball to be flattened into a disc of even thickness.

After the dough is flattened by the first platen 1510 and the second platen 1540, the cooking assembly 1500 moves from the second configuration to a third configuration. FIG. 36 shows the cooking assembly 1500 in the third configuration. In the third configuration, the cooking assembly 1500 rotates backwards and the second platen moves away from the first platen such that the heating surface of the second platen is horizontal to the heating surface of first platen. This configuration of the cooking assembly 1500 allows the heating surfaces 1520, 1540 to be spaced apart during the cooking process which allows the bread to puff up into a spherical shape. Once in the third configuration, the heater (not shown) is activated to apply heat to the heating surface 1540 of the second platen 1530. One side of the dough is then cooked for a prescribed amount of time specified in the instructions set forth in the machine-readable tag 1227 of the ingredient metering assembly 1200.

After the first side of the dough is cooked for the prescribed amount of time, the cooking assembly 1500 is moved from the third configuration to a fourth configuration. As shown in FIGS. 20-21, the cooking assembly 1500 rotates 180 degrees when it moves from the third configuration to the fourth configuration. When the cooking assembly 1500 is in the fourth configuration the heater (not shown) applies heat to the heating surface 1520 of the first platen to cook the other side of the dough.

Figure 38:
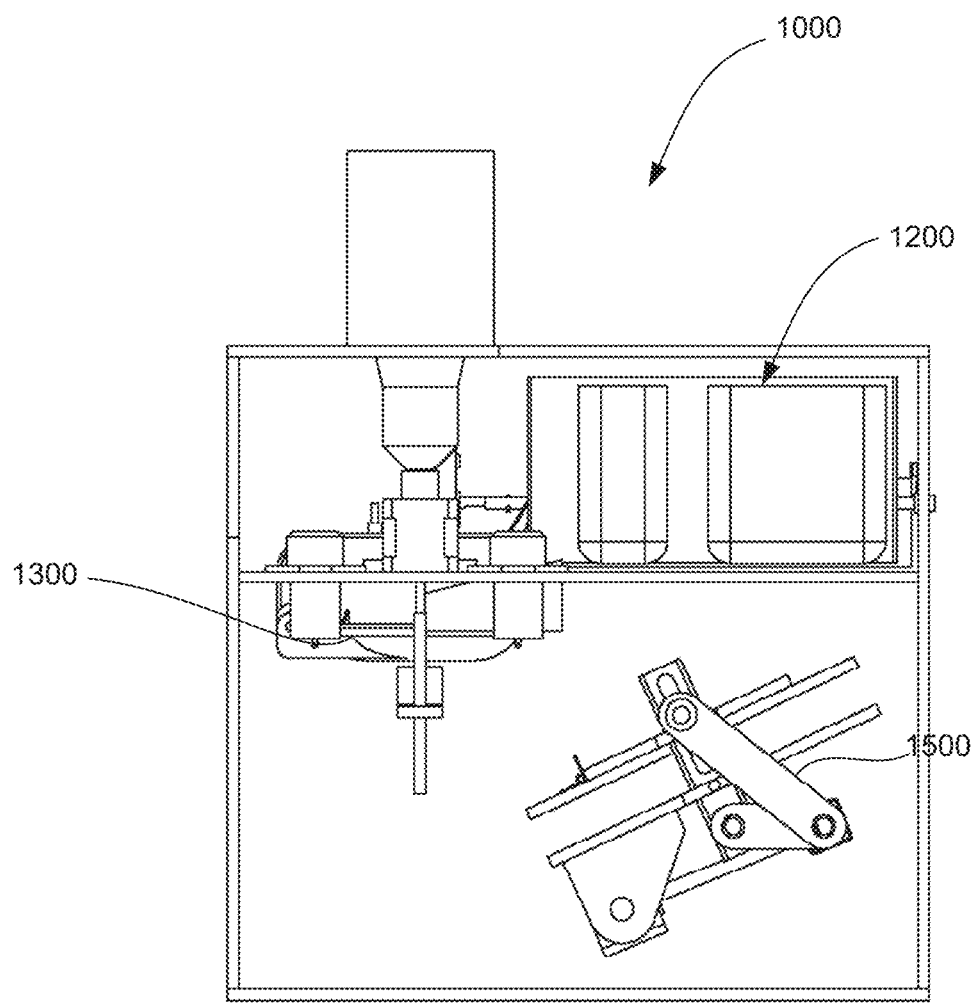
FIG. 38 is a cross-sectional side view of the countertop appliance shown in FIG. 18, showing the mixing bowl assembly in a second configuration and the cooking assembly in a fifth configuration.
Figure 39:
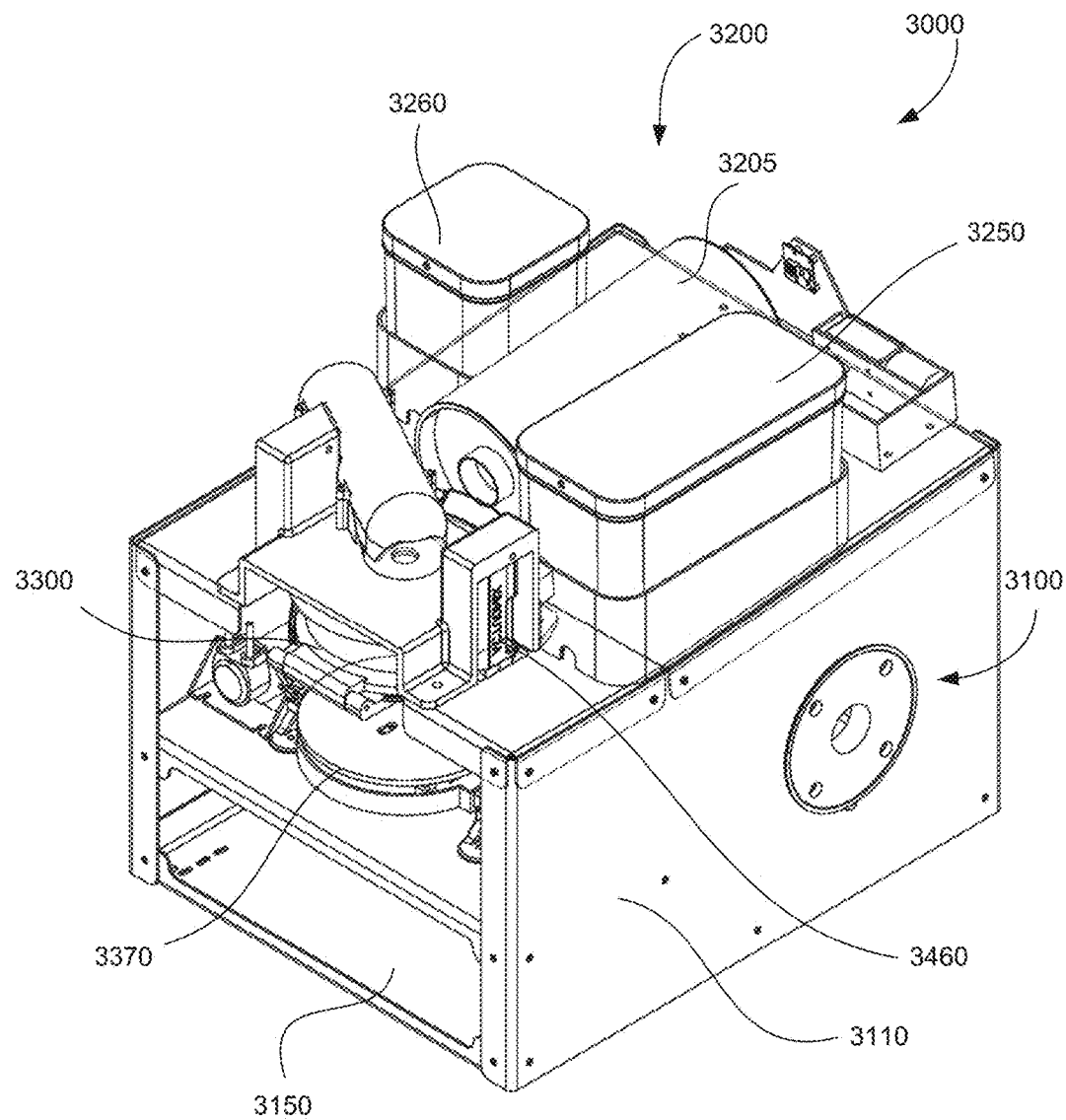
FIG. 39 is a perspective view of a cooking system according to an embodiment.
Figure 40:
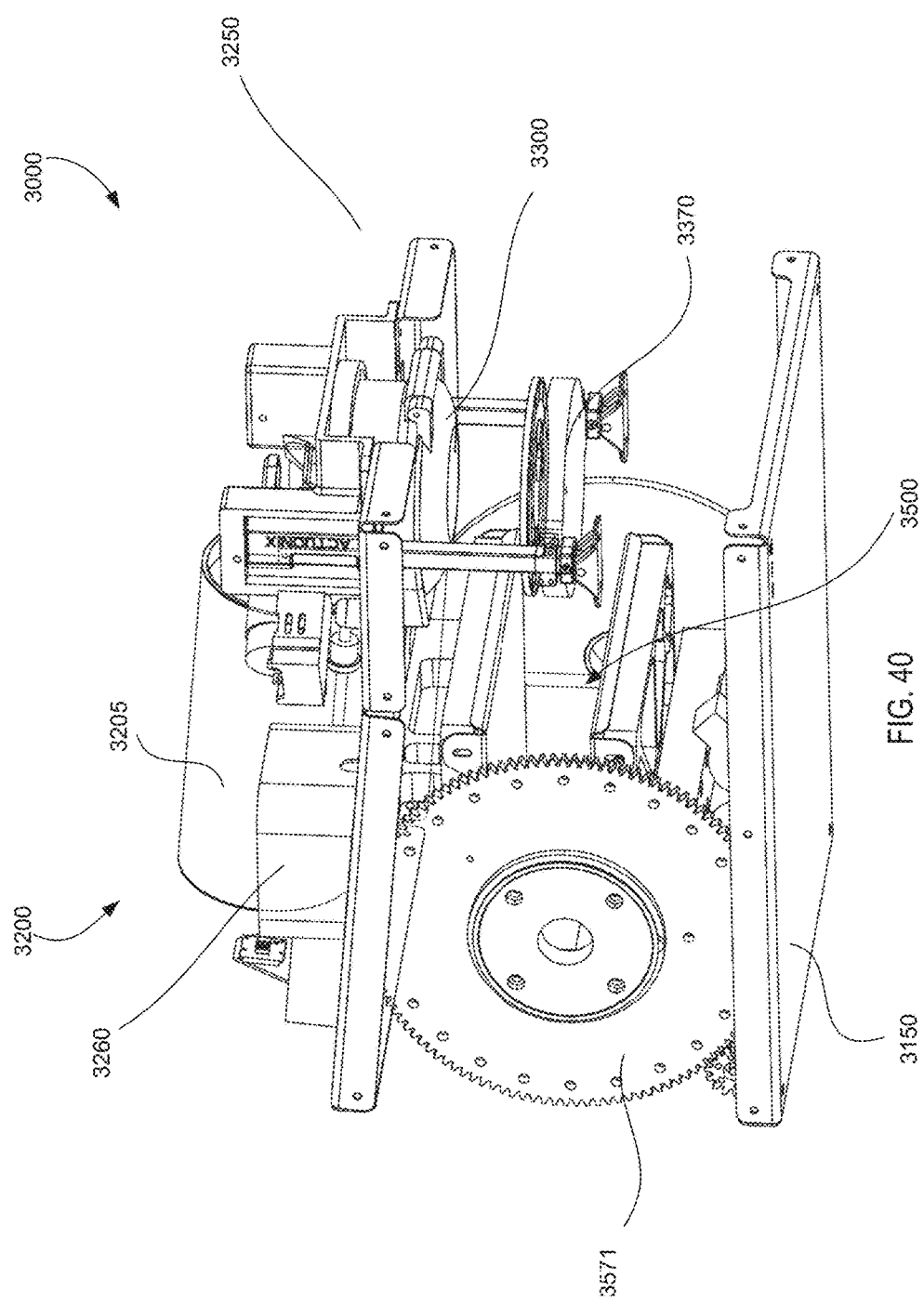
FIG. 40 is a perspective view of the cooking system shown in FIG. 39, with a portion of the housing removed to show certain components of the cooking system.

After the second side of the dough is cooked for the prescribed amount of time, the cooking assembly 1500 moves from the fourth configuration to a fifth configuration. In the fifth configuration, as shown in FIG. 38, the cooking assembly 1500 rotates downward at an angle of about 45 degrees such that the cooked flatbread slides off of the heating surface 1520 into the storage compartment of the housing. In some embodiments, the angle of rotation of the cooking assembly can be about 55 degrees. In other embodiments, the angle of rotation of the cooking assembly can be about 65 degrees. In other embodiments, the angle of rotation of the cooking assembly can be about 75 degrees. In yet other embodiments, the angle of rotation of the cooking assembly can be about 85 degrees.

The heater or heaters (not shown) used to produce heat for the heating surfaces 1520, 1540 can be located below the cooking assembly 1500 in the lower portion 1133 of the housing. In other embodiments, the heater or heaters can be incorporated within each platen 1510, 1530 below each respective heating surface 1520, 1540. The heaters can be any suitable heater, such as, for example, resistance-type heaters. The heaters are operatively coupled to the electronics/control system 1900 to provide accurate control of the temperature and time of heating.

The apparatus 1000 also includes an electronic assembly 1900 (not shown) that is configured to read the machine-readable tag of the ingredient metering assembly to receive instructions. The instructions include the amount of ingredients that are needed, the amount of time to mix the ingredients to form the dough, the temperature to which the heater or heaters should be set, the timing required for cooking each side of the dough, and the like. These instructions set the parameters for the electronic assembly to control all of the motors of the ingredient metering assembly, the mixing actuator assembly, and the cooking assembly, as well as control the pumps of the ingredient metering assembly and the heater of the cooking assembly.

The electronic assembly 1900 (not shown) includes a power supply 1910 and a control module. The power supply provides DC power to the motors, the heaters, and control module. As shown in FIG. 21, the power supply 1910 is located in the upper portion 1132 of the housing adjacent to the ingredient metering assembly 1200. In other embodiments, any of the electronic assemblies described herein can include any suitable power supply, such as a power supply that provides AC power, DC power or a combination of AC and DC power.

The electronic assembly 1900 can be similar to any of the electronic assemblies described herein, such as the electronic circuit system 5900. For example, the electronic assembly 1900 can include any of the modules described herein and can perform any of the functions described with respect to the electronic circuit system 5900. In some embodiments, the control module includes at least a feedback module and an actuation module. The feedback module is implemented at least in part in hardware and, in some embodiments can include one or more sensors. The sensor is configured to detect the temperature of the heating surfaces of the cooking assembly. The actuation module is configured to send a signal to the heater to adjust the heat produced such that the temperature of the heating surface is changed.

In some embodiments the control module can include a memory, a processor, and an input/output module (or interface). The control module can be coupled to a computer or other input/output device via the input/output module (or interface). The processor (and any of the processors described herein) can be any processor configured to, for example, write data into and read data from the memory of the control module, and execute the instructions and/or methods stored within the memory. Furthermore, the processor can be configured to control operation of the other modules within the control module (e.g., a feedback module). In other embodiments, the processor (and any of the processors described herein) can be, for example, an application-specific integrated circuit (ASIC) or a combination of ASICs, which are designed to perform one or more specific functions. In yet other embodiments, the microprocessor can be an analog or digital circuit, or a combination of multiple circuits.

The memory device of the control module (and any of the memory devices described herein) can be any suitable memory device such as, for example, a read only memory (ROM) component, a random access memory (RAM) component, electronically programmable read only memory (EPROM), erasable electronically programmable read only memory (EEPROM), registers, cache memory, and/or flash memory. Any of the modules (a feedback module) can be implemented by the processor and/or stored within the memory.

The input/output module of the control module can be any suitable user interface. As shown in FIG. 18, the input/output module of apparatus 1000 is a LCD input/output screen 1950. The LCD input/output screen 1950 allows the user to manually adjust the instructions of the machine-readable tag 1227. For example, the user can manually add the ingredients from the ingredient metering assembly or change the temperature setting or cooking times of the cooking assembly 1500. The LCD input/output screen 1950 also allows the user to monitor the progress of the apparatus as it goes through the instructions. For example, the user can tell how many pieces of flatbread have been made, if the instructions are complete, or the like.

FIGS. 39-52 are various views of a cooking system 3000 (also referred to as a bread maker or a flatbread maker) according to an embodiment. The bread maker 3000 includes a housing 3100, within which a variety of modules (or assemblies) are contained. Specifically, the bread maker 3000 includes an ingredient metering assembly 3200, a mixing bowl assembly 3300, a mixing actuator assembly 3400, a cooking assembly 3500, and a control/electronic assembly (not shown, but that can be similar to any of the electronic circuit systems or electronic control assemblies described herein). The bread maker 3000 is similar in many respects to the bread maker 1000 described above, and thus certain aspects are not described in detail below. Any of the components or assemblies of the bread maker 1000 (or any of the cooking systems described herein) can be included in the bread maker 3000, and vice-versa. A description of each module and/or subsystem follows.

The housing 3100 includes outer sidewalls 3110 and a support base 3150. The outer sidewalls 3110 define an interior volume that contains the various subassemblies and a storage area where the finished bread is stored. The housing 3100 is made of a strong, durable, heat resistant material that is lightweight and easy to clean. For example, in some embodiments, the housing 3100 can be made of aluminum, stainless steel, plastic, ceramic, or the like. Like the bread maker 1000, in some embodiments, portions of the housing can be constructed with insulative material to allow the apparatus to maintain consistent cooking temperatures within the various portions of the device. The housing 3100 can define any suitable access openings or panels that allow a user to access the subassemblies within the housing 3100.

The ingredient metering assembly 3200, shown in FIGS. 39-42, includes a water reservoir 3250, an oil reservoir 3260, a flour container assembly 3205, and a flour delivery system. The ingredient metering assembly 3200 is located in the upper portion of the housing 3100, and also includes the tubing, interconnects and other components to couple the ingredient metering assembly 3200 to the mixing assembly 3300 and/or other assemblies within the bread maker 3000. The water reservoir 3250 is similar to the water reservoir 1250 described above, and is configured to store water and dispense water into the mixing bowl assembly 3300. The oil reservoir 3260 is similar to the oil reservoir 1260 described above, and is configured to store oil and dispense of into the mixing bowl assembly 3300. In some embodiments, one or both of the water reservoir 3250 and the oil reservoir 3260 can include valves (not shown) that are used to control the flow of the liquids from the respective reservoirs. The control can be performed using any of the methods and using any of the modules (e.g., metering module), as described herein.

Figure 41:
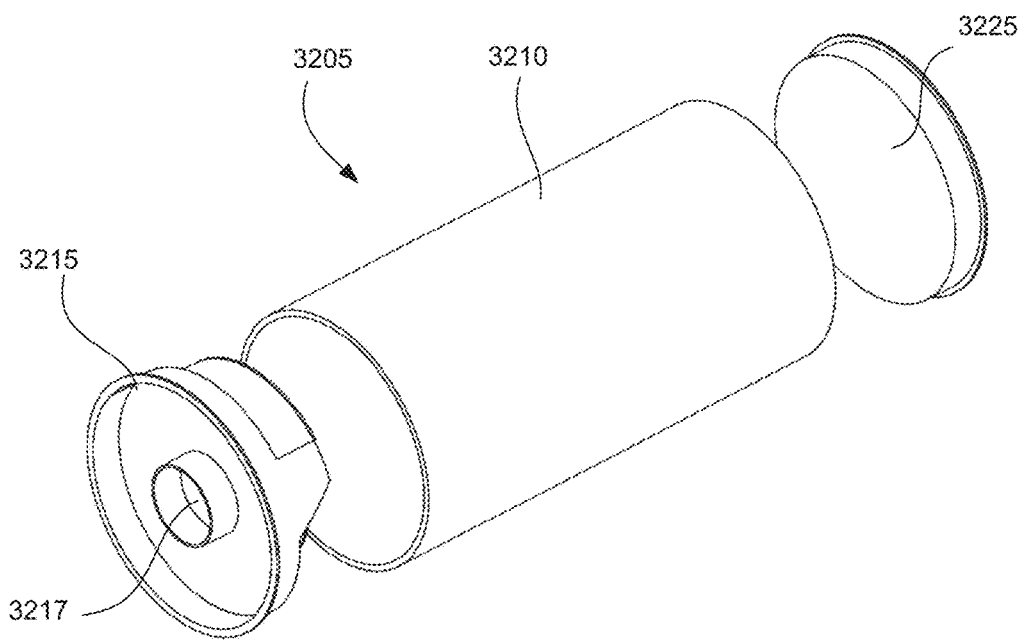
FIG. 41 is an exploded perspective view of an ingredient container assembly of the cooking system shown in FIG. 39.
Figure 42:
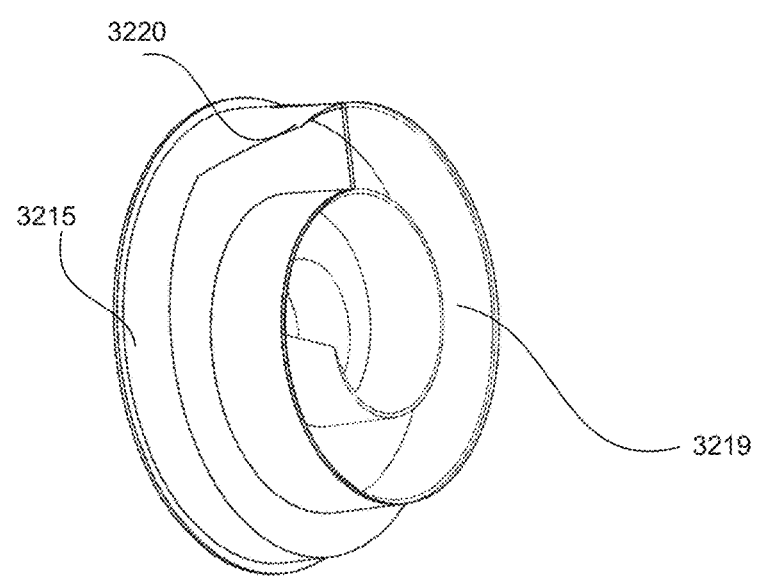
FIG. 42 is a portion of the ingredient container assembly shown in FIG. 41.

The flour container assembly 3205 stores dry flour and seasonings and is designed to hold an amount of ingredients sufficient to make any suitable number of roti. The flour container assembly 3205 can be removed from the housing 3100. As shown in FIGS. 41 and 42, the flour container assembly 3205 includes a tube 3210, a first lid 3215 and a second lid 3225. The first lid 3215 has a connection portion that connects the first lid 3215 with a first end portion of the tube 3210. The first lid 3215 is designed to allow for the release of flour in specific measurements. The first lid 3215 includes a dispensing protrusion 3220 and defines a spiral outlet passageway 3219 through which flour can be conveyed to the exit opening 3217. The dispensing protrusion 3220 is designed so that a specific amount of flour can be dispensed from the inner volume of the tube 3210 when the tube 3210 is rotated, as described herein (e.g., with respect to the container assembly 1205). The outlet slot 3219 is located adjacent to the dispensing protrusion 3220 and funnels, directs and/or conveys the flour to the outlet opening 3217 defined by the first lid 3215.

The second lid 3225 of the flour container assembly 3210 includes a connection portion such that the second lid 3225 is coupled to the second end portion 3212 of the tube 3210. In some embodiments, the connection portion can be ribbed or otherwise proportioned such that the second lid 3225 is press fit into the second end portion of the tube 3210. Although not shown, in some embodiments, the second lid 3225 also includes a machine-readable tag located on the outer surface of the second lid 3225. The machine-readable tag can be like any of the machine readable tags described herein, and can allow automatic or semi-automatic control of the cooking device 3000, as described above (e.g., with respect to the system 5000 or the bread maker 1000).

In use, the flour container assembly 3205 can placed into the housing 3100 adjacent to the flour delivery system. The flour delivery system can be similar to the flour delivery system 1230 described above, and can rotate the tube 3210 of the flour container assembly 3205 to dispense flour from the container 3205. The amount of rotation can be controlled by the electronic circuit system (not shown). Further, the measurement system 3370 can provide feedback (e.g., an amount of flour in the mixing bowl assembly 3300) to the electronic circuit system to ensure that the desired amount of flour is dispensed. Although the flour delivery system is described as rotating the tube 3210 to dispense the flour therein, in other embodiments, a flour delivery system can include any suitable mechanism for dispensing flour from the flour container assembly 3205. For example, in some embodiments, a flour delivery system can include a linear actuator that moves a plunger within the tube 3210 to dispense the flour therein. In other embodiments, a flour delivery system can include an actuator that both rotates and translates a plunger within the tube 3210 to dispense the flour therein.

Figure 43:
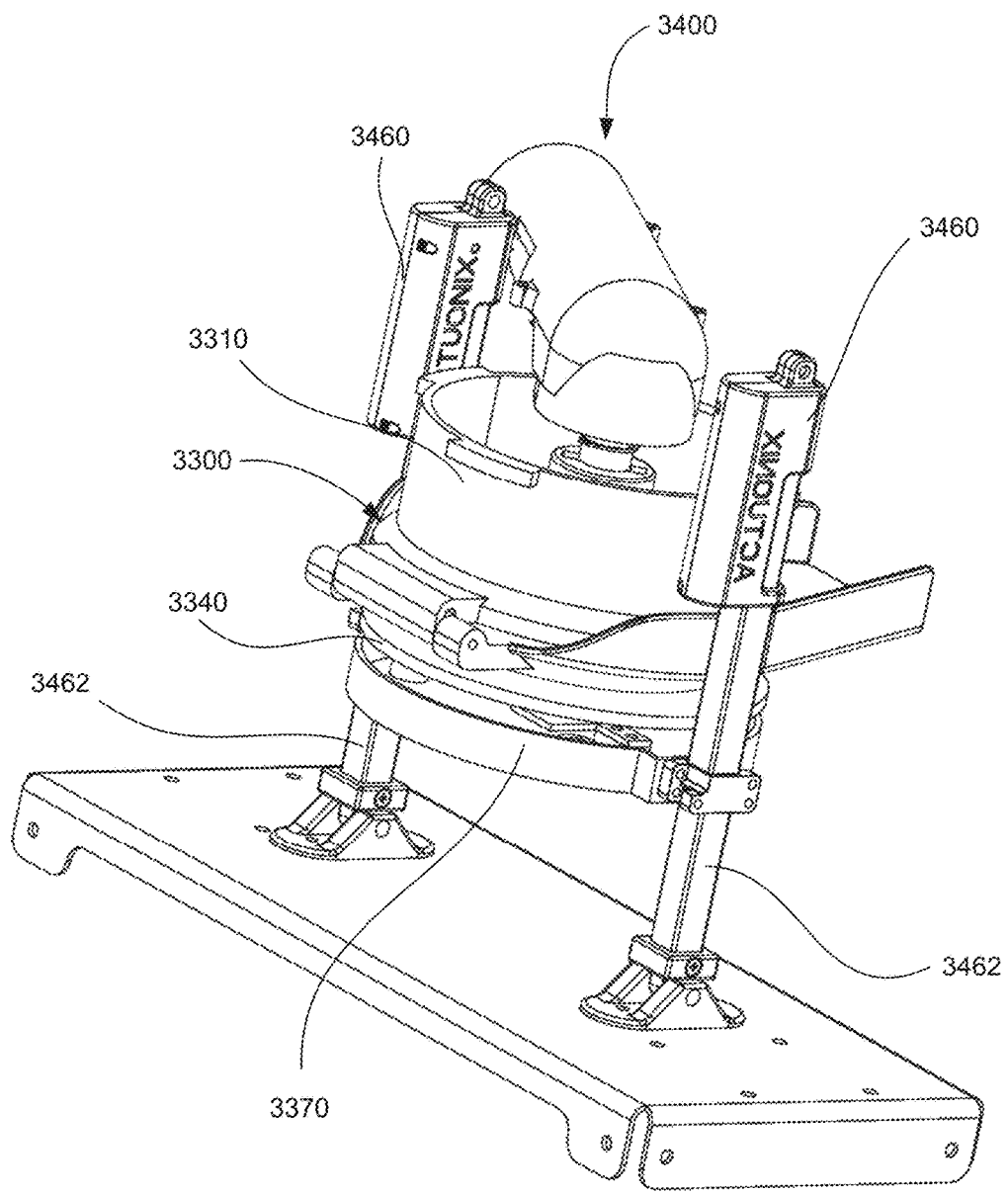
FIG. 43 is a perspective view of a mixing actuator and a mixing container assembly of the cooking system shown in FIG. 39.
Figure 44:
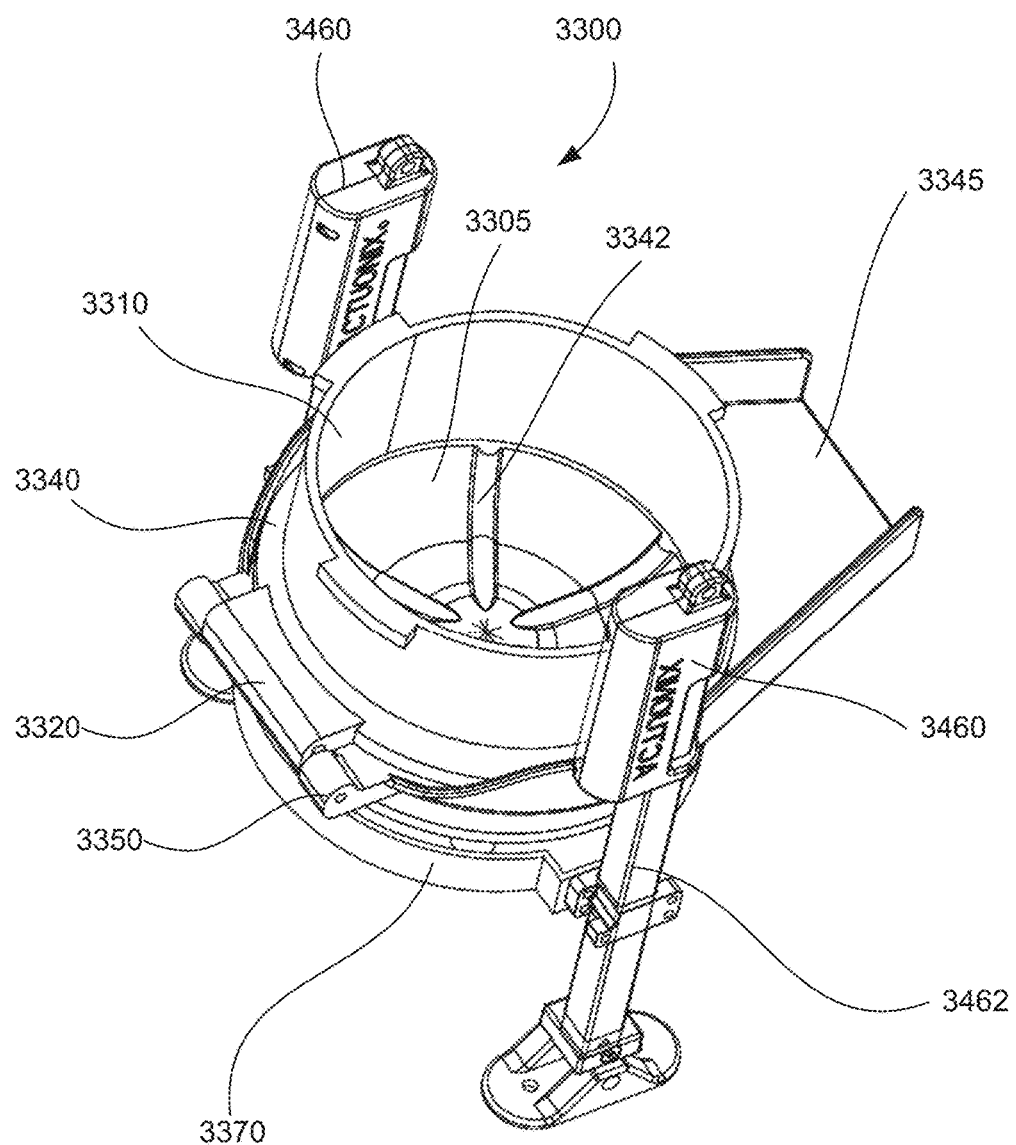
FIG. 44 is a perspective view of the mixing container assembly shown in FIG. 43.
Figure 45:
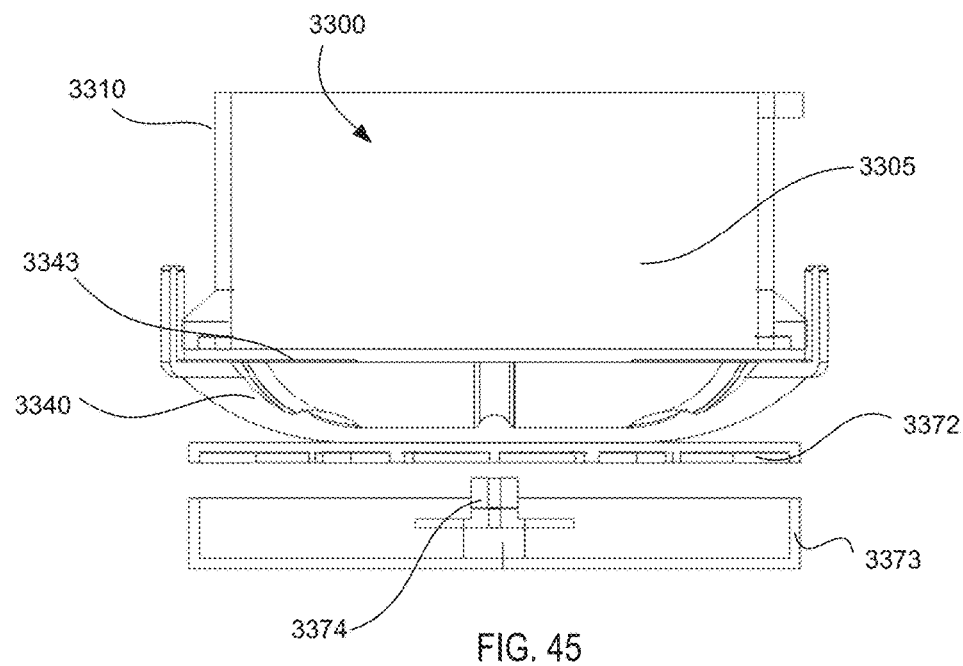
FIG. 45 is a cross-sectional view of the mixing container assembly shown in FIG. 43.
Figure 46:
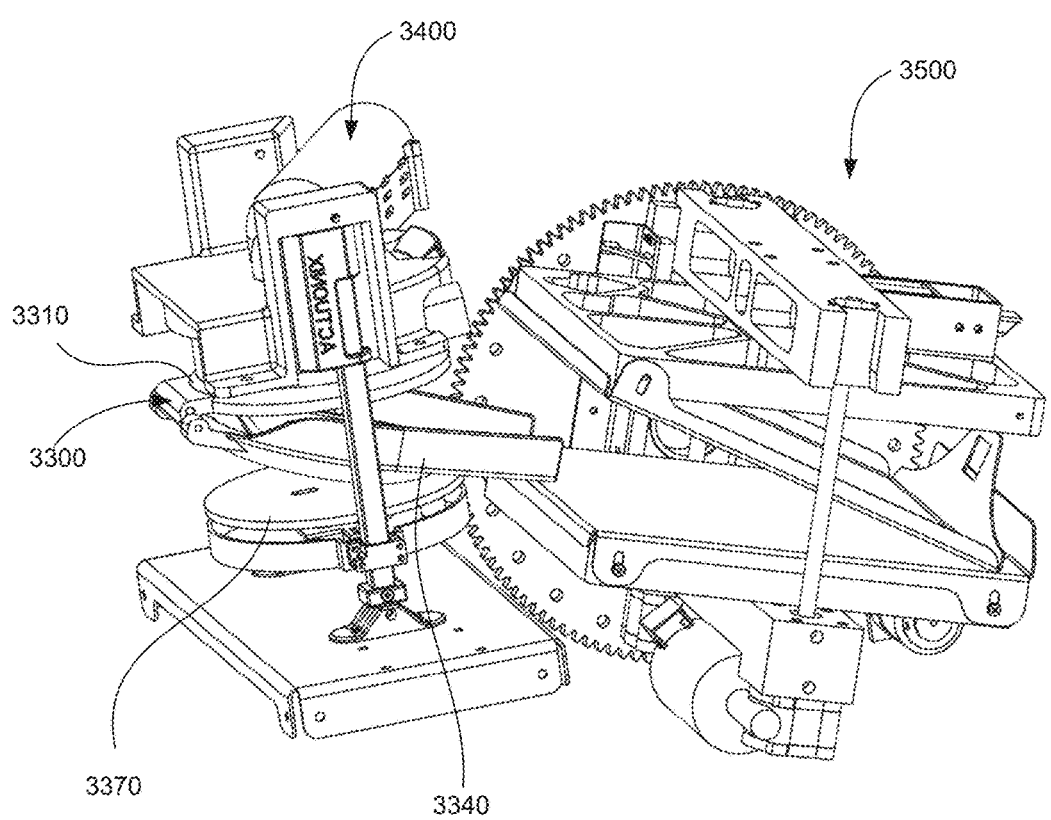
FIGS. 46, 47A and 47B are perspective views of a cooking assembly of the cooking system shown in FIG. 39 in a receiving configuration.

When the bread maker 3000 is activated, the ingredients from the ingredient metering assembly 3200 are dispensed from their respective containers into the mixing bowl assembly 3300, which is shown in FIGS. 43-45. As shown in FIG. 43, the mixing bowl assembly 3300 includes a mixing bowl (having an upper portion 3310 and a lower portion 3340) and a measurement system 3370. The mixing bowl is similar to the mixing bowl 1302 described above, and all aspects of the mixing bowl 1302 can be included in the mixing bowl included in the bread maker 3000. For example, the upper portion 3310 includes a cylindrical sidewall that defines a portion of the mixing volume 3305. The upper portion 3310 can include any suitable mounting protrusion or structure to secure the mixing bowl within the bread maker 3000. The upper portion 3310 also includes a coupling arm 3320 that defines an elongated slot 3321. The slot 3321 allows for the lower portion 3340 to be moved between various configurations. Specifically, the mixing bowl assembly 3300 can be transitioned between a measurement configuration (FIG. 43-45), a mixing configuration, and a delivery configuration (FIG. 46).

The lower portion 3340 of the mixing bowl includes a sidewall and an actuation arm 3350. An outer portion of the sidewall defines the bottom of the mixing bowl that, when the mixing bowl assembly 3300 is in the measurement configuration (FIG. 45), can contact a platform 3372 of the measurement system 3370. The inner portion of the sidewall is concave, as shown in FIG. 44, and defines a portion of the mixing volume 3305 when the lower portion 3340 is connected to the upper portion 3310, and when the lower portion 3340 is in the mixing configuration, as discussed herein. The inner sidewall contains ridges 3342 that cause the dough ball to roll instead of slide during kneading and formation. The sidewall includes a seal surface 3343 (which can be an o-ring groove, a flat surface, or the like, to provide a liquid tight seal when the lower portion 3340 is in the second (closed) configuration, and is further "locked" to the upper portion 3310 (i.e., after the ingredients have been weighed). The exit guide 3345 is attached to the top of the lower portion 3340 and defines a pathway to transfer dough, once it is formed, from the mixing volume 3305 to the cooking assembly 3500 (see FIG. 46). The actuation arm 3350 is attached to the coupling arm 3320 of the upper portion 3310 of the mixing bowl by a pin (not shown). The pin rides in the elongated slot (which can be similar to the slot 1321 described above). The arrangement of the actuation arm 3350 and the coupling arm allows the lower portion 3340 to move between the various configurations.

As mentioned above, the lower portion 3340 can be moved between a delivery (or opened) configuration and a mixing (or closed) configuration. As shown in FIG. 46 (and describe above for the mixing bowl 1302 with reference to FIGS. 26-28), when the lower portion 3340 is in the delivery configuration the lower portion 3340 is rotated relative to the upper portion 3310 and the mixing bowl is open. In this manner, the dough can be transferred from mixing bowl into the cooking assembly 3500, as described herein. When the lower portion 3340 is in the mixing configuration it is aligned with the upper portion 3310 and the mixing bowl is closed. In the mixing configuration the seal surface 3343 is pressed tight (or in contact with) a mating seal surface of the upper portion 3310. This provides a liquid tight seal between the upper portion 3310 and the lower portion 3340 so that the ingredients can mixed to form dough. Additionally, when the lower portion 3340 is in the mixing configuration, it can be locked (i.e., fixed) relative to the upper portion 3310. In particular, the lower portion 3340 can be held by the platform 3372 of the measurement system 3370. In this manner, the measurement system 3370 can function both to weight the ingredients within the lower portion 3340 and also as a press to actuate (i.e., move) the lower portion 3340 from the delivery configuration (FIG. 46) to the mixing configuration. The base 3373 of the measurement system 3370 can contain a load cell (not shown) to accurately measure the weight of the ingredients. The base 3373 can also include one or more protrusions 3374 or end-stops to prevent the load cell from being overloaded when the measurement system 3370 is being used as an actuator. In such instances, the protrusions can limit the movement of the platform 3372 relative to the base 3373.

Additionally, when the lower portion 3340 is aligned with the upper portion 3310, it can remain movable relative to the upper portion 3310. Similarly stated, when the mixing bowl is in the measurement configuration, the lower portion 3340 can be unsupported by the upper portion 3310. As shown in FIG. 45, when the lower portion 3340 is unlocked and in the measurement configuration, the outer sidewall of the lower portion 3340 rests on the platform 3372 of the measurement system 3370. By remaining unlocked, the weight increase caused by the addition of ingredients into the lower portion 3340 can be accurately measured even though the upper portion 3310 is fixedly secured within the housing 3100. Specifically, the load cell is attached to a platform 3372 and it is used to measure the individual ingredients as they are dispensed into the mixing volume 3305. The ingredients are added one at a time (in any suitable order). and the measurement system 3370 is tared after each ingredient is added so that it is ready to accept the next ingredient.

The platform 3372 is attached to two rods 3462 that are connected to lower portion motors 3460 which are part of the mixing actuator assembly 3400. After all ingredients have been added, the lower portion 3340 is then locked to the upper portion 3310 to facilitate mixing and kneading in a water-tight mixing volume 3305.

As shown in FIG. 43, the mixing actuator assembly 3400 extends into the mixing bowl assembly 3300 and can mix and knead the ingredients to form an ingredient mixture (e.g., dough). The mixing actuator assembly 3400 is similar to the mixing actuator assembly 1400 described above and is not described in detail herein. Specifically, the mixing actuator assembly 3400 has multiple purposes—(1) to move the lower portion 3340 of the mixing bowl 3305 between the first configuration and the second configuration, (2) to mix the ingredients in the mixing volume 3305 when the lower portion 3340 is in the mixing configuration, and (3) to form or knead the mixed dough into a ball (or spherical shape) suitable for producing a roti.

Once the dough is prepared, the lower portion motors 3460 are activated to move the lower portion 3340 into the deliver configuration, as shown in FIG. 46. The mixing motor 3420 then activates the paddle 3440 to push the dough from the lower portion 3340 onto the cooking assembly 3500, as guided by the exit guide 3345. When the dough is transferred to the cooking assembly 3500, the lower portion motors 3460 move the lower portion 3340 back into the second configuration, as shown in FIG. 35. If the instructions contained in the machine-readable tag call for more than one piece of flatbread to be made, when the lower portion is returned to the second configuration the apparatus can begin another cycle of adding ingredients to the mixing volume and mixing the ingredients to produce another dough ball. In this manner, the various subassemblies in the bread maker 3000 can be continuously operating in different portions of the bread-making cycle.

Figure 47A:
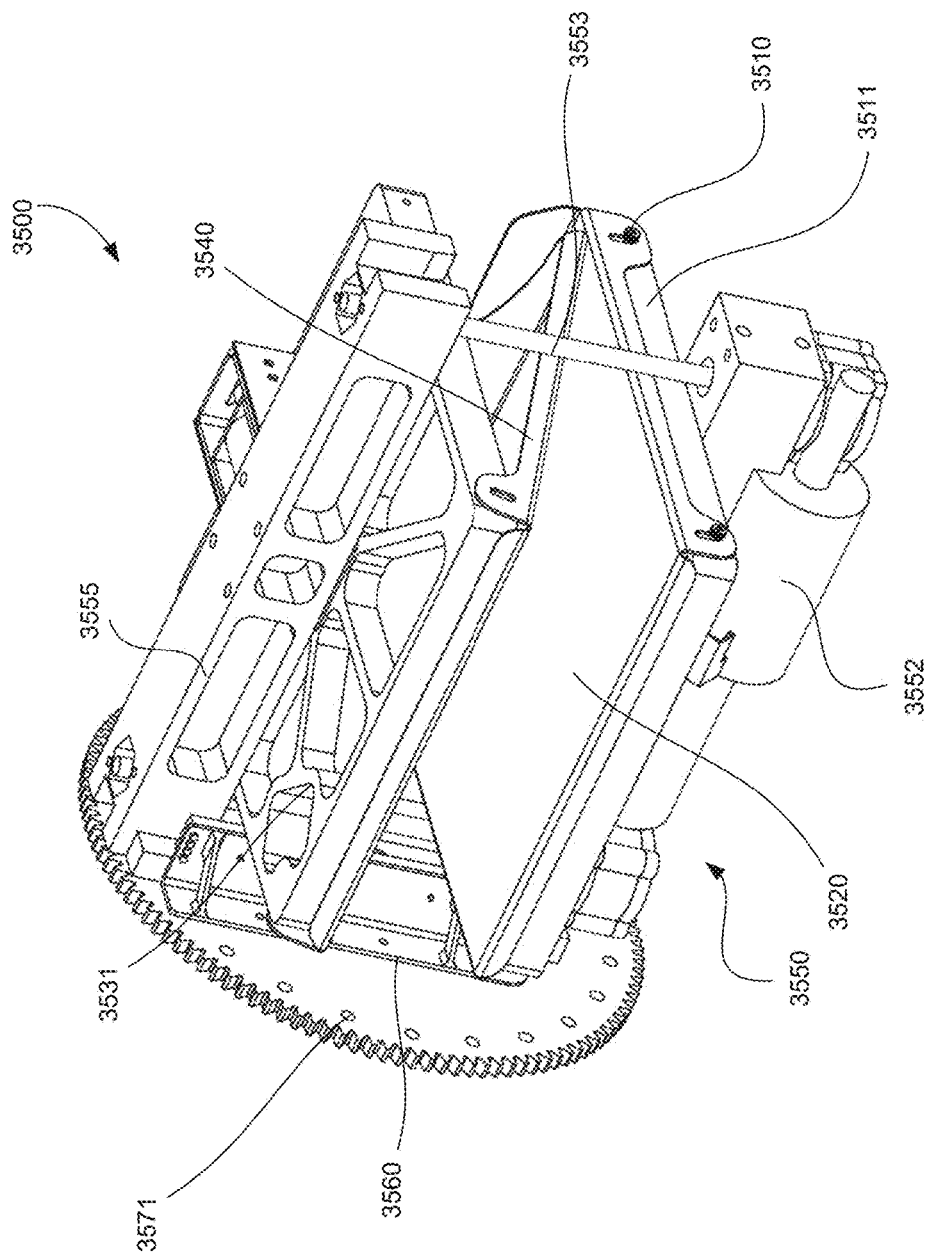
Figure 47B:
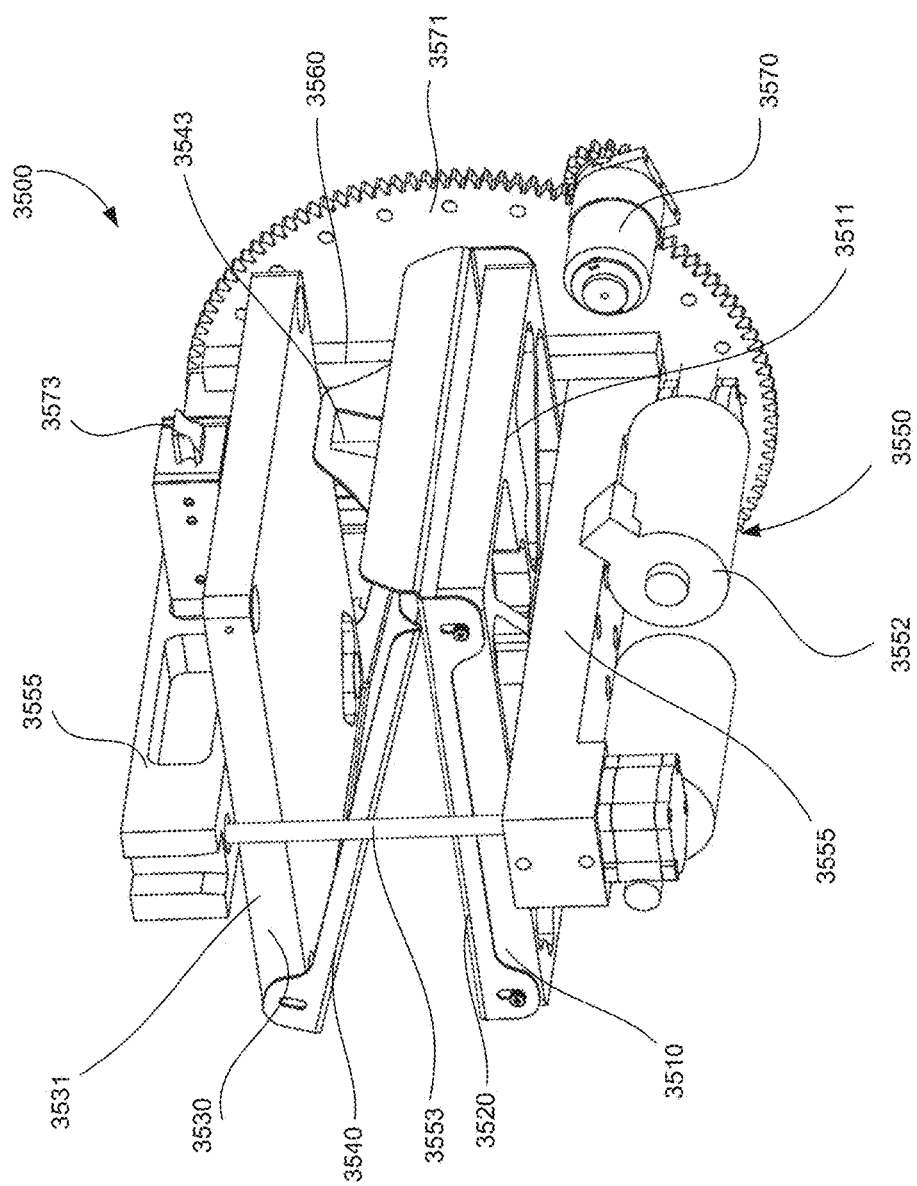
Figure 48:
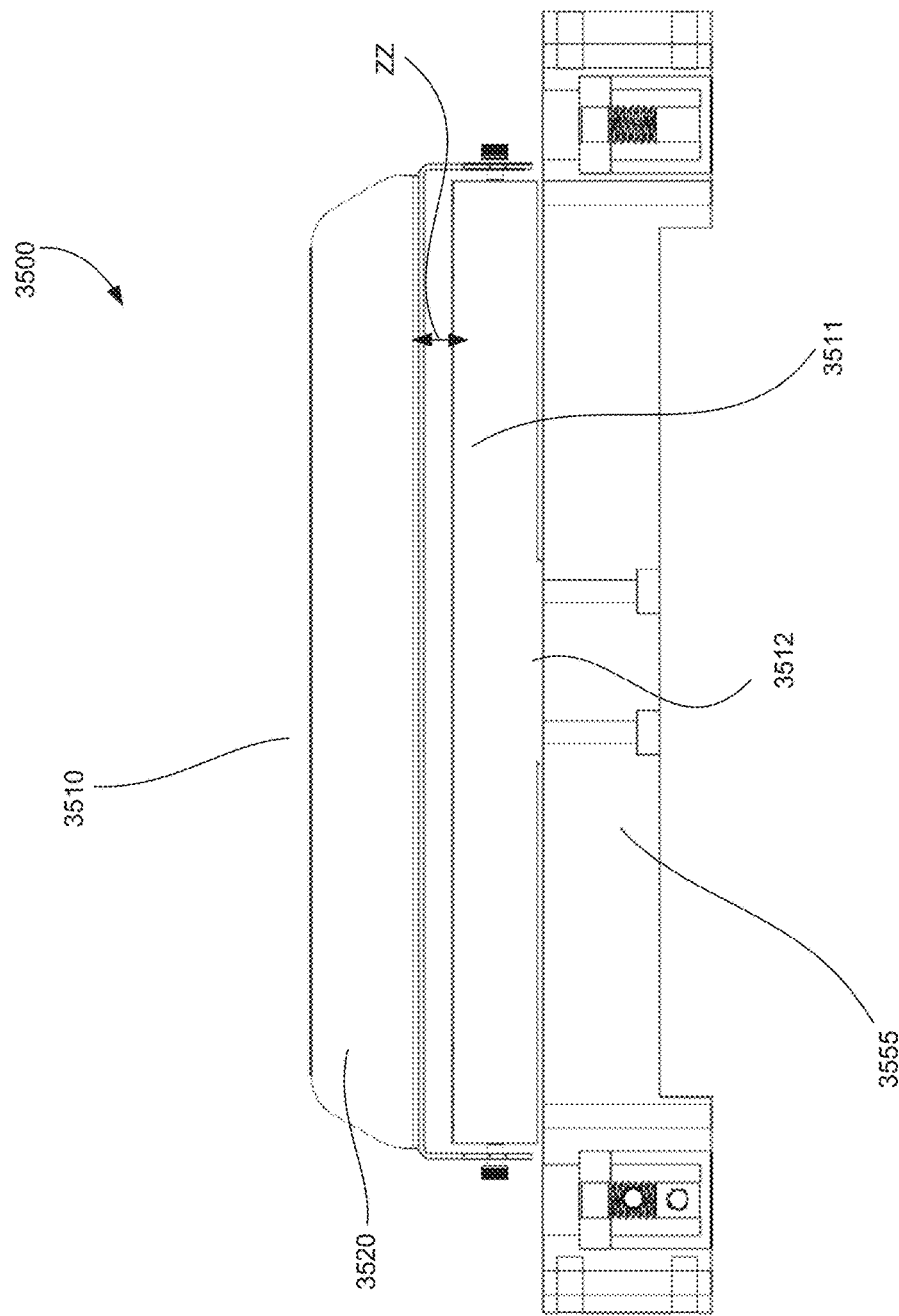
FIG. 48 is a cross-sectional view of a portion of the cooking assembly shown in FIGS. 47A and 47B.
Figure 49:
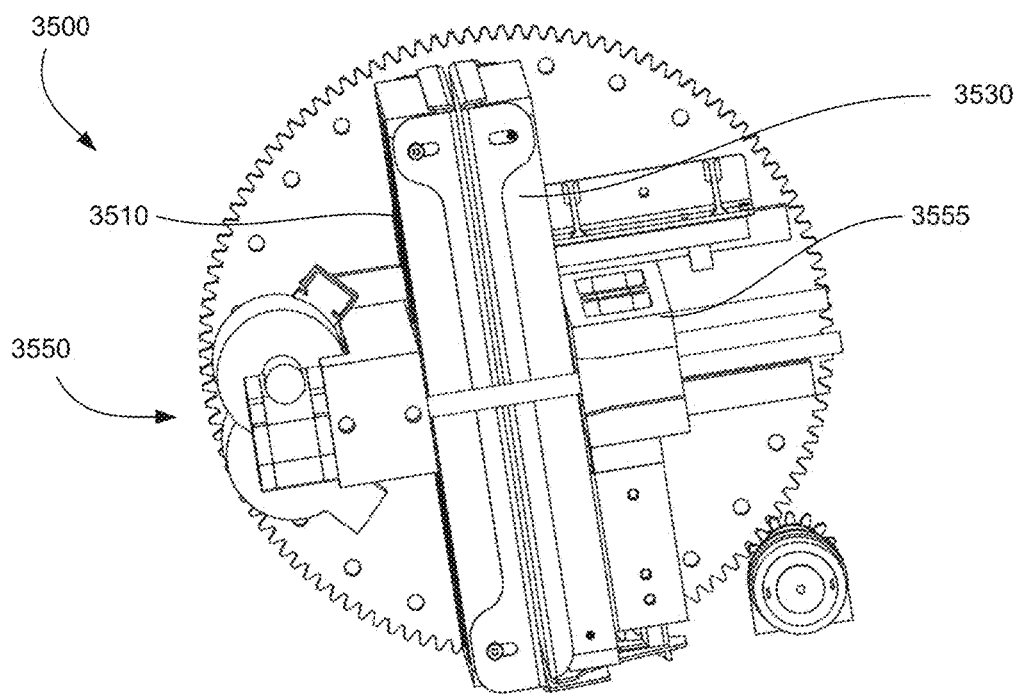
FIGS. 49-52 are perspective views of a cooking assembly of the cooking system shown in FIG. 39 in various configurations.
Figure 50:
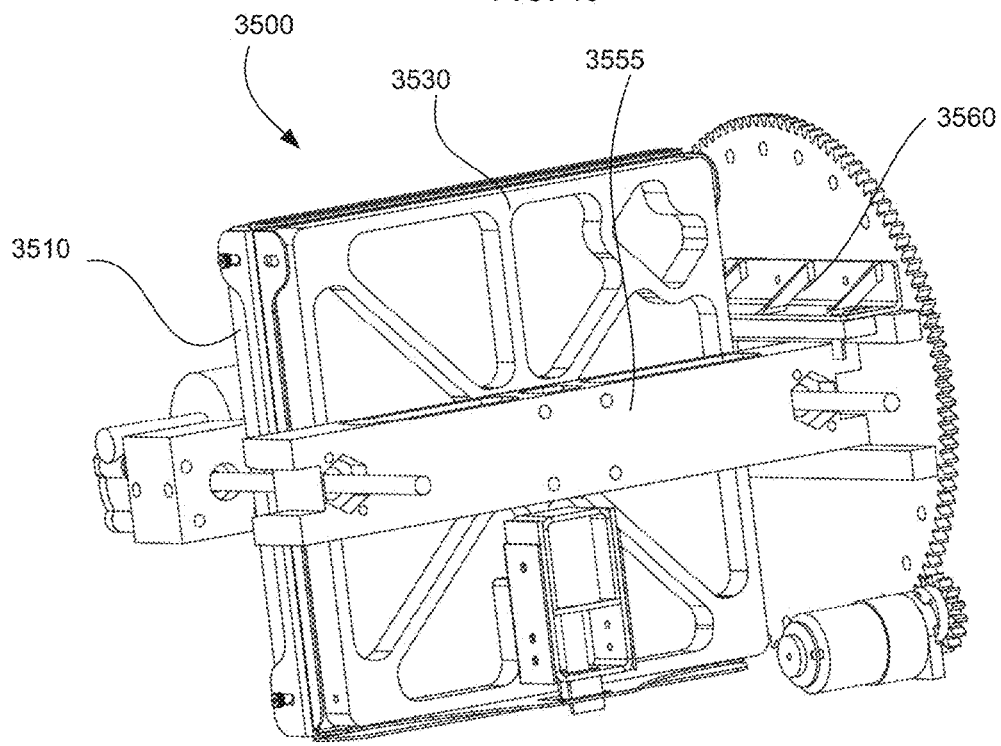

The cooking assembly 3500 is designed to press, cook, and flip the ingredient mixture to produce a cooked item (e.g., flat bread). FIGS. 46-52 show the cooking assembly 3500 which includes a first platen 3510, a second platen 3530, an actuator assembly 3550, and a heater (not shown). Certain aspects of the cooking assembly 3500 are similar to those in the cooking assembly 1500 described above, any the components of the cooking assembly 1500 can be included in the cooking assembly 3500, and vice-versa. The first platen 3510 includes a heating surface 3520 and a flattening mass 3511. The heating surface 3520 is movably coupled to the flattening mass and is a heated surface to cook dough. Specifically, the heating surface 3520 can be spring-biased to the flattening mass 3511 to allow the heating surface 3520 to be spaced apart from the flattening mass 3511 during heating/cooking, while being in contact with the flattening mass 3511 during press operations (e.g., to promote transfer of force without damaging the heating surface 3520). For example, as shown in FIG. 48, the heating surface 3520 can move relative to the flattening mass 3511, as shown by the arrow ZZ. In this manner, the heating surface 3520 can be spaced apart from the flattening mass 3511 (e.g., when the cooking assembly 3500 is in one of the cooking configurations), and can be in contact with the flattening mass 3511 when the cooking assembly 3500 is in a flattening configuration. Although not shown in FIG. 48, one or more springs can be placed between the heating surface 3520 and the flattening mass 3511. The heating surface 3520 can be made of any material that can conduct heat such as steel, aluminum, or the like. In some embodiments, the heating surface 3520 can include a non-stick material (e.g., a Teflon or ceramic material) to facilitate removal of the cooked flat bread therefrom. The first heating surface 3520 can be similar to any of the heating surfaces described herein.

The flattening mass 3511 is coupled to a press bar 3555, and is a mass structure that transfers a force to the ingredient mixture to flatten, shape, or otherwise press the ingredient mixture. For example, in some embodiments, the first flattening mass 3511 is a flat, rigid structure that can exert a press force of at least 200 pounds (890 N), 400 pounds (1.78 kN), 500 pounds (2.22 kN), or 600 pounds (2.67 kN). As shown, the flattening mass 3511 has a series of ribs to promote even distribution of the force applied by the motors 3552. As shown in FIG. 48, the flattening mass 3511 has a center protrusion 3512 that is coupled to and in direct contact with the press bar 3555. The outer portions of the flattening mass 3511, however, are slighted spaced apart from the press bar 3555. In this manner, the force applied to the ingredient mixture by the flattening mass 3511 is applied from the center, and not from the outside edges. This arrangement produces a uniformly flat item. In other embodiments, the flattening mass 3511 can have a uniformly flat surface, and the press bar 3555 can include a center protrusion that produces a slight gap between the outer portions of the flattening mass 3511 and the press bar 3555, similar to that shown in FIG. 48. The second platen 3530 can have a similar gap.

The second platen 3530 includes a heating surface 3540, a flattening mass 3531, and a hinge. The heating surface 3540 can be made of any material that can conduct heat such as steel, aluminum, or the like. In some embodiments, the heating surface 3540 can include a non-stick material (e.g., a Teflon or ceramic material) to facilitate removal of the cooked flat bread therefrom. The first heating surface 3540 can be similar to any of the heating surfaces described herein.

The heating surface 3540 is movably coupled to the flattening mass 3531 and is a heated surface to cook dough. Specifically, the heating surface 3540 can be spring-biased to the flattening mass 3531 to allow the heating surface 3540 to be spaced apart from the flattening mass 3531 during heating/cooking, while being in contact with the flattening mass 3531 during press operations (e.g., to promote transfer of force without damaging the heating surface 3520). Additionally, similar to the cooking system 7000 described above, the heating surface 3540 can rotate relative to the flattening mass 3531 via the hinge. Thus, the heating surface 3540 can be nonparallel to the flattening mass 3531 when the cooking system is in a receiving configuration (i.e., to retain the ingredient mixture, as described above). The heating surface 3540 can be selectively released from or rotated relative to the flattening mass by the latch 3573. The latch 3573 can be any suitable latch that can be electronically controlled (e.g., via an electronic circuit system) to allow the heating surface to rotate relative to the flattening mass 3531.

Thus, the heating surface 3540 can form a wedge with the heating surface 3520 of the first platen 3510. The wedge is used to catch the dough as it is ejected from the lower portion of the mixing bowl assembly. FIGS. 47A and 47B show the cooking assembly 3500 in a first (or receiving) configuration where the first platen 3510 and the second platen 3540 form the wedge. In this first configuration the cooking assembly 3500 is ready to receive dough from the lower portion 3340 of the mixing bowl assembly 3300. When the dough is captured in the wedge created by the first platen 3510 and the second platen 3530, the actuator assembly of the cooking assembly is activated, e.g., to flatten the dough.

When the cooking assembly 3500 is in the first (or receiving) configuration, the first platen 3510 and the second platen 3530 can produce a wedge of any suitable angle. In this manner, formed dough portions having different sizes (i.e. different diameters) can be positioned in the desired location between the heating surface 3520 and the heating surface 3540. For example, a larger angle accommodates dough portions of larger sizes, whereas a smaller angle accommodates dough portions having smaller sizes. In some embodiments, the wedge angle can be less than about 5 degrees. In other embodiments, the wedge angle can be between about 5 degrees and about 35 degrees. In yet other embodiments, the wedge angle can be between about 30 degrees and about 25 degrees.

As shown, the actuator assembly 3550 includes motors 3552, lead screws 3553, and the press bars 3555. The motors 3552 are attached to the platens by the press bars 3555. The lead screw 3553 is attached to the motor 3552 and to the press bars 3555. When the motors 3552 are activated the lead screw 3553 turns which then pulls the press bars 3555 to move the platens linearly relative to each other. The actuator assembly also includes a rotation motor 3570, a rotation gear 3572, and a connection member 3560. To rotate the platens (e.g., for flipping the ingredient mixture), the gear is rotated by the motor 3570. The connection member 3560 allows the platens to move linearly relative to each other (i.e., towards or apart from each other), but limits and lateral motion or rotational motion between the platens. Thus, rotation of the gear 3572 causes the platens to rotate, as shown.

During the flattening process the heating surfaces are heated slightly to facilitate a smooth flattening process. For example, in some embodiments, the lower-most platen (e.g., platen 3510 having heating surface 3520) can be heated to about 200 degrees F. and the upper-most platen (e.g., platen 3530 having heating surface 3540) can be heated to about 220 degrees F. By heating the upper-most platen to a slightly higher temperature, when the platens are moved apart to one of the cooking configurations (as described below), the flattened ingredient mixture (e.g., dough) will easily be released from the upper-most platen and remain with the lower-most platen for cooking.

Figure 51:
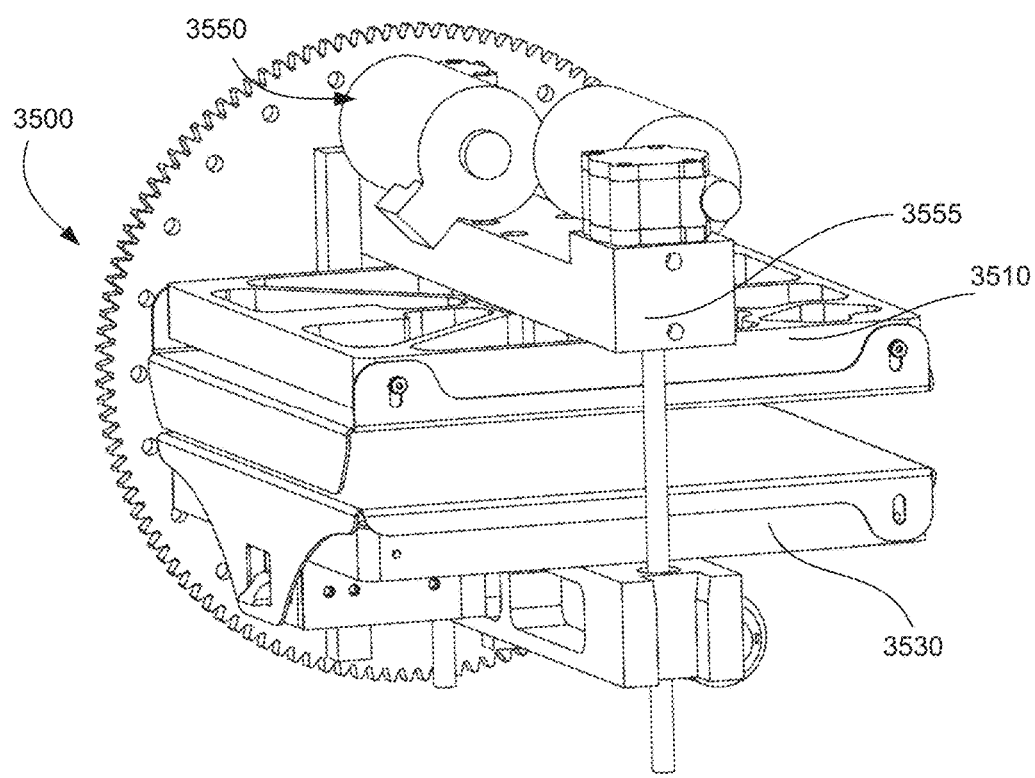

After the dough is flattened by the first platen 3510 and the second platen 3540 (FIGS. 49 and 50), the cooking assembly 3500 moves from the flattening configuration to a first cooking configuration. FIG. 51 shows the cooking assembly 3500 in the first cooking configuration. In the first cooking configuration, the cooking assembly 3500 rotates backwards and the second platen moves away from the first platen such that the heating surface of the second platen is horizontal to the heating surface of first platen. This configuration of the cooking assembly 3500 allows the heating surfaces 3520, 3540 to be spaced apart during the cooking process which allows the bread to puff up into a spherical shape. Once in the first cooking configuration, the heater (not shown) is activated to apply heat to the heating surface 3540 of the second platen 3530. One side of the dough is then cooked for a prescribed amount of time specified in the instructions set forth in the machine-readable tag (not shown).

Figure 52:
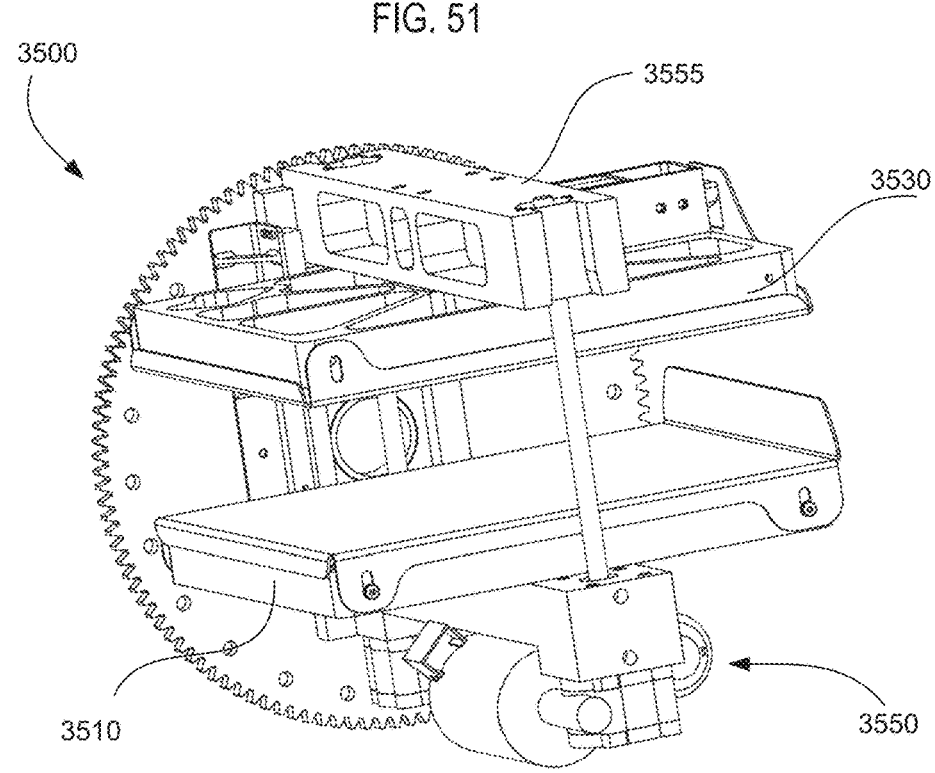
Figure 53:
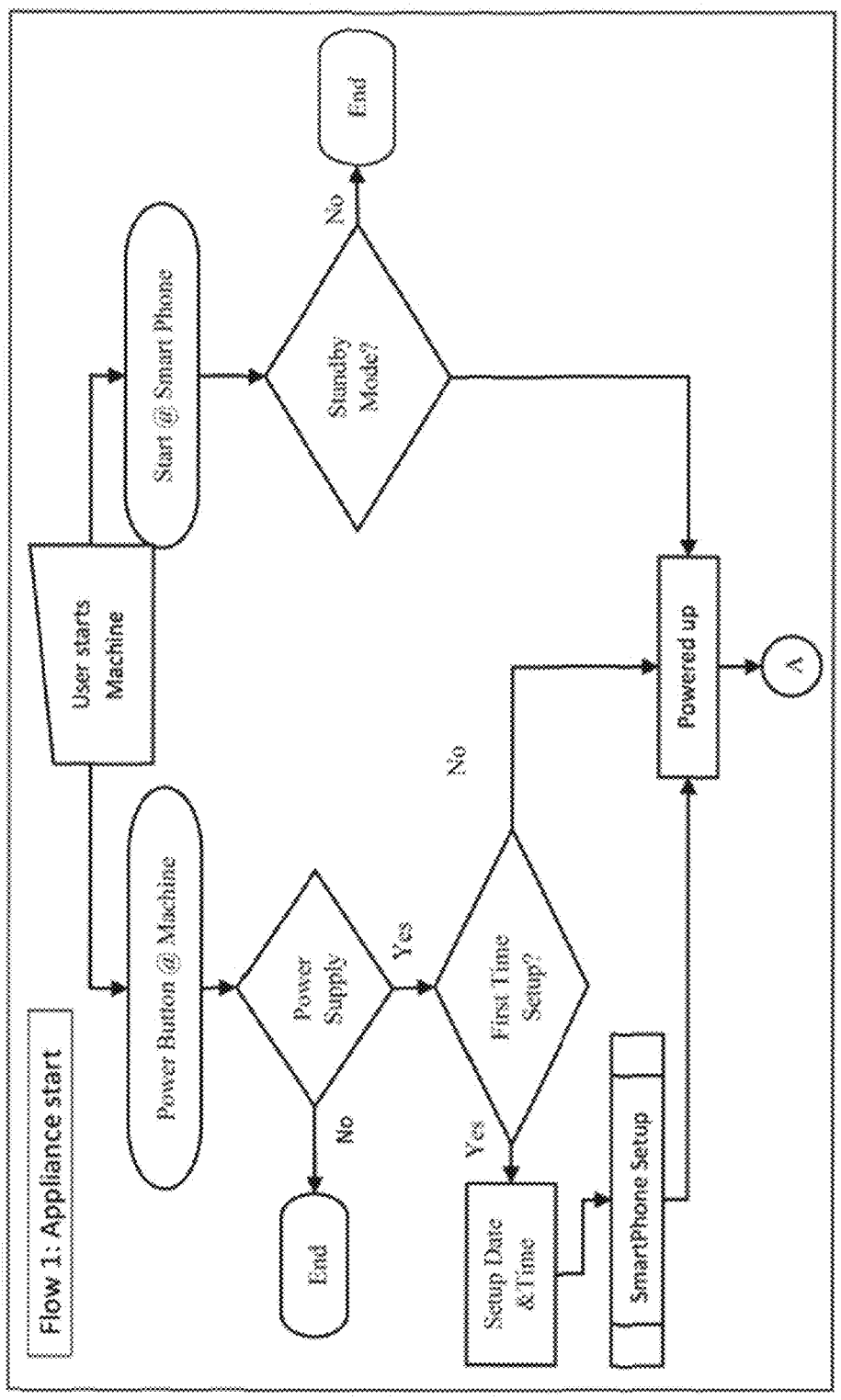
FIGS. 53-62 are flow charts of one or more methods (or portions of methods), according to an embodiment.

The cooking assembly 3500 can then be moved from the first cooking configuration to a second cooking configuration. FIG. 52 shows the cooking assembly 3500 in the second cooking configuration. In the second cooking configuration, the cooking assembly 3500 the second platen moves away from the first platen such that the heating surface of the second platen is horizontal to the heating surface of first platen. This configuration of the cooking assembly 3500 allows the heating surfaces 3520, 3540 to be spaced apart during the cooking process which allows the bread to puff up into a spherical shape. Once in the second cooking configuration, the heater (not shown) is activated to apply heat to the heating surface 3520 of the first platen 3510. A second side of the dough is then cooked for a prescribed amount of time specified in the instructions set forth in the machine-readable tag (not shown).

FIGS. 53-62 are flow charts illustrating one or more methods of preparing bread according the embodiments described herein. The methods described can be performed using and of the devices described herein, including the cooking device (or bread maker) 1000 or the cooking device 3000.

In use, the machine is started using either a or b option (assumption is that the machine is connected to power outlet). For option a, the user pushes Power button on machine (Flow 1, FIG. 53). If it is the first time power-on, the user is prompted to select date and time. The date and time are stored in permanent memory. If not the first time power-on, the bread maker is on and ready for further processing.

Figure 54:
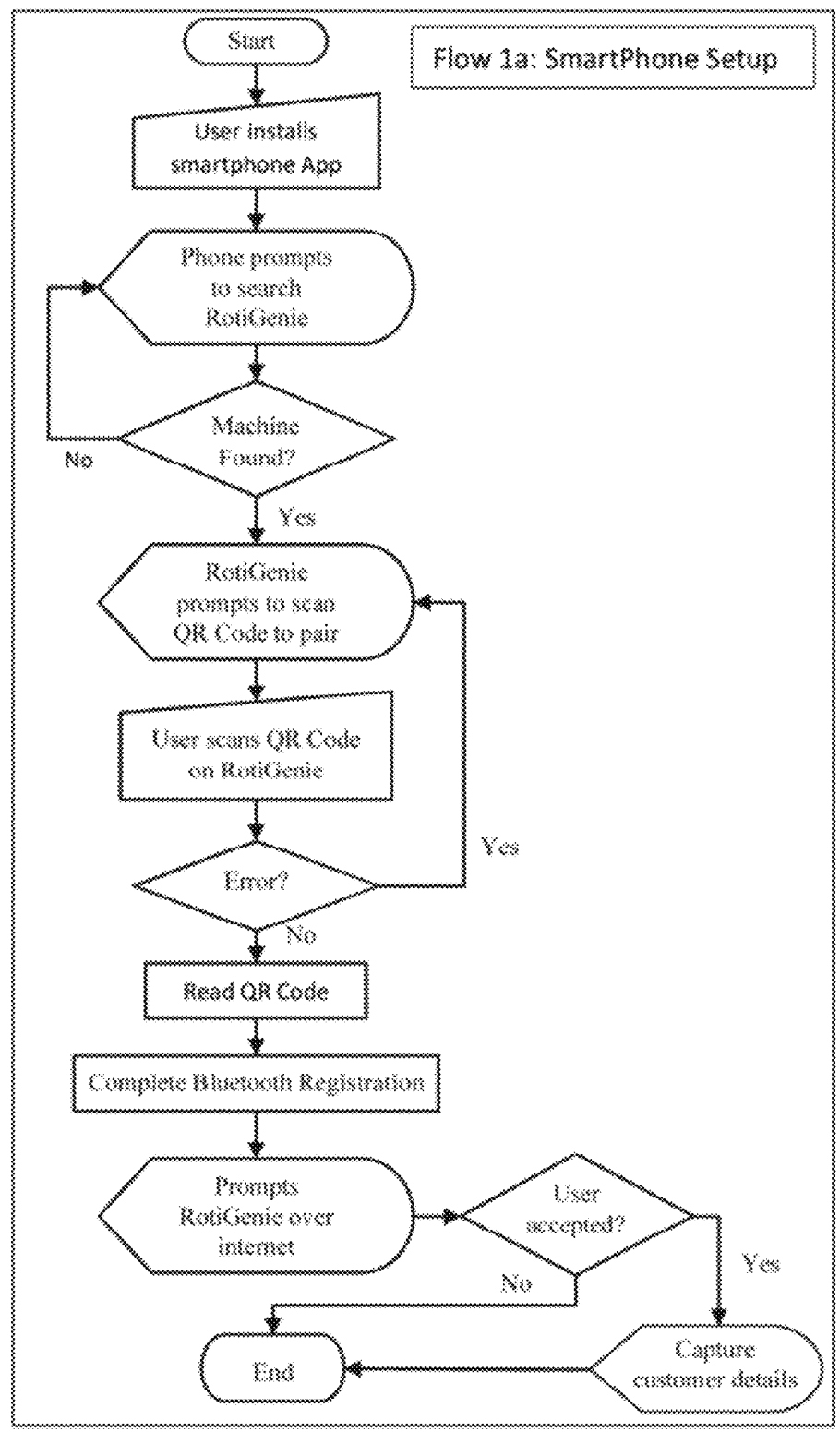
Figure 55:
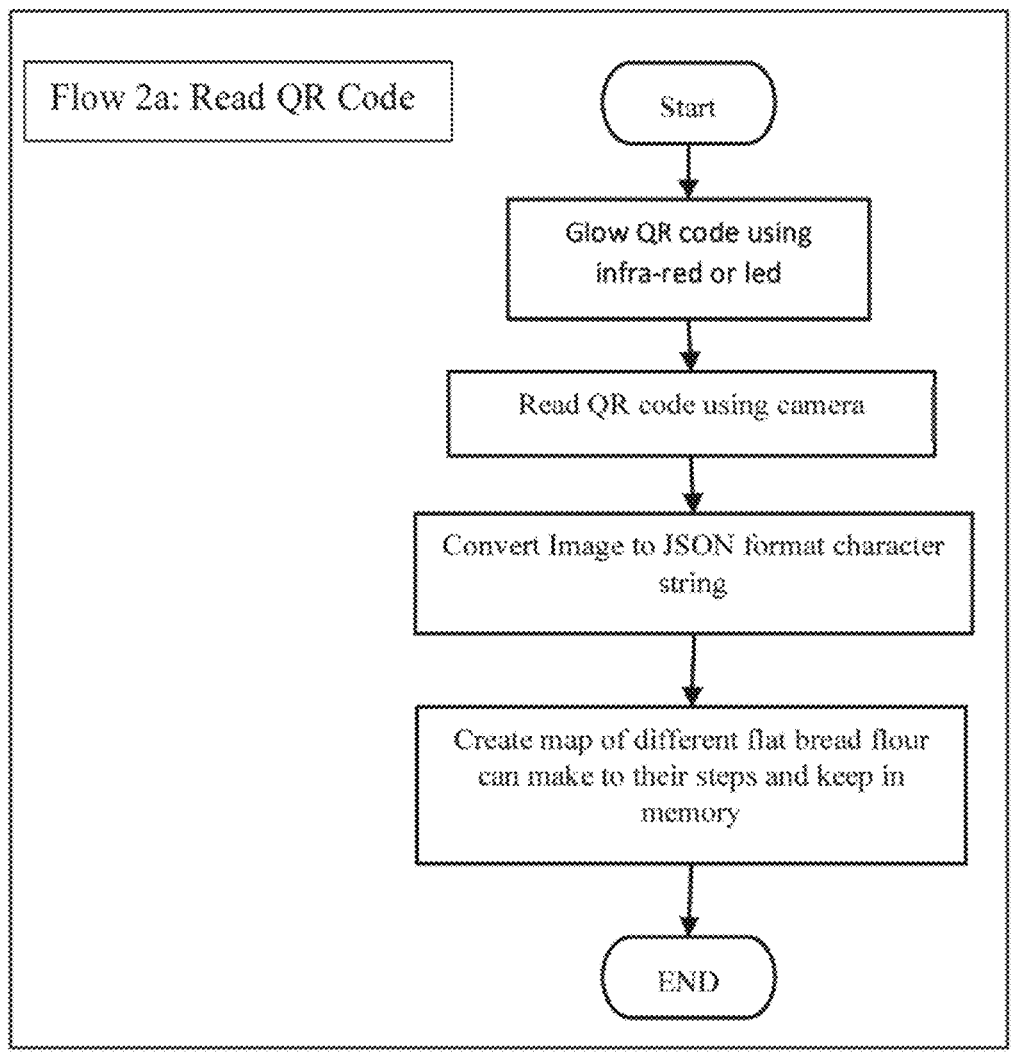
Figure 56:
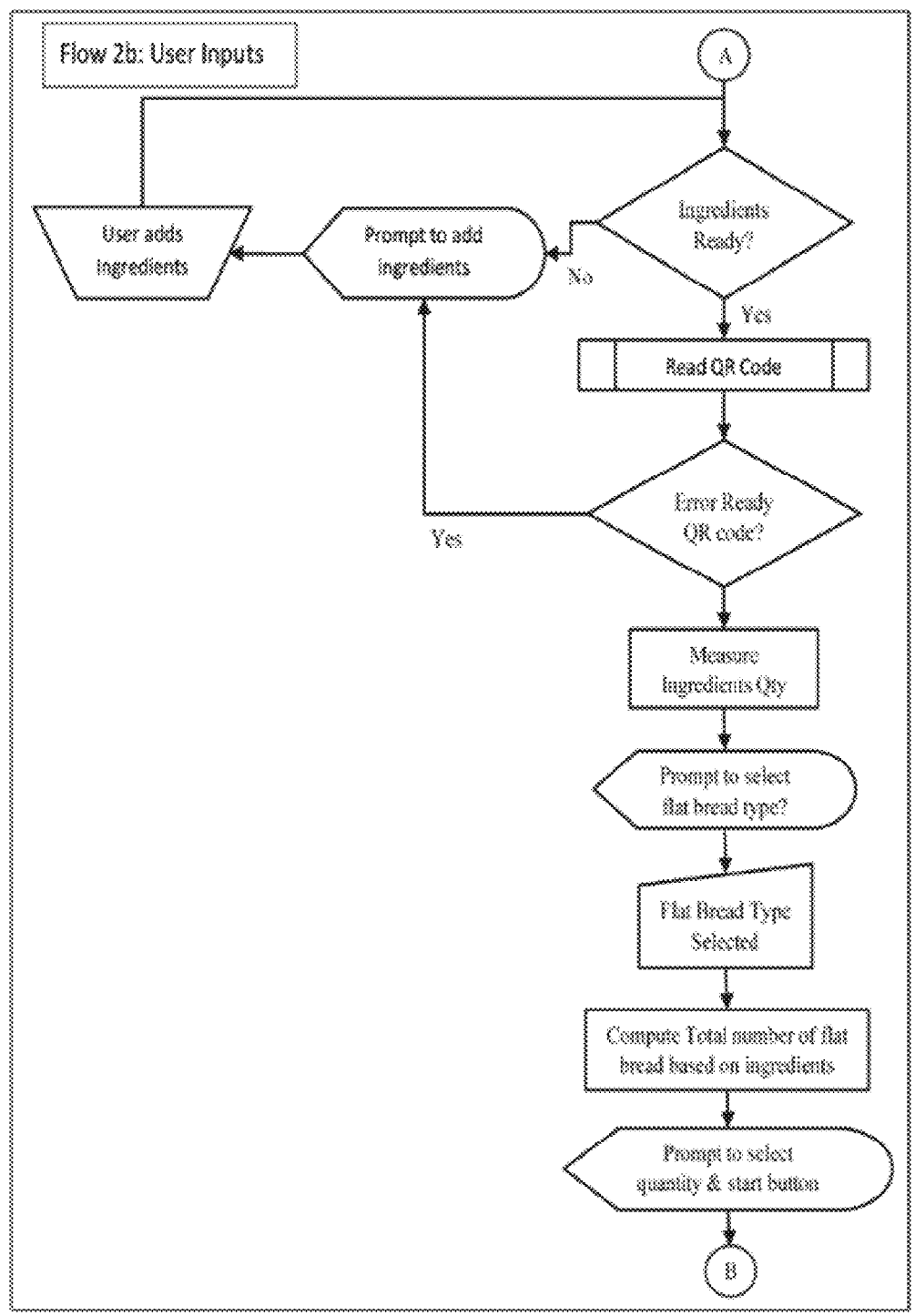
Figure 57:
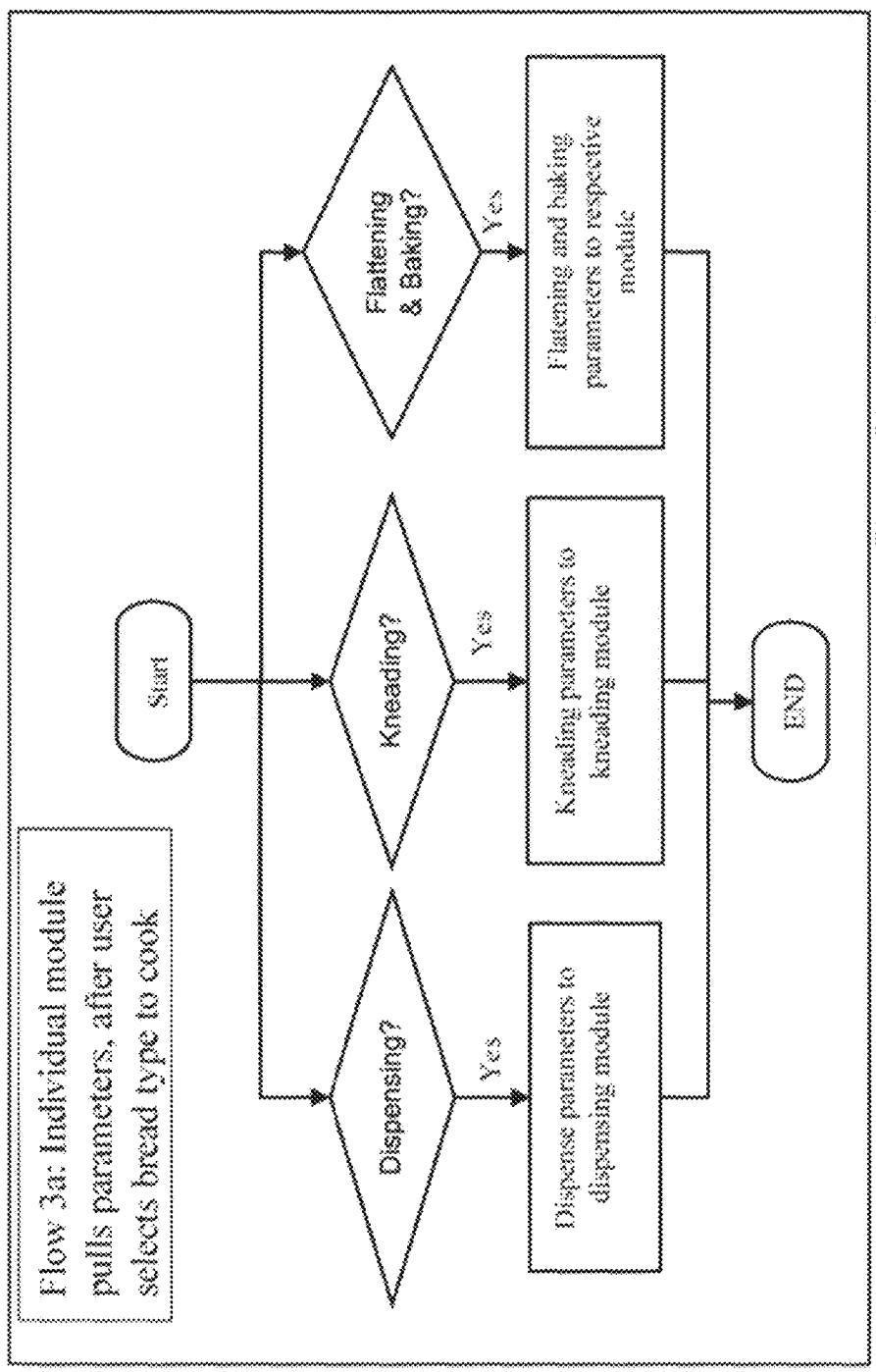

Referring to Flow 1a in FIG. 54, in some embodiments, the user is prompted for smart phone pairing. If the user selects smart phone pairing, the QR code is displayed with machine and pairing information. The user then scans QR code using RotiGenie app on the smart phone. After completion of pairing, the user can register machine over internet from this phone. For example, the user can fill in name, address and phone, whereas appliance details are auto populated from pairing info. After the smart phone is connected to the machine (e.g., using Bluetooth), the machine state is placed into a standby state.

Figure 58:
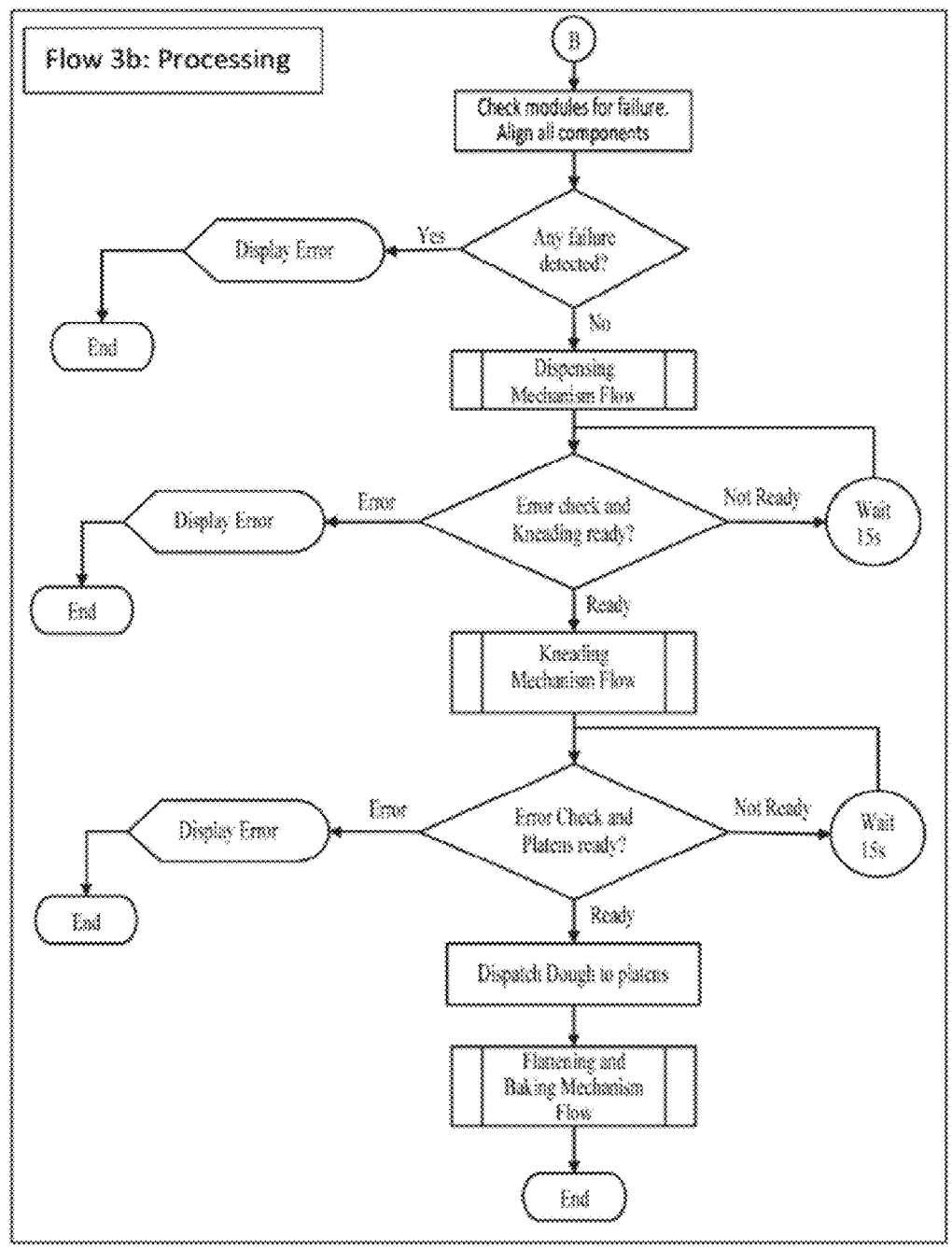
Figure 59:
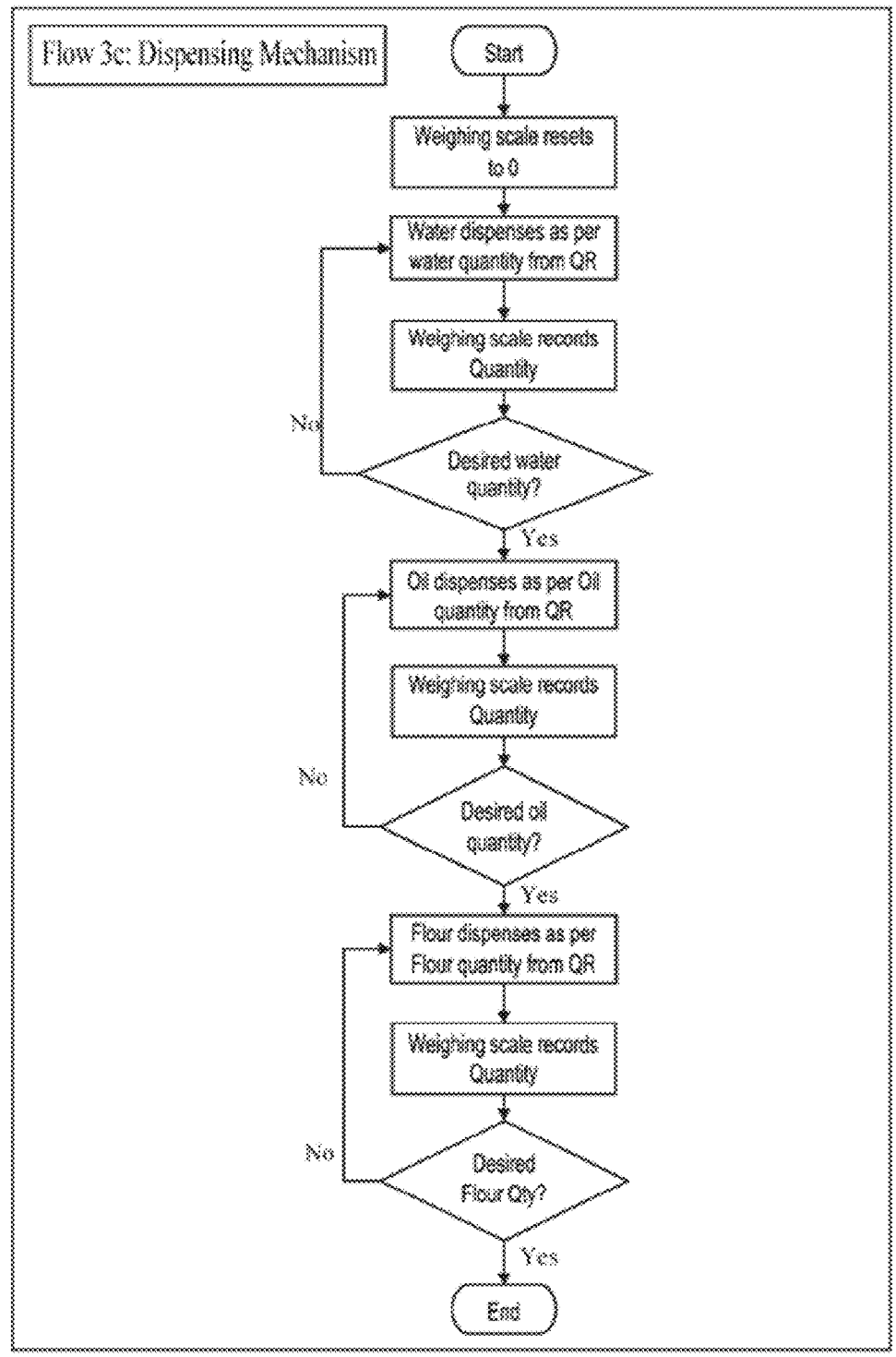
Figure 60:
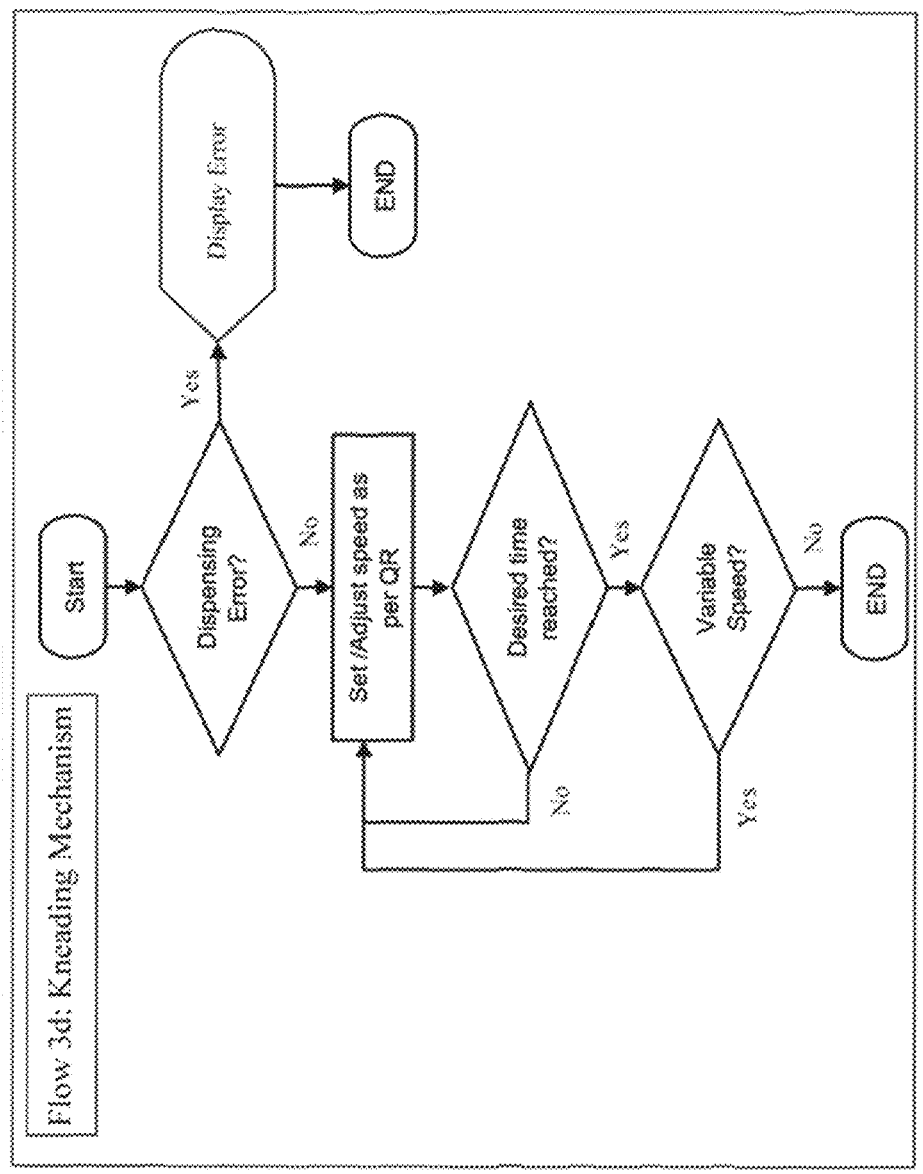
Figure 61:
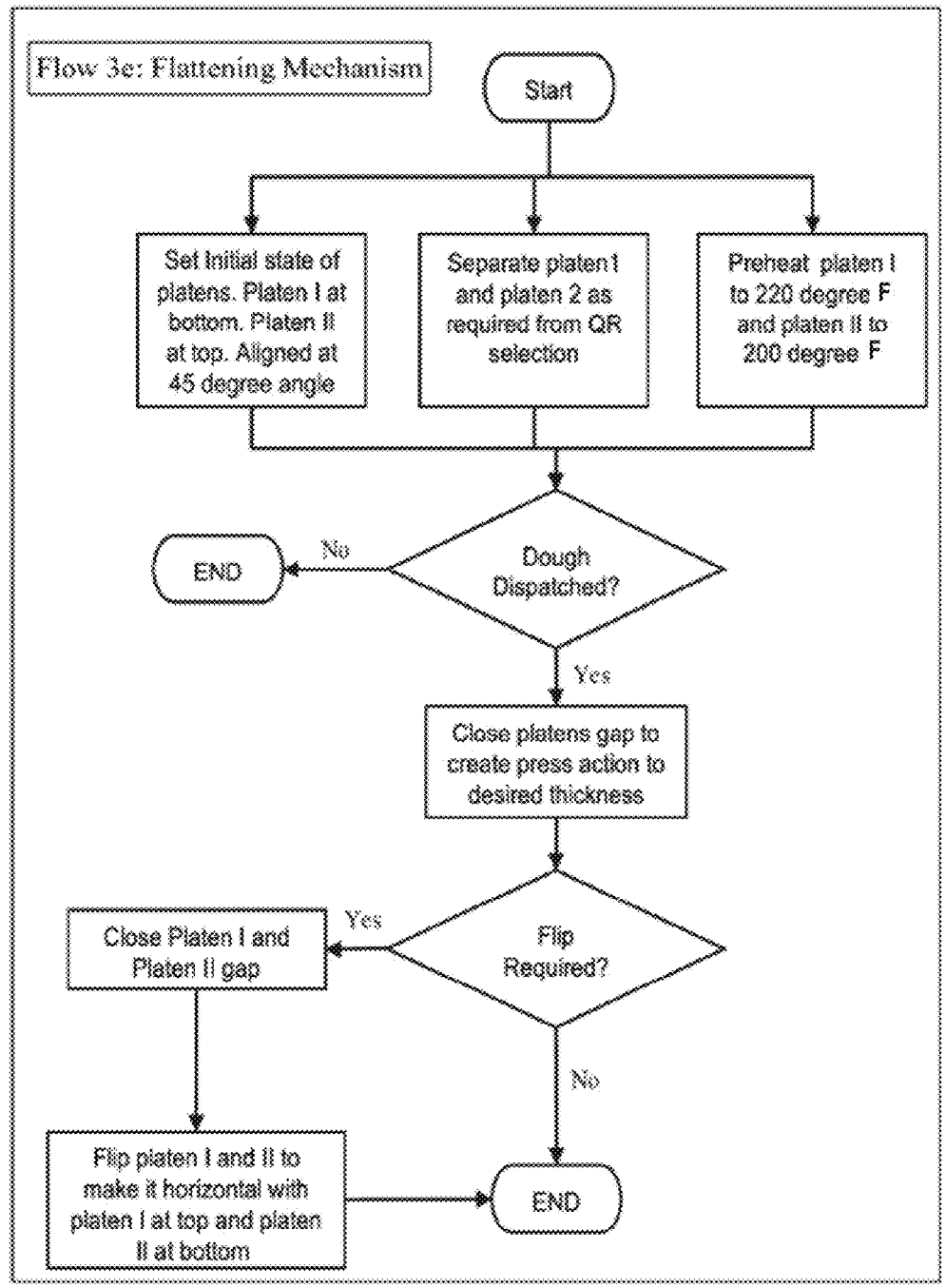
Figure 62:
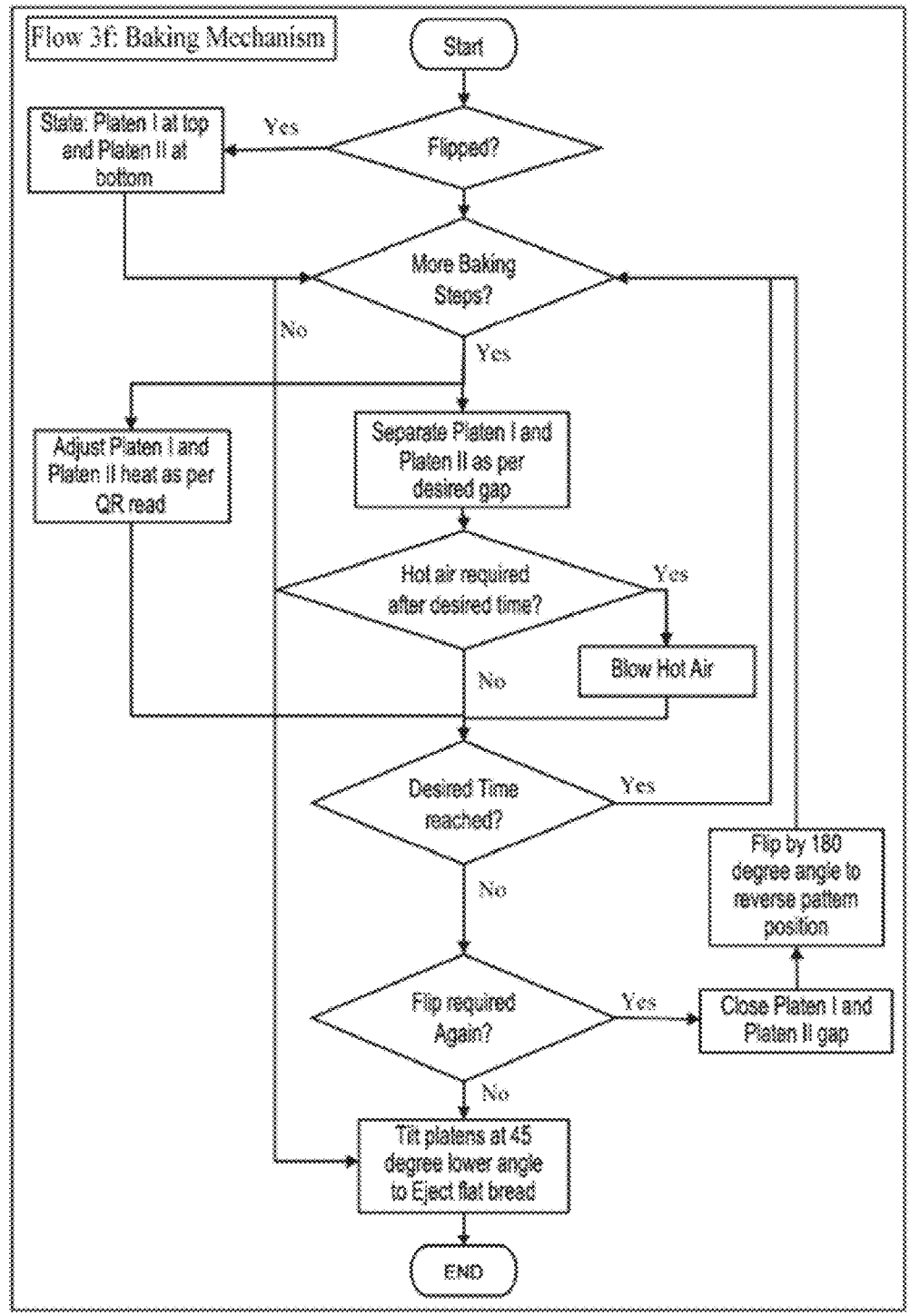

Referring to Flow 2a and Flow 2b in FIGS. 58 and 59, respectively, next the machine checks for ingredients and prompts user actions. Specifically, if any ingredient is missing prompts user to enter missing ingredients and waits for user to add and rechecks again. After all ingredients are present, the machine reads the QR code on the flour container. If there is any error during reading QR code, the control system and/or user's smartphone prompts the user with an error message.

Next, the machine measures the quantity of all ingredients. The control system then prompts the user to select a flat bread type (e.g., if the flour can make different flat bread types). After the user selects a flat bread type, the control system then computes the total number of bread pieces that can be made. The logic for computing the quantities is based on minimum of maximum flat breads a single ingredient consumption can make. The control system then prompts the user to select the desired quantity (bounded by the check for maximum flat bread quantity calculated above). After the user has entered the desired quantity, the user presses start button.

Referring to Flow 3 illustrated in FIGS. 57-62, after the user presses start, the bread making automatic process is started without any further manual input (Flow 3). First, the control system checks all components for failures. If any error is detected, the user is prompted with error and action to be taken. No further processing will occur until such error is resolved.

If no errors are present, then the control system retrieves "QR parameters" from memory for processing. When the kneading bowl is ready to accept ingredients, the dispensing module dispenses ingredients sequentially water, oil and flour while measuring ingredients as it dispenses (Flow 3c).

If no errors occur during the dispensing operation, then kneading process is started. Based on QR details for kneading, speed of the blade will vary for the specific duration (Flow 3d).

When kneading is completed successfully, then the dough portion is ready for dispatch to platens. If the cooking assembly is not occupied with another dough portion (i.e., it is not busy and ready to accept dough), the bottom of the bowl is opened to dispatch the dough portion to cooking assembly, as described above. After, successful dough dispatch, the kneading bowl state is changed to "ready" (i.e., the bowl is closed) and dispensing of a second batch of ingredients into the bowl starts simultaneously with the flattening and baking.

The flattening process presses dough and prepares it for baking. Based on QR input for flattening, the dough portion is pressed until the desired thickness is achieved. (Flow 3e). The baking process bakes the flattened dough at desired temperature mentioned in QR (e.g., at temperatures of up to 500° F.), with or without flipping and/or hot air for the specific duration. (Flow 3f). After the flat bread is baked on both sides, it is pushed to storage container. Any or all of these processes are repeated until the desired number of flat breads is prepared.

Figure 63:
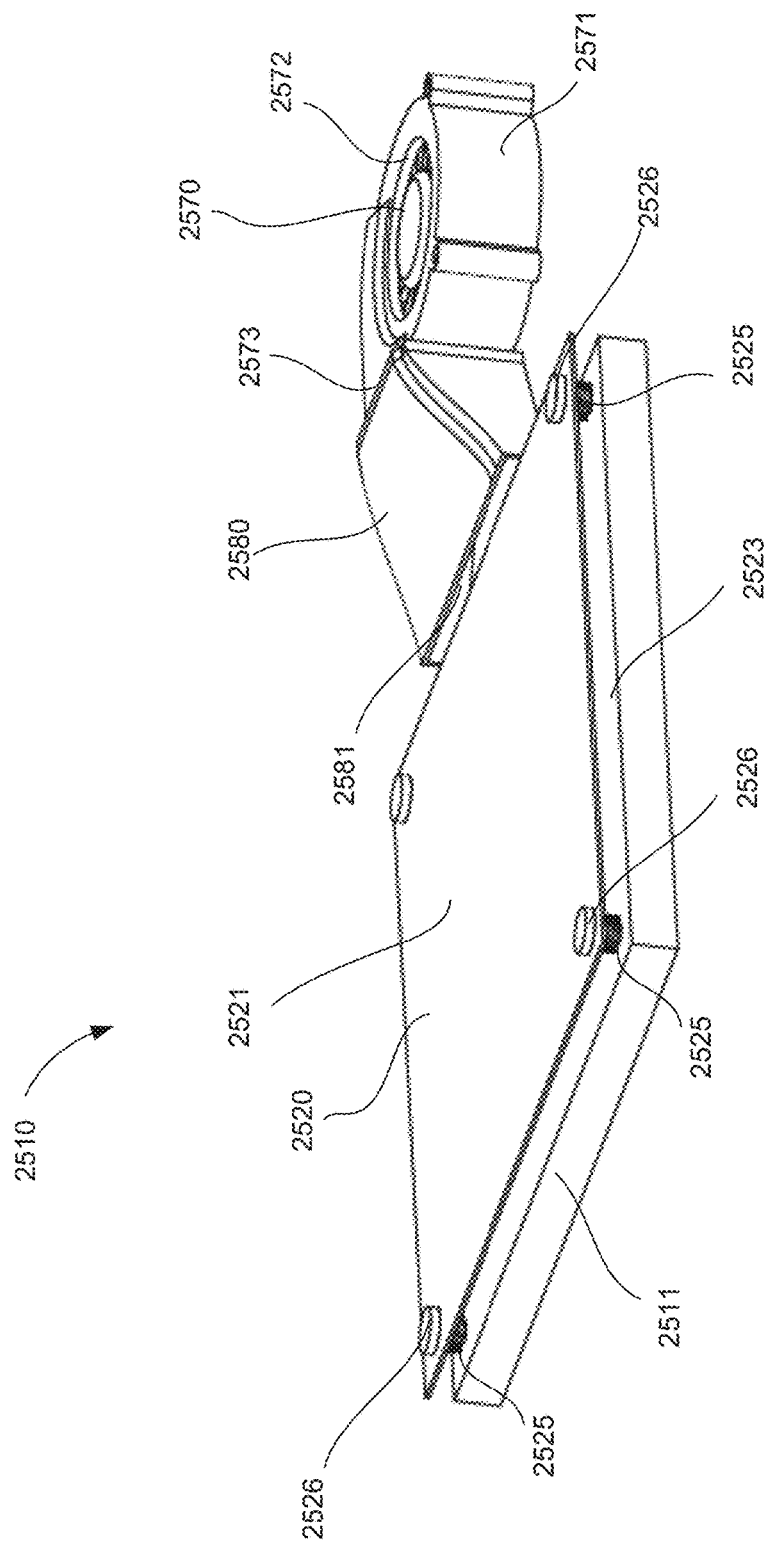
FIGS. 63 and 64 are a perspective view and a side view of a cooking assembly, according to an embodiment.
Figure 64:
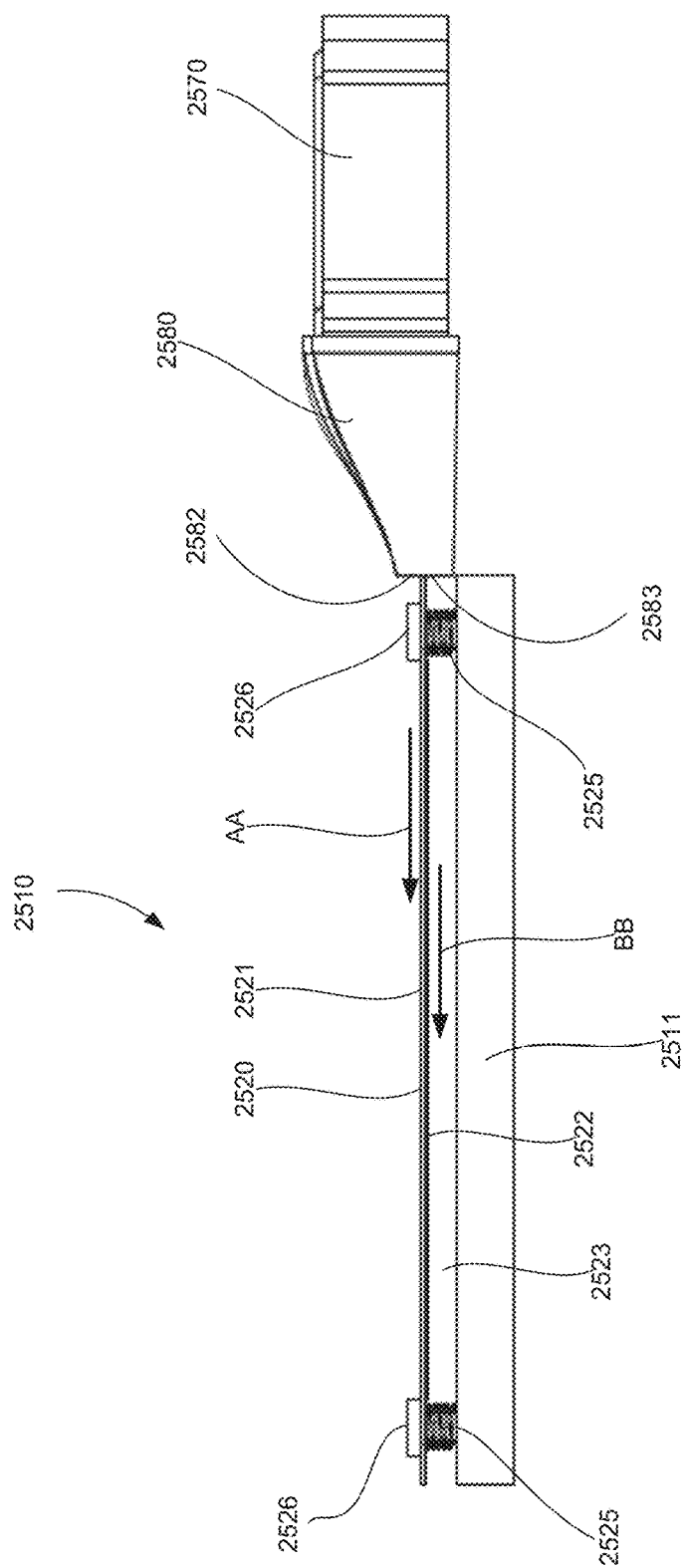
Figure 65:
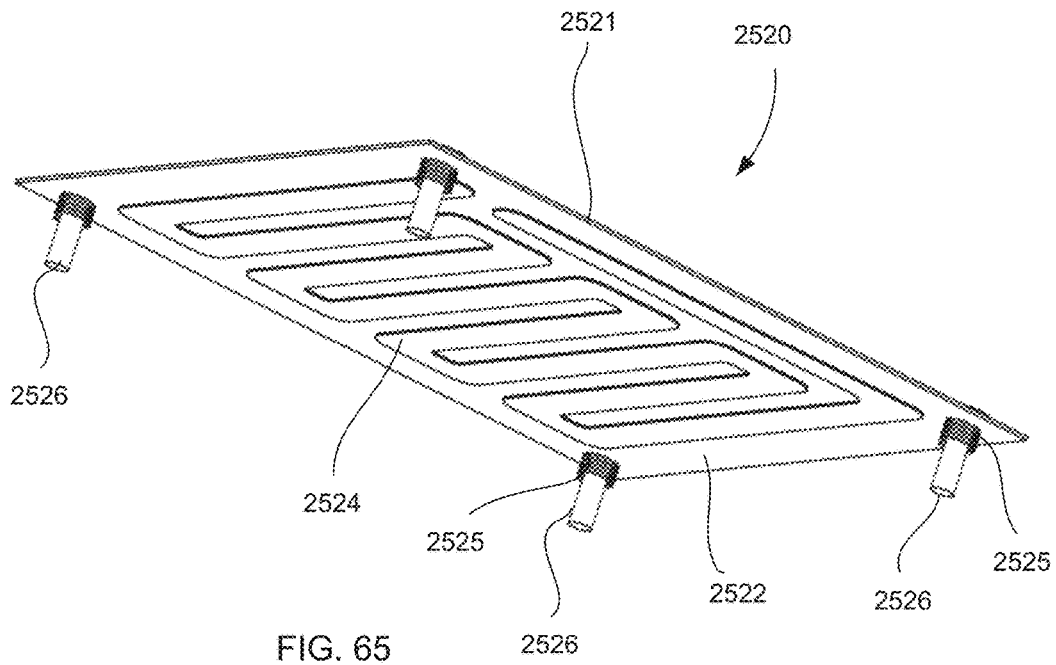
FIG. 65 is a perspective view of a portion of the cooking assembly shown in FIGS. 63 and 55.

Although the cooking assembly 1500 is shown and described as including a first platen 1510 having a single portion or plate that functions to both press the dough and provide a cooking surface, in other embodiments, the cooking assembly or any cooking assembly described herein can include any suitable structure to press, flip, manipulate and/or heat dough (or bread). For example, in some embodiments, a cooking assembly can include a platen having a heating plate that is separate from a press plate. Such arrangements can, for example, facilitate a more rapid heating and cooling by having a much lower thermal mass for the heating plate. For example, FIGS. 63-65 show various views of a platen 2510 according to an embodiment. The platen 2510 can be included as a part of the cooking assembly 1500 (e.g., in place of either the platen 1510, the platen 1530, or both), or any other cooking assembly shown or described herein. As described below, the platen 2510 is configured to press, cook, and flip flatbread in conjunction with at least one other platen. In some embodiments, the platen 2510 can include additional structure similar to that shown above in connection with the platen 1510 or the platen 1530 to facilitate the mechanical linkages and/or couplings for the cooking assembly. For example, in some embodiments, the platen 2510 can include one or more connections posts, connection portions, or the like (as described above) so that the platen 2510 can be moved as desired to press, cook and/or flip the dough (or flatbread).

Referring to FIGS. 63 and 64, the platen 2510 includes a press plate 2511, a heating plate 2520, a blower 2570, and a shroud 2580. Thus, the platen 2510 includes a heating surface that is separate from, and movable with respect to, a press plate. The platen 2510 also includes an active cooling mechanism (i.e., the blower 2570) to facilitate rapid cooling of the heating plate 2520. The press plate 2511 can be any suitable plate having sufficient mass and rigidity to repeatably and accurately flatten and manipulate dough, as described herein. For example, in some embodiments, the press plate 2511 can have sufficient rigidity to transfer a press force of up to 1000 pounds to the dough (or bread) while undergoing a bending strain of less than 10 percent. Although not shown, the press plate 2511 includes four recesses (or counter bores) that receive the connection pins 2526 and the connection springs 2525, as described below.

The heating plate 2520 is movably coupled to the press plate 2511 and includes a first (or cooking) surface 2521 and a second (or back) surface 2522. Referring to FIG. 65, a heating element 2524 is coupled to the second surface 2522, and produces thermal energy that is transferred through the heating plate 2520 and to the first surface 2521. The heating element 2524 can be any suitable heating element that produces the desired thermal response of the cooking surface 2521. For example, in some embodiments, the heating element 2524 can be an electric resistance heater that is coupled to the second surface 2522. In such embodiments, the heating element 2524 can be, for example, a 1000 Watt heater, powered by A/C current and having a resistance of between about 11-12 ohms. In other embodiments, the resistance may vary depending on whether the input voltage is 110V or 220V. The heating element 2524 can be coupled to the second surface 2522 in any suitable manner, for example, by chemical bond, by sintering, or the like. Although not shown, in some embodiments, the heating plate 2520 includes one or more temperature sensors to provide feedback to a controller (not shown), which can adjust the current profile to the heating element 2524. In some embodiments, the heating element 2524 can be activated via pulse width modulated (PWM) current to produce the desired thermal affect.

The heating plate 2520 can be constructed from any suitable material to facilitate rapid heat transfer into and/or out of the cooking surface 2521. For example, in some embodiments, the heating plate 2520 can be a thin plate, i.e., having a thickness of less than about 1 mm, less than about 2 mm, or less than about 3 mm. The heating plate 2520 can be constructed from any suitable material, including stainless steel. As shown, the heating plate 2520 is movably coupled to the press plate 2511 by a series of springs 2525 and coupling pins 2526. Although four sets of pins and springs are shown in other embodiments, and suitable number of coupling members can be used to movably couple the heating plate 2520 to the press plate 2511. When the platen 2510 is in the first (also referred to as the "un-pressed" or nominal) configuration, as shown, the heating plate 2520 is spaced apart from the press plate 2511 to form the air plenum 2523. Thus, in use air can flow within the air plenum (i.e., between the press plate 2511 and the second surface 2522 of the heating plate 2520), as shown by the arrow BB in FIG. 64, to facilitate rapid temperature change (e.g., cooling) of the heating plate 2520. Moreover, during a heating cycle, the air plenum 2523 acts as an insulative barrier to ensure that the thermal energy produced by the heating element 2524 is transferred towards the cooking surface 2521, and not into the large thermal mass of the press plate 2511. In this manner, the thermal response of the cooking surface 2521 is improved.

When the cooking assembly in which the platen 2510 is included is actuated to flatten (or press) the dough, however, the heating plate 2520 moves into contact with the press plate 2511 such that the two plates collectively transfer the press force to the dough. In this manner, the platen 2510 can include a heating plate 2520 that is thin and has rapid thermal response characteristics, but that also functions to transfer the press force to the dough without bending more than a nominal amount. Specifically, when the press force applied to the cooking surface 2521 exceeds a predetermined value (as determined based on the spring characteristics of the springs 2525), the springs 2525 compress, and the pins 2526 and springs 2525 collectively move into the counter bores of the press plate 2511. This movement can continue until the second surface 2522 of the heating plate 2520 is in contact with the press plate 2511 (i.e., until the platen 2510 is in a second or "pressed" configuration).

The blower 2570 includes a blower housing 2571 having an inlet portion 2572 and an outlet portion 2573. The blower 2570 can be any suitable blower (e.g., a centrifugal blower) that produces an airflow, as described herein. The outlet portion 2573 is coupled to the shroud 2580, which directs the airflow towards and over the platen 2510. Specifically, the shroud 2580 defines an outlet opening 2581 that has a first (or top) portion 2582 and a second (or bottom) portion 2583 (see, FIG. 55). As shown, when the platen 2510 is in its first (or nominal) configuration, an edge of the heating plate 2520 is between the top portion 2582 and the bottom portion 2583. In this manner, the airflow produced by the blower 2570 can be conveyed across the first surface 2521 of the heating plate 2520 (see arrow AA) and across the second surface 2522 of the heating plate 2520 (see arrow BB).

In some methods of use, the heating element 2524 can be activated prior to a "press" event, and can cause the heating plate 2520 and/or the top surface 2521 to reach temperatures of around 200 F. This will produce sufficient heat to facilitate manipulating and/or pressing of the dough. The dough can then be pressed (not shown in FIGS. 63-65) between two opposing platens, as described above (i.e., with the platen 2510 being moved into the "pressed" configuration). In particular, during the pressing operation, the heating plate 2520 can move into contact with the press plate 2511. Thus, the press plate 2511 can provide the desired mass and rigidity to accurately and repeatably press the dough. During a cooking operation, the platen 2510 can be placed into its first ("un-pressed") configuration, and the heating element 2524 can be activated to produce temperatures of up to 500 F. To lower the temperature for further operations (e.g., flipping, bread removal, etc.), the blower 2570 can be activated to produce the airflow as described above.

Although the platen 2510 includes a separate heating plate 2520 and press plate 2511 and the blower 2570, in other embodiments, a cooking assembly can include a heating plate that is separate from a press plate, but need not include a blower (or other active cooling mechanism). In yet other embodiments, a platen can have a single structure that functions to both press and heat the dough (e.g., similar to the platen 1510), but can also include a blower (e.g., similar to the blower 2570).

Figure 66:
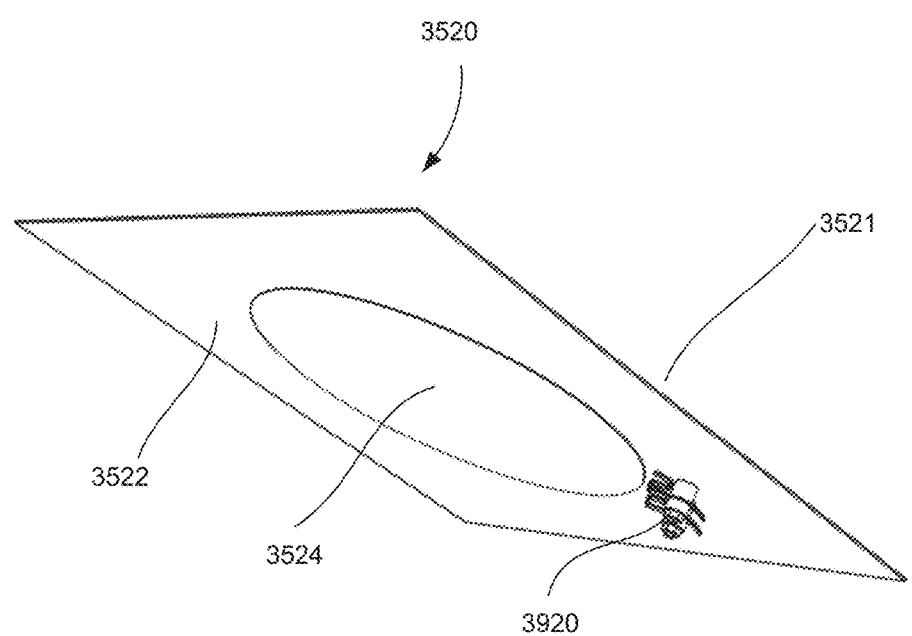
FIGS. 66 and 67 are perspective views of a heating member of a cooking assembly according to an embodiment.
Figure 67:
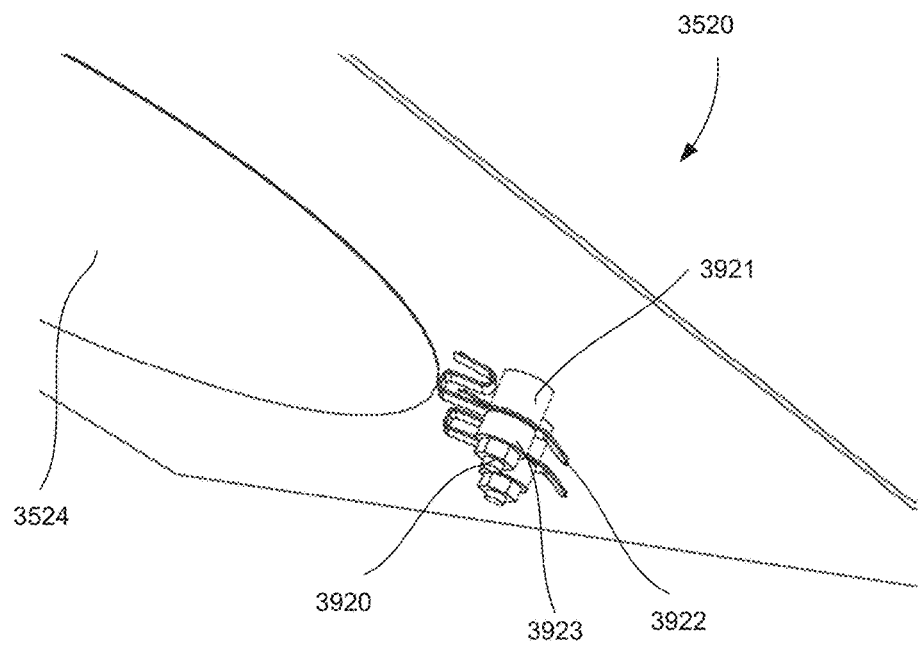

In some embodiments, a platen can include an electrical connector for the heating element that is offset from (or spaced apart from) the surface of a heating plate. In this manner, the electrical connector can be moved away from the high temperature region(s) that can cause failure of such connection joints. For example, FIGS. 66 and 67 show a heating plate 3520 according to an embodiment. The heating plate 3520 can be included within any suitable cooking assembly, such as, for example, the cooking assembly 2510. The heating plate 3520 has a first (or cooking) surface 3521 and a second (or back) surface 3522. A heating element 3524 is coupled to the second surface 3522. The heating element 3524 includes a pair of connectors 3920 through which power or current is supplied to the heating element. Referring to FIG. 67, each connector 3920 includes an electrical terminal 3922 (e.g., a conductive material) that is disposed between two insulators 3921, 3923. The insulator 3921 also functions as a spacer to space the end of the terminal 3922 apart from the surface of the heating plate 3520. In this manner, the temperature at the connectors 3920 can be maintained at a lower temperature than if the connectors 3920 were flush with the second surface 3522. In some embodiments, a press plate (not shown) used in conjunction with the heating plate 3520 can include a recess, opening or volume within which the connectors 3920 are received when the heating plate 3520 is moved into contact with the press plate.

Figure 68:
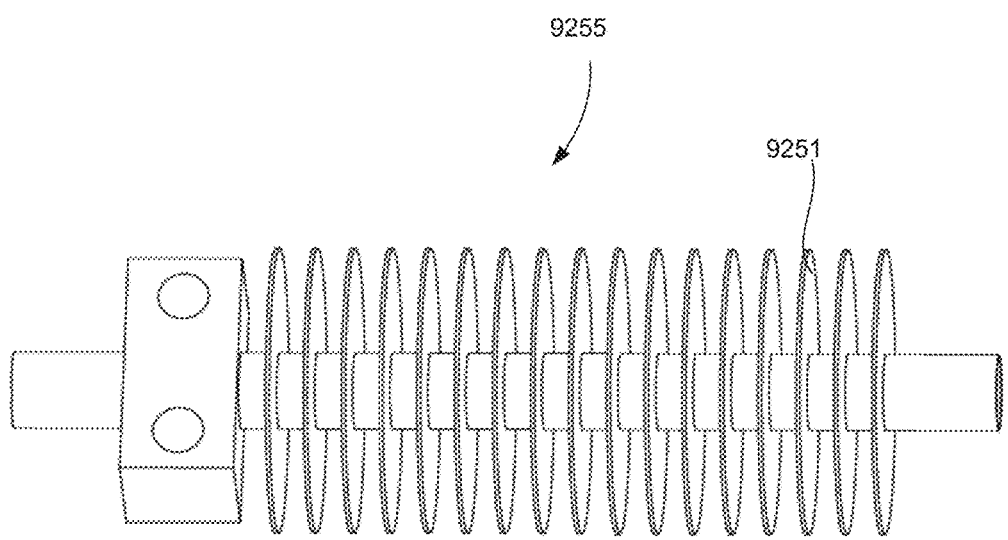
FIG. 68 is a perspective view of a transfer tube, according to an embodiment.
Figure 71:
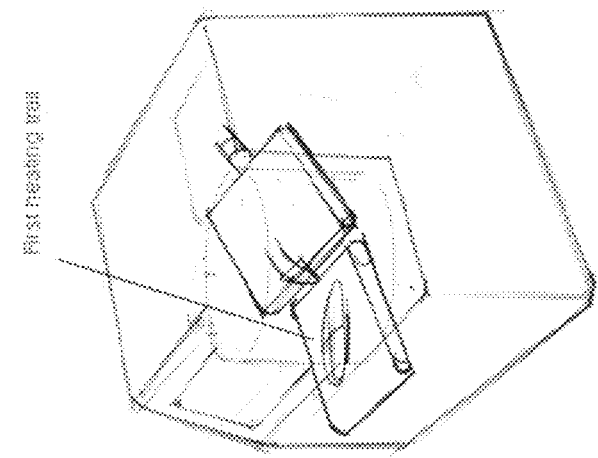
FIG. 71 is a perspective view of the countertop appliance shown in FIG. 69, showing the lower platen of the cooking assembly of the device.
Figure 70:
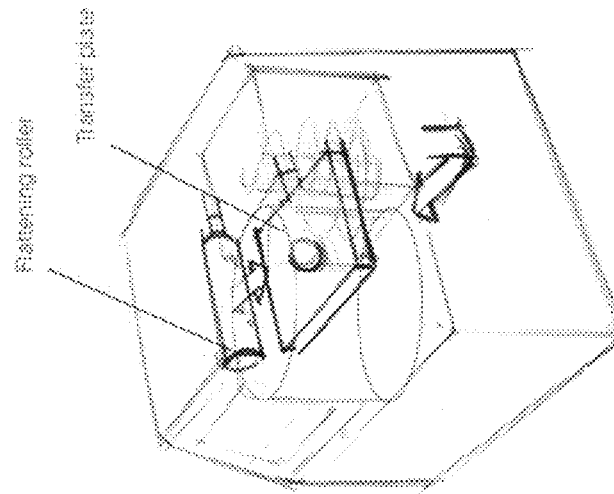
FIG. 70 is a perspective view of the countertop appliance shown in FIG. 69, showing the cooking assembly of the device.
Figure 69:
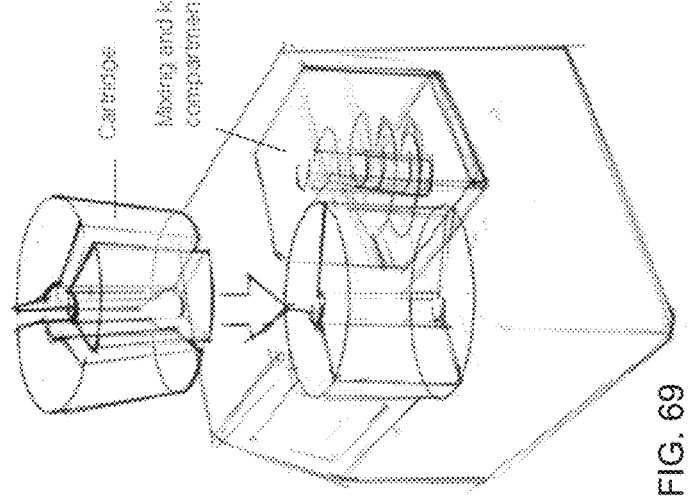
FIG. 69 is a perspective view of the countertop appliance according to an embodiment, showing the ingredient metering assembly and the mixing bowl assembly of the device.
Figure 73:
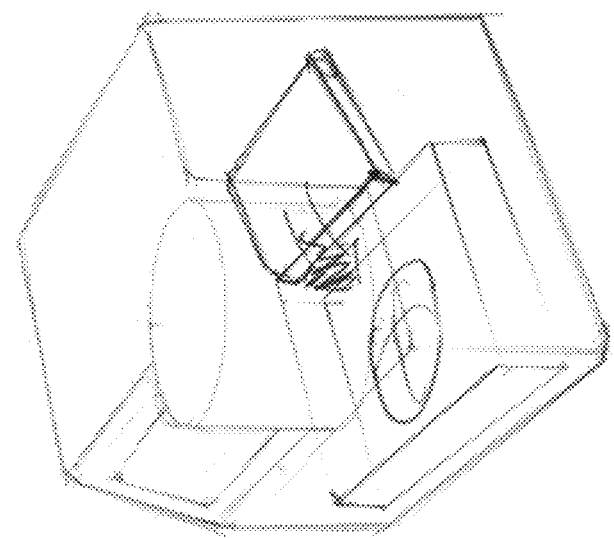
FIGS. 72 and 73 are perspective views of the countertop appliance shown in FIG. 69, showing the cooking assembly of the device.
Figure 72:
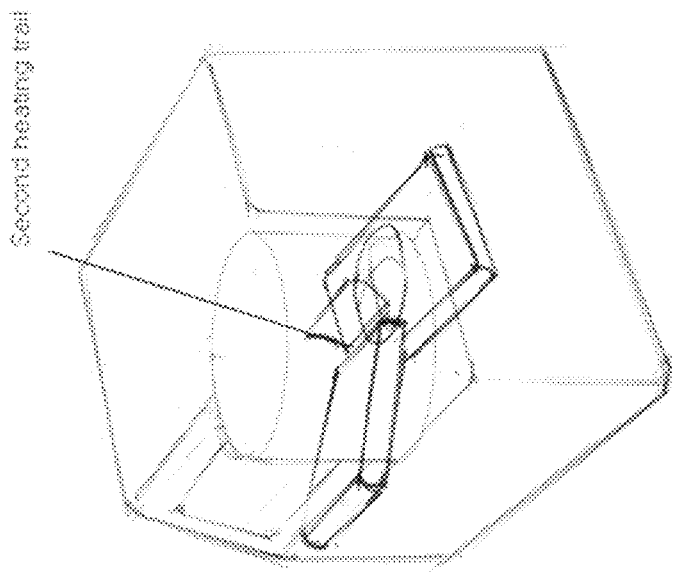
Figure 74B:
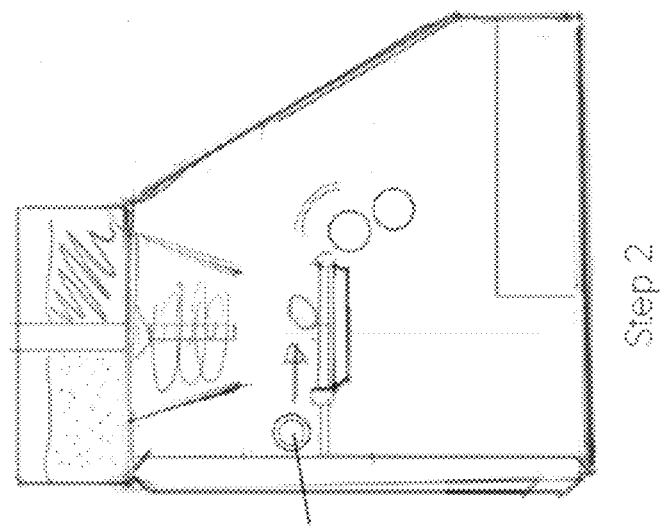
FIGS. 74A-74D show various stages of the operation of a countertop appliance, according to an embodiment.
Figure 74A:
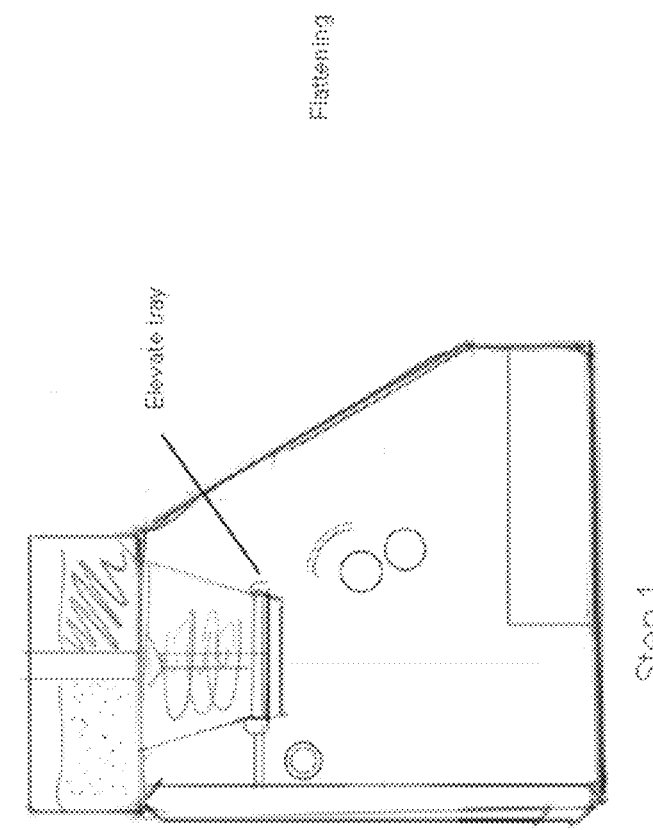
Figure 74D:
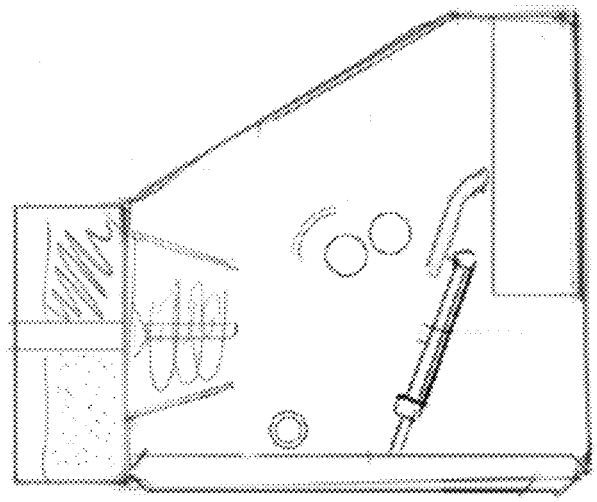
Figure 74C:
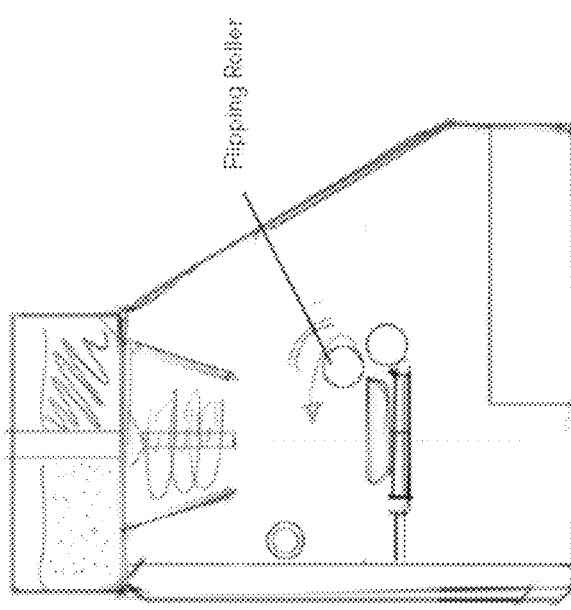
Figure 75B:
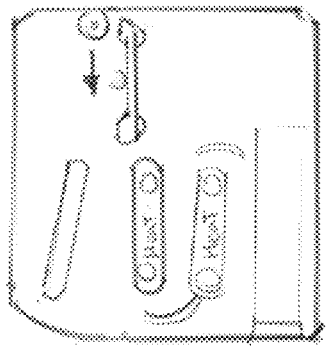
FIGS. 75A-75D show various views of a countertop bread making appliance according to an embodiment.
Figure 75D:
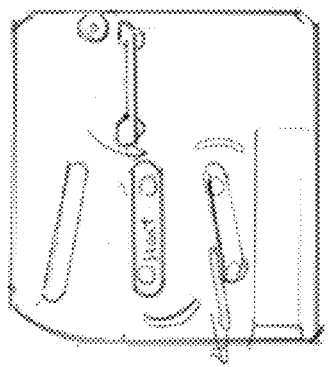
Figure 75A:
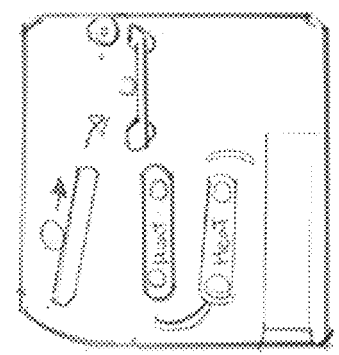
Figure 75C:
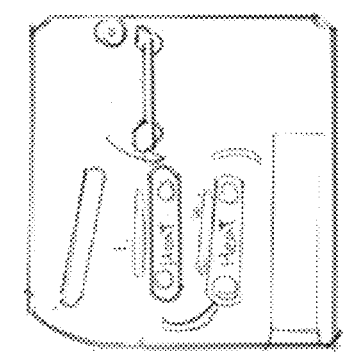

In some embodiments, the fluid (e.g., oil and water) delivery portions of the ingredient metering assembly 1200 (or any ingredient metering assembly described herein) can include tubes, heaters, and/or valves that can regulate the temperature of the fluid therein. In this manner, for example, the water supplied to the flour in the mixing bowl (e.g., via nozzle 1254) can be maintained at a temperature that facilitates efficient and repeatable mixing. For example, in some embodiments, a tube, a valve, or a nozzle can include a resistance heater or a thermos-electric heater/cooler that is activated to elevate or reduce the temperature of the water traveling therethrough. In other embodiments, a tube, valve or nozzle can include heat transfer components configured to recapture heat from other portions of the assembly. For example, FIG. 68 shows a perspective view of a water transfer tube 9255 that can be included within the ingredient metering assembly 1200 (or any ingredient metering assembly described herein). The water transfer tube 9255 can provide a passageway through which water is conveyed from water reservoir 1250 to the nozzle 1254 for delivery to the mixing bowl. The water transfer tubes 9255 includes a series of heat transfer fins 5251 that are configured to transfer ambient heat from within the housing into the water flowing therethrough.

Although not shown, in some embodiments, the water transfer tube 9255 can include one or more temperature sensors (e.g., thermocouples) that can provide feedback to the controller.

FIGS. 69-73 show a flatbread maker that includes a cylindrical flour/ingredient container coupled to the front of the machine. The flour/ingredient container is a "3-in-1" style container, and is removable. This embodiment can include an insulated storage compartment within which the baked roti can be stored. This embodiment includes an auger (or screw) type dispenser to convey the flour from the container. This embodiment includes an x-y rail system to move a base and/or the platens to transfer and manipulate the dough pieces.

FIGS. 74A-74D show a flatbread maker that includes a cylindrical flour/ingredient container coupled to the front of the machine. The flour/ingredient container is a "3-in-1" style container, and can be removable. This embodiment can include an insulated storage compartment within which the baked roti can be stored. This embodiment includes an auger (or screw) type dispenser to convey the flour from the container. This embodiment includes single-axis rail system to move a base and/or the platens to transfer and manipulate the dough pieces.

FIGS. 75A-75D show a modular flatbread maker that includes an ingredient storage and preparation module that can be separately attached to a baking module. This embodiment can include an insulated storage compartment within which the baked roti can be stored. This embodiment includes an auger (or screw) type dispenser to convey the flour from the container and/or to mix the ingredients. The mixed dough is then dispensed from the upper unit into the lower unit for baking, as shown.

While various embodiments of the invention have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. For example, while the embodiments that are described above relate to creating any suitable flatbread, the invention can be used to make any other suitable food products. Further, the embodiments that are described above relate to an apparatus to be used on a kitchen countertop, the invention can be used in a restaurant kitchen or any other environment where food is prepared. Alternatively, other embodiments of the invention can be used to make non-food products such as playdoh, crafts, paints, or the like.

Although various embodiments have been described as having particular features and/or combinations of components, other embodiments are possible having a combination of any features and/or components from any of embodiments where appropriate.

What is claimed is:

1. An apparatus, comprising:
a cooking assembly including a first platen and a second platen, the first platen having a first flattening mass and a first heating surface movably coupled to the first flattening mass, the second platen having a second flattening mass and a second heating surface, the first heating surface between the first platen and the second heating surface, the second platen coupled to the first platen such that the first heating surface and the second heating surface define a platen volume within which an ingredient mixture can be disposed; and
an actuator assembly configured to move at least one of the first platen or the second platen to reduce the platen volume to place the cooking assembly in a flattening configuration, the first heating surface and the second heating surface each configured to contact the ingredient mixture when the cooking assembly is in the flattening configuration, the first heating surface in contact with the first flattening mass and the second heating surface in contact with the second flattening mass when the cooking assembly is in the flattening configuration, the actuator assembly configured to rotate at least one of the first platen or the second platen to transition the cooking assembly between a first orientation and a second orientation, the first heating surface below the second heating surface when the cooking assembly is in the first orientation, the second heating surface below the first heating surface when the cooking assembly is in the second orientation,
the actuator assembly configured to move at least one of the first platen or the second platen to increase the platen volume to place the cooking assembly in a cooking configuration when the cooking assembly is in the first orientation, the first heating surface contacting the ingredient mixture to apply heat to the ingredient mixture when the cooking assembly is in the cooking configuration, the first heating surface being spaced apart from the first flattening mass when the cooking assembly is in the cooking configuration.

2. The apparatus of claim 1, wherein the first heating surface is between a support surface and the second heating surface when the cooking assembly is in the first orientation, the second heating surface is between the support surface and the first heating surface when the cooking assembly is in the second orientation.

3. The apparatus of claim 2, wherein the actuator assembly is configured to rotate both the first platen and the second platen simultaneously when the cooking assembly is in the flattening configuration to transition the cooking assembly between the first orientation and the second orientation.

4. The apparatus of claim 1, wherein:
the cooking configuration is a first cooking configuration, the second heating surface configured to be spaced apart from the ingredient mixture when the cooking assembly is in the first cooking configuration; and
the actuator assembly is configured to move at least one of the first platen or the second platen to place the cooking assembly in a second cooking configuration when the cooking assembly is in the second orientation, the second heating surface configured to contact the ingredient mixture to apply heat to the ingredient mixture when the cooking assembly is in the second cooking configuration, the first heating surface configured to be spaced apart from the ingredient mixture when the cooking assembly is in the second cooking configuration when the cooking assembly is in the second cooking configuration.

5. The apparatus of claim 4, further comprising:
a controller configured to supply a first current to a first heating element coupled to the first heating surface when the cooking assembly is in the first cooking configuration with the first heating surface being spaced apart from the first flattening mass, the controller configured to supply a second current to a second heating element coupled to the second heating surface when the cooking assembly is in the second cooking configuration.

6. The apparatus of claim 1, actuator assembly is configured to rotate the cooking assembly between the first orientation and the second orientation about an axis of rotation that is parallel to at least one of the first heating surface or the second heating surface.

7. The apparatus of claim 1, wherein the first platen includes a biasing member configured to urge the first heating surface away from the first flattening mass.

8. The apparatus of claim 1, wherein the first heating surface is coupled to the first flattening mass by a hinge joint, the first heating surface being configured to rotate relative to the first flattening mass via the hinge joint.

9. The apparatus of claim 8, wherein:
the first heating surface is nonparallel to the first flattening mass when the cooking assembly is in a receiving configuration, the first heating surface and the second heating surface each configured to contact the ingredient mixture to limit movement of the ingredient mixture when the cooking assembly is in the receiving configuration; and
the first heating surface is parallel to the first flattening mass when the cooking assembly is in the flattening configuration.

10. The apparatus of claim 9, wherein the first heating surface is configured to rotate relative to the first flattening mass when the actuator assembly moves at least one of the first platen or the second platen to place the cooking assembly in the flattening configuration.

11. The apparatus of claim 1, wherein the actuator assembly includes a first connection member and a second connection member, the first connection member and the second connection member movably coupling the second platen to the first platen, the second platen configured to move parallel to the first platen along a first longitudinal axis of the first connection member and a second longitudinal axis of the second connection member when the actuator assembly moves the cooking assembly towards the flattening configuration.

12. The apparatus of claim 11, wherein the first heating surface and the second heating surface are between the first longitudinal axis and the second longitudinal axis.

13. The apparatus of claim 11, further comprising:
a press member coupled to the second flattening mass, a first end of the press member coupled to the first connection member, a second end of the press member coupled to the second connection member, a central portion of the press member coupled to a central portion of the second flattening mass such that a press force from the actuator assembly is transferred from the press member to the central portion of the second flattening mass.

14. The apparatus of claim 13, wherein the press member is spaced apart from an outer portion of the second flattening mass within a plane normal to the second heating surface.

15. An apparatus, comprising:
a cooking assembly including a first platen, a second platen, and a connection member coupling the second platen to the first platen, the first platen having a first flattening mass and a first heating plate, the second platen having a second flattening mass and a second heating plate, the first heating plate between the first platen and the second heating plate, the connection member configured to allow movement of the first platen parallel to the second platen in a first degree of freedom, the connection member configured to constrain movement of the first platen relative to the second platen in a second degree of freedom; and
an actuator assembly coupled to the cooking assembly, the actuator assembly including a first motor and a second motor, the first motor configured to move at least one of the first platen or the second platen in a first direction within the first degree of freedom to place the cooking assembly in a flattening configuration, the second motor configured to rotate the connection member in the second degree of freedom to transition the cooking assembly between a first orientation and a second orientation when the cooking assembly is in the flattening configuration, the first heating plate being in contact with the first flattening mass and being spaced apart from the second heating plate by a first distance when the cooking assembly is in the flattening configuration such that the first heating plate and the second heating plate are each configured to contact an ingredient mixture between the first platen and the second platen,
the first motor configured to move at least one of the first platen or the second platen in a second direction within the first degree of freedom to place the cooking assembly in a cooking configuration when the cooking assembly is in the first orientation, the first heating plate spaced apart from the second heating plate by a second distance greater than the first distance when the cooking assembly is in the cooking configuration such that the first heating plate remains in contact with the ingredient mixture and the second heating plate is spaced apart from the ingredient mixture, the first heating plate configured to heat the ingredient mixture when the cooking assembly is in the first cooking configuration, the first heating plate being spaced apart from the first flattening mass when the cooking assembly is in the cooking configuration.

16. The apparatus of claim 15, wherein the first platen includes a spring configured to urge the first heating plate away from the first flattening mass.

17. The apparatus of claim 16, wherein the first heating plate includes a cooking surface and a back surface, the cooking surface configured to contact the ingredient mixture when the cooking assembly is in the cooking configuration, the back surface including a heating element that is spaced apart from the first flattening mass when the cooking assembly is in the cooking configuration.

18. The apparatus of claim 15, wherein the first heating plate is coupled to the first flattening mass by a hinge joint, the first heating plate being configured to rotate relative to the first flattening mass via the hinge joint.

* * * * *